United States Patent
Nii et al.

[19]

[11] Patent Number: 6,131,680
[45] Date of Patent: *Oct. 17, 2000

[54] POWER OUTPUT APPARATUS AND METHOD OF CONTROLLING THE SAME

[75] Inventors: Yoshihide Nii, Fuji; Shoichi Sasaki; Takeshi Kotani, both of Mishima, all of Japan

[73] Assignee: Toyota Jidosha Kabushiki Kaisha, Toyota, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/813,404

[22] Filed: Mar. 10, 1997

[30] Foreign Application Priority Data

May 20, 1996 [JP] Japan .................... 8-148677

[51] Int. Cl.$^7$ .................................................. B60K 1/00
[52] U.S. Cl. .................. 180/65.2; 180/65.3; 180/65.4; 477/2
[58] Field of Search .................. 180/65.1, 65.2, 180/65.3, 65.4, 165; 477/2, 3, 4, 5, 6; 310/101, 102 R, 118, 121, 122; 290/40

[56] References Cited

U.S. PATENT DOCUMENTS

| | | |
|---|---|---|
| 3,566,717 | 3/1971 | Berman et al. . |
| 3,620,323 | 11/1971 | Maeda . |
| 3,623,568 | 11/1971 | Mori . |
| 5,103,923 | 4/1992 | Johnston et al. . |
| 5,513,719 | 5/1996 | Moroto et al. . |
| 5,722,911 | 3/1998 | Ibarki et al. ............................ 180/65.3 |
| 5,775,449 | 7/1998 | Morato et al. .......................... 180/65.2 |
| 5,788,006 | 8/1998 | Yamaguchi ............................. 180/65.3 |
| 5,788,640 | 7/1998 | Sakai et al. ............................. 180/65.2 |
| 5,823,280 | 10/1998 | Lateur et al. . |
| 5,839,533 | 11/1998 | Mikami et al. ......................... 180/65.3 |

FOREIGN PATENT DOCUMENTS

| | | |
|---|---|---|
| 58401 73 | 1/1975 | Australia . |
| 0 552 140 A1 | 7/1993 | European Pat. Off. . |
| 0 710 787 A2 | 5/1996 | European Pat. Off. . |
| 0 775 607 A1 | 5/1997 | European Pat. Off. . |
| 50-30223 | 3/1975 | Japan . |
| 5-229351 | 9/1993 | Japan . |
| 7-135701 | 5/1995 | Japan . |

*Primary Examiner*—Richard M. Camby
*Attorney, Agent, or Firm*—Oliff & Berridge, PLC

[57] ABSTRACT

A power output apparatus includes a planetary gear having a planetary carrier, a sun gear, and a ring gear. A crankshaft of an engine is mechanically linked with the planetary carrier, a first motor with the sun gear, and a second motor with the ring gear. A controller drives the second motor with electric power regenerated by the first motor or drives the first motor with electric power regenerated by the second motor, based on a gear ratio of the sun gear to the ring gear of the planetary gear, thereby enabling the power output from the engine to be converted to a desired power and output to a power transmission gear mechanically connected with the ring gear. The engine may be driven at any driving point that can output energy identical with the energy output to the ring gear. This structure allows the engine to be driven at a desired driving point of highest possible efficiency, thereby enhancing the efficiency of the whole apparatus.

45 Claims, 32 Drawing Sheets

POWER OUTPUT APPARATUS AND METHOD OF CONTROLLING THE SAME

BACKGROUND OF THE INVENTION

1. Field of the Invention

The present invention relates to a power output apparatus and a method of controlling the same. More specifically, the invention pertains to a power output apparatus for outputting power generated by an engine to a drive shaft with a high efficiency as well as to a method of controlling such a power output apparatus.

2. Description of the Prior Art

Known power output apparatuses for carrying out torque conversion of power output from an engine and outputting the converted power to a drive shaft include a combination of a fluid-based torque converter with a speed change gear. In the torque converter, an input shaft and an output shaft of the power are not fully locked. This causes a slip between the input shaft and the output shaft and leads to an energy loss corresponding to the slip. The energy loss is expressed as the product of the revolving speed difference between the input shaft and the output shaft and the torque transmitted to the output shaft and is consumed as heat.

In a vehicle having such a power output apparatus mounted thereon as its power source, at the time when significantly large power is required, for example, at the time of starting the vehicle or running the vehicle on an upward slope at a low speed, a large energy loss in the torque converter undesirably lowers the energy efficiency. Even in a stationary driving state, the efficiency of power transmission in the torque converter is not 100%, and the fuel consumption rate in the known power output apparatus is thereby lower than that in a manual transmission.

In order to solve such problems, the applicants have proposed a system that does not include the fluid-based torque converter but has an engine, a planetary gear, a generator, a motor, and a battery and outputs the power from the motor to the drive shaft by utilizing the power output from the engine or electric power stored in the battery (JAPANESE PATENT LAYING-OPEN GAZETTE No. 50-30223).

SUMMARY OF THE INVENTION

One object of the present invention is thus to provide a power output apparatus which carries out torque conversion for all the power output from an engine with a high efficiency and outputs the converted power to a drive shaft, as well as a method of controlling such a power output apparatus.

Another object of the invention is to carry out torque conversion for part of the power output from an engine with a high efficiency and output the converted power to a drive shaft, while converting the residual power to electrical energy with a high efficiency and charging storage battery means with the electrical energy.

Still another object of the invention is to carry out torque conversion for the power output from an engine and electrical energy stored in storage battery means with a high efficiency and output a desired power to a drive shaft.

Another object of the invention is to enable an engine to be driven at a desired driving point of highest possible efficiency, thereby enhancing the efficiency of the whole power output apparatus.

At least part of the above and the other related objects is realized by a first power output apparatus of the present invention. The first power output apparatus comprises: an engine having an output shaft; a first motor having a rotating shaft, the first motor inputting and outputting power to and from the rotating shaft; a second motor for inputting and outputting power to and from the drive shaft; three shaft-type power input/output means having three shafts respectively linked with the drive shaft, the output shaft, and the rotating shaft, when powers are input to and output from any two shafts among the three shafts, the power input/output means inputting and outputting power, which is determined according to the input and output powers, to and from a residual one shaft; and power control means for driving and controlling the first motor and the second motor, in order to enable power output from the engine to be subjected to torque conversion by the three shaft-type power input/output means, the first motor, and the second motor and to be output to the drive shaft.

The term 'power' implies energy expressed as the product of the torque acting on a specific shaft and the revolving speed of the specific shaft. Even when the magnitude of energy is identical, different torques and revolving speeds result in different powers.

The first power output apparatus of the present invention enables the power from the engine to be subjected to torque conversion and output to the drive shaft. The power output from the engine is converted to the power defined by different torque and revolving speed and output to the drive shaft. The first power output apparatus includes three shaft-type power input/output means that can independently input and output powers to and from the two shafts. In case that the two shafts are the output shaft of the engine and the drive shaft, the output shaft of the engine can be rotated independently of the revolving speed of the drive shaft. This allows the engine to be driven at a desired driving point of highest possible efficiency, thereby enhancing the efficiency of the whole power output apparatus.

In accordance with one aspect of the first power output apparatus of the present invention, the first power output apparatus further comprises: target power setting means for setting a target power to be output to the drive shaft; and engine operation control means for controlling operation of the engine, based on the target power set by the target power setting means, wherein the power control means comprises means for enabling the power output from the engine to be subjected to torque conversion by the three shaft-type power input/output means, the first motor, and the second motor and to be output to the drive shaft as the target power. This structure enables the power from the engine to be converted to the target power and output to the drive shaft.

In accordance with another aspect of the first power output apparatus of the present invention, wherein the power control means comprises: means for driving and controlling the first motor, in order to enable part of the power output from the engine to be regenerated as electric power by the first motor via the three shaft-type power input/output means; and means for driving and controlling the second motor, in order to enable power to be output from the second motor to the drive shaft by utilizing the electric power regenerated by the first motor. This structure allows the first motor to function as a generator while enabling the second motor to function as the normal motor, thereby allowing the power from the engine to be subjected to torque conversion and output to the drive shaft.

In accordance with still another aspect of the first power output apparatus of the present invention, wherein the power control means comprises: means for driving and controlling the second motor, in order to enable part of the power output to the drive shaft via the three shaft-type power input/output means to be regenerated as electric power by the second motor; and means for driving and controlling the first motor, in order to enable power to be output from the first motor to the rotating shaft by utilizing the electric power regenerated by the second motor. This structure allows the second motor to function as a generator while enabling the first motor to function as the normal motor, thereby allowing the power from the engine to be subjected to torque conversion and output to the drive shaft.

In accordance with another aspect of the first power output apparatus of the present invention, the first power output apparatus further comprises: storage battery means being charged with electric power regenerated by the first motor, being charged with electric power regenerated by the second motor, being discharged to supply electric power required for driving the first motor, and being discharged to supply electric power required for driving the second motor; and charge state measuring means for measuring charge state of the storage battery, wherein the power control means comprises means for driving and controlling the first motor and the second motor based on the charge state of the storage battery means measured by the charge state measuring means, in order to enable the power output from the engine and electric power stored into and discharged from the storage battery means to be subjected to torque conversion by the three shaft-type power input/output means, the first motor, and the second motor and to be output to the drive shaft. This structure enables part of the power from the engine to be subjected to torque conversion and output to the drive shaft, while converting the residual power to electrical energy, with which the storage battery means is charged. This structure also enables the power output from the engine and electrical energy stored in the storage battery means to be subjected to torque conversion and output to the drive shaft. The torque conversion is carried out according to the charge state of the storage battery means, so that the charge state of the storage battery means can be kept in a desirable range.

In accordance with one aspect of this structure, the first power output apparatus further comprises: target power setting means for setting a target power to be output to the drive shaft; engine power setting means for setting power to be output from the engine, based on the target power set by the target power setting means and the charge state of the storage battery means measured by the charge state measuring means; and engine operation control means for controlling operation of the engine, based on the power set by the engine power setting means, wherein the power control means comprises means for enabling the power output from the engine and the electric power stored into and discharged from the storage battery means to be subjected to torque conversion by the three shaft-type power input/output means, the first motor, and the second motor and to be output to the drive shaft as the target power. This structure enables the storage battery means to be charged or discharged while outputting the target power to the drive shaft. In this structure, wherein the engine power setting means comprises: drive shaft power setting means for setting required power output to the drive shaft, based on the target power set by the target power setting means; charging and discharging power setting means for setting required power to charge and discharge the storage battery means, based on the charge state of the storage battery means measured by the charge state measuring means; and addition means for summing up the power set by the drive shaft power setting means and the power set by the charging and discharging power setting means to calculate a total power to be output from the engine. This structure can determine the power output from the engine, based on the power required to output the target power to the drive shaft and the power required to charge or discharge the storage battery means.

In the first power output apparatus of this preferable structure, the engine operation control means drives and controls the first motor, in order to regulate the revolving speed of the output shaft of the engine or in order to regulate the torque output from the engine.

In accordance with another aspect of the first power output apparatus of the present invention, the first power output apparatus further comprises: target power setting means for setting a target power to be output to the drive shaft; power setting means for specifying power input to and output from the engine, power input to and output from the first motor, and power input to and output from the second motor, based on the target power set by the target power setting means, wherein the power control means comprises means for driving and controlling the engine as well as the first motor and the second motor, in order to enable the powers set by the power setting means to be respectively input to and output from the engine, the first motor, and the second motor. This structure specifies the powers input to and output from the engine, the first motor, and the second motor, based on the preset target power, and operates the engine, the first motor, and the second motor with the specified powers.

In accordance with one aspect of this structure(a), wherein the power setting means comprises: means for presetting the power input to and output from the engine, based on the target power; and means for setting the power input to and output from the first motor and the power input to and output from the second motor, in order to enable the preset power to be subjected to torque conversion by the three shaft-type power input/output means, the first motor, and the second motor and to be output to the drive shaft as the target power. This structure enables the power from the engine to be converted to the target power and output to the drive shaft.

In accordance with another aspect of that structure(a), the first power output apparatus further comprises: storage battery means being discharged to supply electric power required for driving the second motor, wherein the power setting means comprises means for setting the power input to and output from the engine equal to zero and specifying the power input to and output from the second motor in order to enable the target power to be output from the second motor to the drive shaft, in response to a predetermined driving requirement, the power control means comprising means for driving the second motor with electric power stored in the storage battery means, in response to the predetermined driving requirement. This structure enables the drive shaft to be driven only with the power output from the second motor.

In accordance with still another aspect of that structure(a), the first power output apparatus further comprises storage battery means being discharged to supply electric power required for driving the second motor, wherein the power setting means comprises; means for, when the target power exceeds a predetermined power, presetting the power input to and output from the engine based on the predetermined power; means for setting the power input to and output from the first motor, in order to enable the preset power to be subjected to torque conversion by the three shaft-type power input/output means, the first motor, and the second motor and to be output to the drive shaft as the predetermined power; and means for setting a difference between the target power and power output from the three shaft-type power input/output means to the drive shaft based on the preset power output from the engine, as the power output from the second motor, the power control means for implementing control with electric power that is discharged from the storage battery means and corresponds to a difference between the target power and the predetermined power. This structure enables the larger power than the power from the engine to be output to the drive shaft. When a maximum power that can be output from the engine is set to the predetermined power, the larger power than the possible output power from the engine to be output to the drive shaft. An engine having a smaller capacity than the power required to the drive shaft is thus sufficiently used in this structure. This effectively reduces the size of the whole power output apparatus.

In the first power output apparatus of this preferable structure, the target power setting means may include means for specifying a target torque applied to the drive shaft based on an instruction of a user and means for setting the target power according to the target torque thus specified. Alternatively, the target power setting means may include means for specifying a target revolving speed of the drive shaft based on an instruction of a user and means for setting the target power according to the target revolving speed thus specified.

The present invention is further directed to a second power output apparatus for outputting power to a drive shaft. The second power output apparatus comprises: an engine having an output shaft; a first motor having a rotating shaft, the first motor inputting and outputting power to and from the rotating shaft; a second motor for inputting and outputting power to and from the output shaft of the engine; three shaft-type power input/output means having three shafts respectively linked with the drive shaft, the output shaft, and the rotating shaft, when powers are input to and output from any two shafts among the three shafts, the power input/output means inputting and outputting power, which is determined according to the input and output powers, to and from a residual one shaft; and power control means for driving and controlling the first motor and the second motor, in order to enable power output from the engine to be subjected to torque conversion by the three shaft-type power input/output means, the first motor, and the second motor and to be output to the drive shaft.

The second power output apparatus of the present invention enables the power from the engine to be subjected to torque conversion and output to the drive shaft. The power output from the engine is converted to the power defined by different torque and revolving speed and output to the drive shaft. The second power output apparatus includes three shaft-type power input/output means that can independently input and output powers to and from the two shafts. In case that the two shafts are the output shaft of the engine and the drive shaft, the output shaft of the engine can be rotated independently of the revolving speed of the drive shaft. This allows the engine to be driven at a desired driving point of highest possible efficiency, thereby enhancing the efficiency of the whole power output apparatus.

In accordance with one aspect of the second power output apparatus of the present invention, the second power output apparatus further comprises: target power setting means for setting a target power to be output to the drive shaft; and engine operation control means for controlling operation of the engine, based on the target power set by the target power setting means, wherein the power control means comprises means for enabling the power output from the engine to be subjected to torque conversion by the three shaft-type power input/output means, the first motor, and the second motor and to be output to the drive shaft as the target power. This structure enables the power from the engine to be converted to the target power and output to the drive shaft.

In accordance with another aspect of the second power output apparatus of the present inventions wherein the power control means comprises: means for driving and controlling the first motor, in order to enable part of the power output to the rotating shaft via the three shaft-type power input/output means to be regenerated as electric power by the first motor; and means for driving and controlling the second motor, in order to enable power to be output from the second motor to the output shaft of the engine by utilizing the electric power regenerated by the first motor. This structure allows the first motor to function as a generator while enabling the second motor to function as the normal motor, thereby allowing the power from the engine to be subjected to torque conversion and output to the drive shaft.

In accordance with still another aspect of the first power output apparatus of the present invention, wherein the power control means comprises: means for driving and controlling the second motor, in order to enable part of the power output from the engine to be regenerated as electric power by the second motor; and means for driving and controlling the first motor, in order to enable power to be output from the first motor to the rotating shaft by utilizing the electric power regenerated by the second motor. This structure allows the second motor to function as a generator while enabling the first motor to function as the normal motor, thereby allowing the power from the engine to be subjected to torque conversion and output to the drive shaft.

In accordance with another aspect of the second power output apparatus of the present invention, the second power output apparatus further comprises: storage battery means being charged with electric power regenerated by the first motor, being charged with electric power regenerated by the second motor, being discharged to supply electric power required for driving the first motor, and being discharged to supply electric power required for driving the second motor; and charge state measuring means for measuring charge state of the storage battery, wherein the power control means comprises means for driving and controlling the first motor and the second motor based on the charge state of the storage battery means measured by the charge state measuring means, in order to enable the power output from the engine and electric power stored into and discharged from the storage battery means to be subjected to torque conversion by the three shaft-type power input/output means, the first motor, and the second motor and to be output to the drive shaft. This structure enables part of the power from the engine to be subjected to torque conversion and output to the drive shaft, while converting the residual power to electrical energy, with which the storage battery means is charged. This structure also enables the power output from the engine and electrical energy stored in the storage battery means to be subjected to torque conversion and output to the drive shaft. The torque conversion is carried out according to the charge state of the storage battery means, so that the charge state of the storage battery means can be kept in a desirable range.

In accordance with one aspect of this structure, the second power output apparatus further comprises: target power setting means for setting a target power to be output to the drive shaft; engine power setting means for setting power to be output from the engine, based on the target power set by the target power setting means and the charge state of the storage battery means measured by the charge state measuring means; and engine operation control means for controlling operation of the engine, based on the power set by the engine power setting means, wherein the power control means comprises means for enabling the power output from the engine and the electric power stored into and discharged from the storage battery means to be subjected to torque conversion by the three shaft-type power input/output means, the first motor, and the second motor and to be output to the drive shaft as the target power. This structure enables the storage battery means to be charged or discharged while outputting the target power to the drive shaft. In this structure, wherein the engine power setting means comprises: drive shaft power setting means for setting required power output to the drive shaft, based on the target power set by the target power setting means; charging and discharging power setting means for setting required power to charge and discharge the storage battery means, based on the charge state of the storage battery means measured by the charge state measuring means; and addition means for summing up the power set by the drive shaft power setting means and the power set by the charging and discharging power setting means to calculate a total power to be output from the engine. This structure can determine the power output from the engine, based on the power required to output the target power to the drive shaft and the power required to charge or discharge the storage battery means.

In the second power output apparatus of this preferable structure, the engine operation control means drives and controls the first motor, in order to regulate the revolving speed of the output shaft of the engine or in order to regulate the torque output from the engine.

In accordance with another aspect of the second power output apparatus of the present invention, the second power output apparatus further comprises: target power setting means for setting a target power to be output to the drive shaft; power setting means for specifying power input to and output from the engine, power input to and output from the first motor, and power input to and output from the second motor, based on the target power set by the target power setting means, wherein the power control means comprises means for driving and controlling the engine as well as the first motor and the second motor, in order to enable the powers set by the power setting means to be respectively input to and output from the engine, the first motor, and the second motor. This structure specifies the powers input to and output from the engine, the first motor, and the second motor, based on the preset target power, and operates the engine, the first motor, and the second motor with the specified powers.

In accordance with one aspect of this structure(b), wherein the power setting means comprises: means for presetting the power input to and output from the engine, based on the target power; and means for setting the power input to and output from the first motor and the power input to and output from the second motor, in order to enable the preset power to be subjected to torque conversion by the three shaft-type power input/output means, the first motor, and the second motor and to be output to the drive shaft as the target power. This structure enables the power from the engine to be converted to the target power and output to the drive shaft.

In accordance with another aspect of that structure(b), the second power output apparatus further comprises: storage battery means being discharged to supply electric power required for driving the first and second motor, wherein the power setting means comprises means for setting the power input to and output from the engine equal to zero and specifying the power input to and output from the first motor in order to enable the target power to be output from the first motor to the drive shaft via the three shaft-type power input/output means, in response to a predetermined driving requirement, the power control means comprising means for driving the first motor with electric power stored in the storage battery means, in response to the predetermined driving requirement, the power control means comprising means for driving the second motor in order to enable the output shaft of engine to a predetermined rotating state. This structure enables the drive shaft to be driven with the power output from the first motor and the second motor.

In accordance with still another aspect of that structure(b), the second power output apparatus further comprises: storage battery means being discharged to supply electric power required for driving the first and second motor, wherein the power setting means comprises: first setting means for, when the target power exceeds a predetermined power, presetting the power input to and output from the engine based on the predetermined power; second setting means for setting a difference between one power which is the power preset by the first setting means and the other power as power to be input to and output from the second motor, wherein the other power has the same number of revolutions as the power preset by the first setting means and is output to the output shaft as the target power output to the rotating shaft through the three shaft-type power input/output means; and third setting means for setting power to be input to and output from the first motor in such a way that a sum of the power set to be input to and output from the second motor, and the power preset to be input to and output from the engine is output to the rotating shaft as the target power by the three shaft-type power input/output means and the first motor, wherein the power control means uses power which is the equivalent to a difference between the target power discharged from the storage battery means and the predetermined power to execute control. This structure enables the larger power than the power from the engine to be output to the drive shaft. When a maximum power that can be output from the engine is set to the predetermined power, the larger power than the possible output power from the engine to be output to the drive shaft. An engine having a smaller capacity than the power required to the drive shaft is thus sufficiently used in this structure. This effectively reduces the size of the whole power output apparatus.

In the second power output apparatus of this preferable structure, the target power setting means may include means for specifying a target torque applied to the drive shaft based on an instruction of a user and means for setting the target power according to the target torque thus specified. Alternatively, the target power setting means may include means for specifying a target revolving speed of the drive shaft based on an instruction of a user and means for setting the target power according to the target revolving speed thus specified.

The present invention is further directed to a third power output apparatus for outputting power to a drive shaft. The third power output apparatus comprises: an engine having an output shaft; a motor having a rotating shaft, the motor inputting and outputting power to and from the rotating shaft; three shaft-type power input/output means having three shafts respectively linked with the drive shaft, the output shaft, and the rotating shaft, when powers are input to and output from any two shafts among the three shafts, the power input/output means inputting and outputting power, which is determined according to the input and output powers, to and from a residual one shaft; and lock-up state control means for keeping the motor in a lock-up state to prevent rotation of the rotating shaft, in response to a predetermined driving requirement.

The third power output apparatus of the present invention enables the power output from the engine to be subjected to torque conversion by the three shaft-type power input/output means and directly output to the drive shaft. This structure can output the power from the engine to the drive shaft without any loss caused in the process of energy conversion that replaces part of the power output from the engine with electric power and further converts the electric power to the power in a different form.

In accordance with one aspect of the third power output apparatus of the present invention, wherein the motor is a first motor, the third power output apparatus further comprises: a second motor for inputting and outputting power to and from the drive shaft; storage battery means being charged with electric power regenerated by the second motor and being discharged to supply electric power required for driving the second motor; target power setting means for setting a target power to be output to the drive shaft; drive shaft speed measuring means for measuring a revolving speed of the drive shaft; engine operation control means for controlling operation of the engine, based on the revolving speed of the drive shaft measured by the drive shaft speed measuring means and the target power set by the target power setting means; and motor control means for driving and controlling the second motor, in order to enable the target power to be output to the drive shaft by utilizing power output from the engine and power input to and output from the second motor. This structure enables the difference between the power output from the engine and the target power to be supplied by the second motor, thereby allowing the target power to be output to the drive shaft.

In accordance with another aspect of the third power output apparatus of the present invention, wherein the motor is a first motor, the third power output apparatus further comprises: a second motor for inputting and outputting power to and from the output shaft of the engine; storage battery means being discharged to supply electric power to the first motor and the second motor; target power setting means for setting a target power to be output to the drive shaft; drive shaft speed measuring means for measuring a revolving speed of the drive shaft; engine operation control means for controlling operation of the engine, based on the revolving speed of the drive shaft measured by the drive shaft speed measuring means and the target power set by the target power setting means; and motor control means for driving and controlling the second motor, in order to enable the target power to be output to the drive shaft by utilizing power output from the engine and power input to and output from the second motor. This structure also enables the difference between the power output from the engine and the target power to be supplied by the second motor, thereby allowing the target power to be output to the drive shaft.

The present invention is further directed to a fourth power output apparatus for outputting power to a drive shaft. The fourth power output apparatus comprises: an engine having an output shaft; a first motor having a first rotating shaft that is coaxial with the output shaft, the first motor inputting and outputting power to and from the first rotating shaft; a second motor having a second rotating shaft that is coaxial with the output shaft, the second motor inputting and outputting power to and from the second rotating shaft; three shaft-type power input/output means having three shafts respectively linked with the output shaft, the first rotating shaft, and the second rotating shaft, when powers are input to and output from any two shafts among the three shafts, the power input/output means inputting and outputting power, which is determined according to the input and output powers, to and from a residual one shaft; and power transmission means arranged between the engine and the second motor and linked with the second rotating shaft and the drive shaft for transmitting power of the second rotating shaft to the drive shaft. The fourth power output apparatus of the present invention enables the power from the engine to be subjected to torque conversion and output to the drive shaft. The power of the second rotating shaft can be taken out of the arrangement between the first motor and the second motor and output to the drive shaft. The fourth power output apparatus includes three shaft-type power input/output means that can independently input and output powers to and from the two shafts. In case that the two shafts are the output shaft of the engine and the second rotating shaft linked with the drive shaft, the output shaft of the engine can be rotated independently of the revolving speed of the drive shaft. This allows the engine to be driven at a desired driving point of highest possible efficiency, thereby enhancing the efficiency of the whole power output apparatus.

In the fourth power output apparatus of the invention, the first motor may be arranged between the engine and the second motor, or alternatively the second motor may be arranged between the engine and the first motor. The fourth power output apparatus may further include target power setting means for setting a target power to be output to the drive shaft and power control means for controlling the engine, the first motor, and the second motor, in order to enable the target power to be output to the drive shaft.

The present invention is further directed to a fifth power output apparatus for outputting power to a drive shaft. The fifth power output apparatus comprises: an engine having an output shaft; a first motor having a first rotating shaft that is coaxial with the output shaft, the first motor inputting and outputting power to and from the first rotating shaft; a second motor for inputting and outputting power to and from the output shaft of the engine; three shaft-type power input/output means having three shafts respectively linked with the output shaft, the first rotating shaft, and a second rotating shaft, when powers are input to and output from any two shafts among the three shafts, the power input/output means inputting and outputting power, which is determined according to the input and output powers, to and from a residual one shaft; and power transmission means arranged between the engine and the first motor and linked with the second rotating shaft and the drive shaft for transmitting power of the second rotating shaft to the drive shaft. The fifth power output apparatus of the present invention enables the power from the engine to be subjected to torque conversion and output to the drive shaft. The power of the second rotating shaft can be taken out of the arrangement between the first motor and the second motor and output to the drive shaft. The fourth power output apparatus includes three shaft-type power input/output means that can independently input and output powers to and from the two shafts. In case that the two shafts are the output shaft of the engine and the second rotating shaft linked with the drive shaft, the output shaft of the engine can be rotated independently of the revolving speed of the drive shaft. This allows the engine to be driven at a desired driving point of highest possible efficiency, thereby enhancing the efficiency of the whole power output apparatus.

In the fifth power output apparatus of the invention, the second motor may be arranged between the engine and the first motor, or alternatively the engine may be arranged between the first motor and the second motor. The fifth power output apparatus may further include target power setting means for setting a target power to be output to the drive shaft and power control means for controlling the engine, the first motor, and the second motor, in order to enable the target power to be output to the drive shaft.

At least part of the above objects is also realized by a first method of controlling a power output apparatus for outputting power to a drive shaft. The first method comprises the steps of: (a) providing an engine having an output shaft; a first motor having a rotating shaft, the first motor inputting and outputting power to and from the rotating shaft; a second motor for inputting and outputting power to and from a drive shaft; and three shaft-type power input/output means having three shafts respectively linked with the drive shaft, the output shaft, and the rotating shaft, when powers are input to and output from any two shafts among the three shafts, the power input/output means inputting and outputting power, which is determined according to the input and output powers, to and from a residual one shaft; (b) specifying a target power to be output to the drive shaft, based on an instruction of a user; (c) controlling operation of the engine, based on the target power specified in the step (b); and (d) driving and controlling the first motor and the second motor, in order to enable the power output from the engine controlled in the step (c) to be subjected to torque conversion by the three shaft-type power input/output means, the first motor, and the second motor and to be output to the drive shaft as the target power.

The first method of the present invention enables the power from the engine to be subjected to torque conversion and output to the drive shaft. The power output from the engine is converted to the power defined by different torque and revolving speed and output to the drive shaft. The power output apparatus includes three shaft-type power input/output means that can independently input and output powers to and from the two shafts. In case that the two shafts are the output shaft of the engine and the drive shaft, the output shaft of the engine can be rotated independently of the revolving speed of the drive shaft. This allows the engine to be driven at a desired driving point of highest possible efficiency, thereby enhancing the efficiency of the whole power output apparatus.

The present invention is further directed to a second method of controlling a power output apparatus for outputting power to a drive shaft, the second method comprises the steps of: (a) providing an engine having an output shaft; a first motor having a rotating shaft, the first motor inputting and outputting power to and from the rotating shaft; a second motor for inputting and outputting power to and from a drive shaft; three shaft-type power input/output means having three shafts respectively linked with the drive shaft, the output shaft, and the rotating shaft, when powers are input to and output from any two shafts among the three shafts, the power input/output means inputting and outputting power, which is determined according to the input and output powers, to and from a residual one shaft; and storage battery means being charged with electric power regenerated by the first motor, being charged with electric power regenerated by the second motor, being discharged to supply electric power required for driving the first motor, and being discharged to supply electric power required for driving the second motor; (b) specifying a target power to be output to the drive shaft, based on an instruction of a user; (c) controlling operation of the engine, based on the target power specified in the step (b) and a charge state of the storage battery means; and (d) driving and controlling the first motor and the second motor, in order to enable the power output from the engine controlled in the step (c) and electric power stored into and discharged from the storage battery means to be subjected to torque conversion by the three shaft-type power input/output means, the first motor, and the second motor and to be output to the drive shaft as the target power.

The second method of the present invention enables part of the power from the engine to be subjected to torque conversion and output to the drive shaft, while converting the residual power to electrical energy, with which the storage battery means is charged. This structure also enables the power output from the engine and electrical energy stored in the storage battery means to be subjected to torque conversion and output to the drive shaft. The torque conversion is carried out according to the charge state of the storage battery means, so that the charge state of the storage battery means can be kept in a desirable range.

The present invention is further directed to a third method of controlling a power output apparatus for outputting power to a drive shaft, the third method comprises the steps of: (a) providing an engine having an output shaft; a first motor having a rotating shaft, the first motor inputting and outputting power to and from the rotating shaft; a second motor for inputting and outputting power to and from a drive shaft; and three shaft-type power input/output means having three shafts respectively linked with the drive shaft, the output shaft, and the rotating shaft, when powers are input to and output from any two shafts among the three shafts, the power input/output means inputting and outputting power, which is determined according to the input and output powers, to and from a residual one shaft; (b) specifying a target power to be output to the drive shaft, based on an instruction of a user; (c) setting power input to and output from the engine, power input to and output from the first motor, and power input to and output from the second motor, based on the target power specified in the step (b); and (d) driving and controlling the engine, the first motor, and the second motor, in order to enable the powers set in the step (c) to be respectively input to and output from the engine, the first motor, and the second motor.

The third method of the present invention enables the powers input to and output from the engine, the first motor, and the second motor, based on the preset target power, and operates the engine, the first motor, and the second motor with the specified powers.

The present invention is further directed to a fourth method of controlling a power output apparatus for outputting power to a drive shaft, the fourth method comprises the steps of: (a) providing an engine having an output shaft; a first motor having a rotating shaft, the first motor inputting and outputting power to and from the rotating shaft; a second motor for inputting and outputting power to and from a drive shaft; three shaft-type power input/output means having three shafts respectively linked with the drive shaft, the output shaft, and the rotating shaft, when powers are input to and output from any two shafts among the three shafts, the power input/output means inputting and outputting power, which is determined according to the input and output powers, to and from a residual one shaft; and storage battery means being discharged to supply electric power required for driving the second motor; (b) specifying a target power to be output to the drive shaft, based on an instruction of a user; and (c) stopping operation of the engine and driving and controlling the second motor in order to enable the target power to be output from the second motor to the drive shaft with electric power stored in the storage battery means, in response to a predetermined driving requirement.

The fourth method of the present invention enables the drive shaft to be driven only with the power output from the second motor.

The present invention is further directed to a fifth method of controlling a power output apparatus for outputting power to a drive shaft, the fifth method comprises the steps of: (a) providing an engine having an output shaft; a first motor having a rotating shaft, the first motor inputting and outputting power to and from the rotating shaft; a second motor for inputting and outputting power to and from a drive shaft; three shaft-type power input/output means having three shafts respectively linked with the drive shaft, the output shaft, and the rotating shaft, when powers are input to and output from any two shafts among the three shafts, the power input/output means inputting and outputting power, which is determined according to the input and output powers, to and from a residual one shaft; and storage battery means being discharged to supply electric power required for driving the second motor; (b) specifying a target power to be output to the drive shaft, based on an instruction of a user; (c) when the target power specified in the step (b) exceeds a predetermined power, controlling operation of the engine, based on the predetermined power; (d) driving and controlling the first motor, in order to enable the power output from the engine controlled in the step (c) to be subjected to torque conversion by the three shaft-type power input/output means, the first motor, and the second motor and to be output to the drive shaft as the predetermined power; and (e) driving and controlling the second motor, in order to make the power output from the engine equal to a difference between the target power and power output via the three shaft-type power input/output means to the drive shaft.

The fifth method of the present invention enables the larger power than the power from the engine to be output to the drive shaft. When a maximum power that can be output from the engine is set to the predetermined power, the larger power than the possible output power from the engine to be output to the drive shaft. An engine having a smaller capacity than the power required to the drive shaft is thus sufficiently used in this method. This effectively reduces the size of the whole power output apparatus.

The present invention is further directed to a sixth method of controlling a power output apparatus for outputting power to a drive shaft, the sixth method comprises the steps of: (a) providing an engine having an output shaft; a first motor having a rotating shaft, the first motor inputting and outputting power to and from the rotating shaft; a second motor for inputting and outputting power to and from a drive shaft; three shaft-type power input/output means having three shafts respectively linked with the drive shaft, the output shaft, and the rotating shaft, when powers are input to and output from any two shafts among the three shafts, the power input/output means inputting and outputting power, which is determined according to the input and output powers, to and from a residual one shaft; and storage battery means being charged with electric power regenerated by the second motor and being discharged to supply electric power required for driving the second motor; (b) specifying a target power to be output to the drive shaft, based on an instruction of a user; (c) controlling operation of the engine, based on the target power specified in the step (b) and a revolving speed of the drive shaft; (d) keeping the first motor in a lock-up state to prevent rotation of the rotating shaft; and (e) driving and controlling the second motor, in order to enable the target power to be output to the drive shaft by utilizing power output from the engine and power input to and output from the second motor.

The sixth method of the present invention enables the power output from the engine to be subjected to torque conversion by the three shaft-type power input/output means and directly output to the drive shaft. This method can output the power from the engine to the drive shaft without any loss caused in the process of energy conversion that replaces part of the power output from the engine with electric power and further converts the electric power to the power in a different form. This method enables the difference between the power output from the engine and the target power to be supplied by the second motor, thereby allowing the target power to be output to the drive shaft.

DESCRIPTION OF THE PREFERRED EMBODIMENTS

The following describes power output apparatuses of first and second embodiments according to the present invention.

1. Power Output Apparatus 110 of First Embodiment (1) Structure

Figure 1:
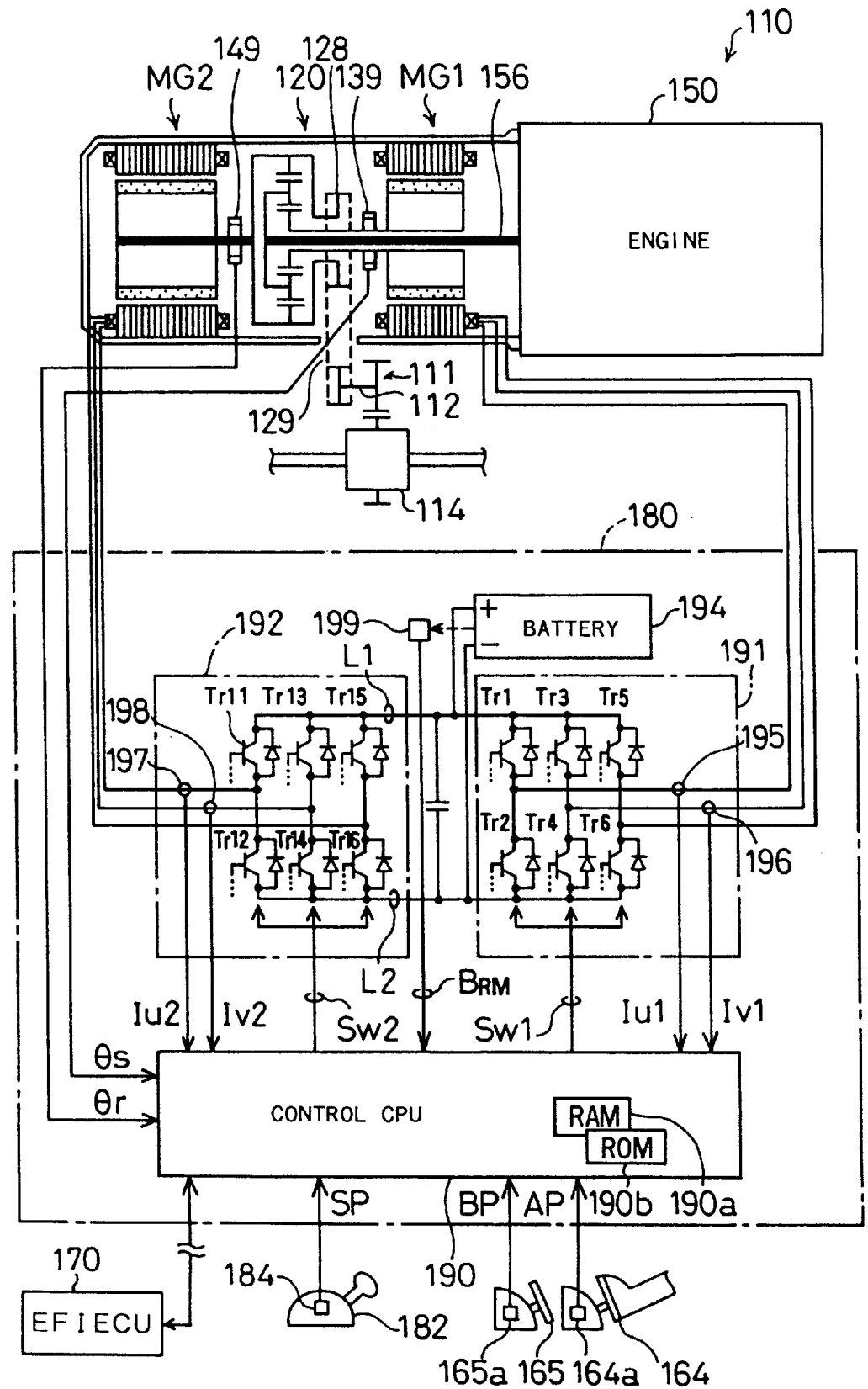
FIG. 1 schematically illustrates structure of a power output apparatus 110 as a first embodiment according to the present invention.
Figure 2:
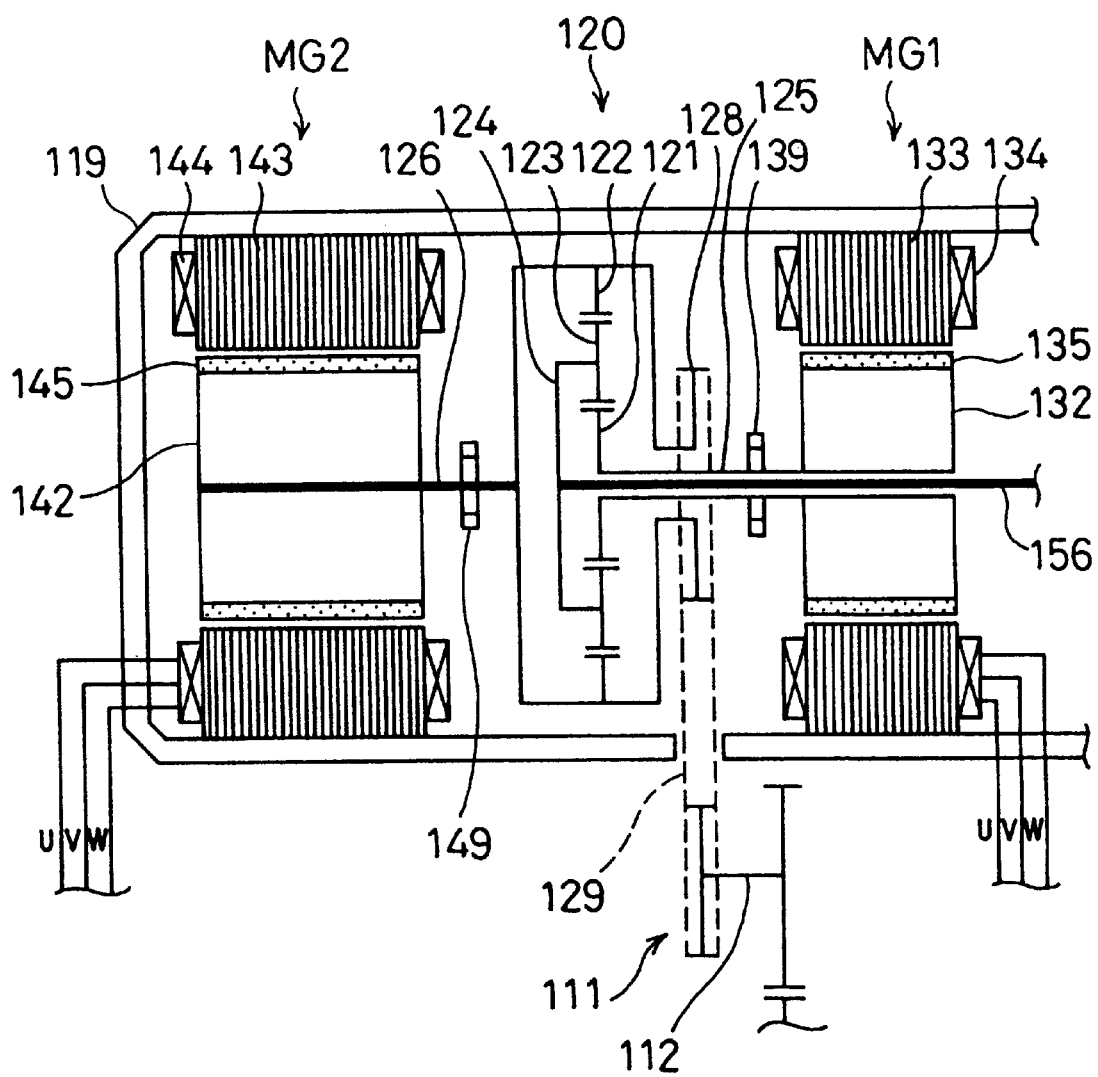
FIG. 2 is an enlarged view illustrating an essential part of the power output apparatus 110 of the first embodiment.
Figure 3:
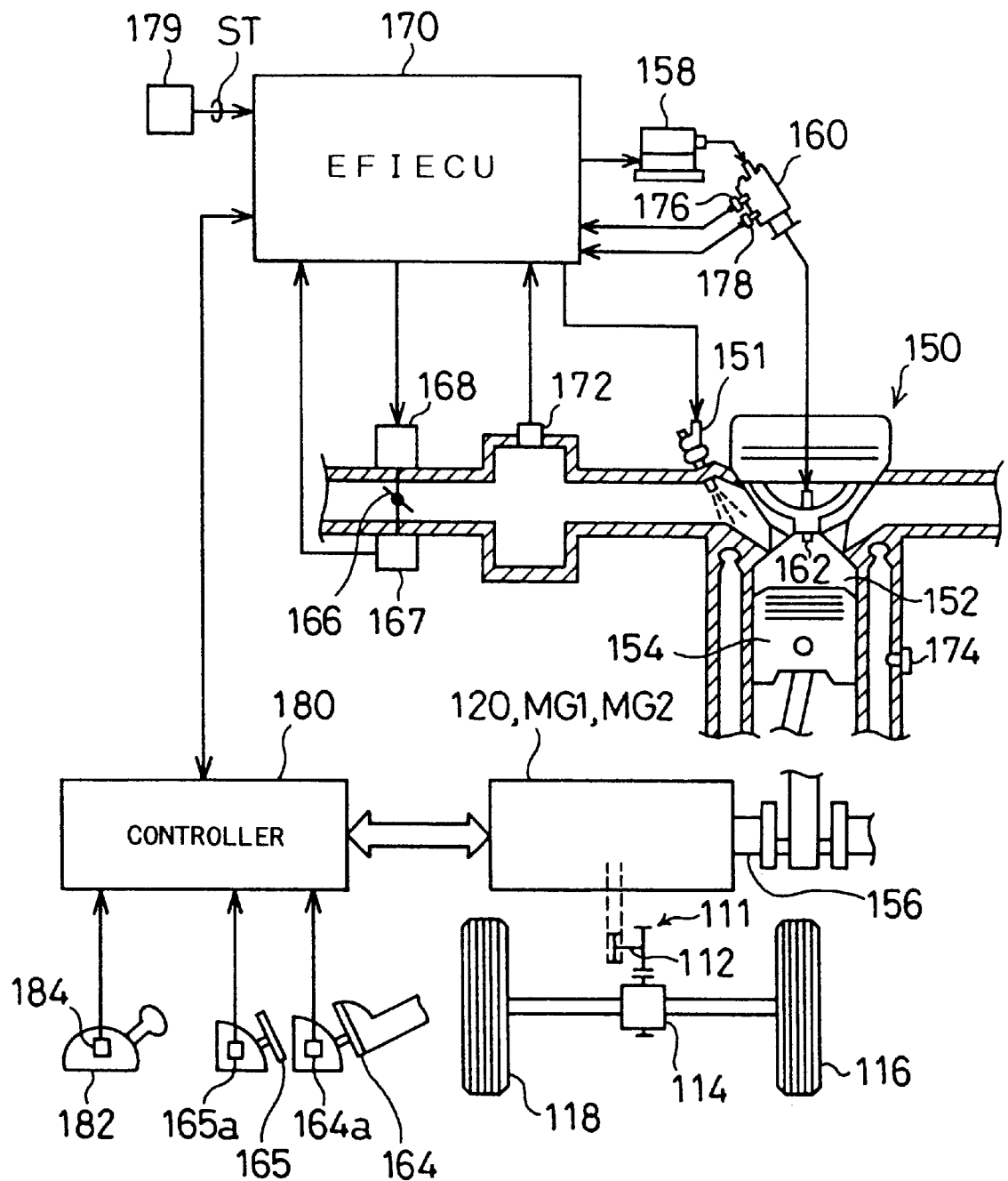
FIG. 3 is a schematic view illustrating general structure of a vehicle with the power output apparatus 110 of the first embodiment incorporated therein.

FIG. 1 schematically illustrates structure of a power output apparatus 110 as a first embodiment according to the present invention; FIG. 2 is an enlarged view illustrating an essential part of the power output apparatus 110 of FIG. 1; and FIG. 3 is a schematic view illustrating general structure of a vehicle with the power output apparatus 110 of FIG. 1 incorporated therein. The general structure of the vehicle is described first for the convenience of description.

Referring to FIG. 3, the vehicle is provided with an engine 150 which consumes gasoline as a fuel and outputs power. The air ingested from an air supply system via a throttle valve 166 is mixed with a fuel, that is, gasoline in this embodiment, injected from a fuel injection valve 151. The air/fuel mixture is supplied into a combustion chamber 152 to be explosively ignited and burned. Linear motion of a piston 154 pressed down by the explosion of the air/fuel mixture is converted to rotational motion of a crankshaft 156. The throttle valve 166 is driven to open and close by an actuator 168. An ignition plug 162 converts a high voltage applied from an igniter 158 via a distributor 160 to a spark, which explosively ignites and combusts the air/fuel mixture.

Operation of the engine 150 is controlled by an electronic control unit (hereinafter referred to as EFIECU) 170. The EFIECU 170 receives information from various sensors, which detect operating conditions of the engine 150. These sensors include a throttle valve position sensor 167 for detecting a valve travel or position of the throttle valve 166, a manifold vacuum sensor 172 for measuring a load applied to the engine 150, a water temperature sensor 174 for measuring the temperature of cooling water in the engine 150, and a speed sensor 176 and an angle sensor 178 mounted on the distributor 160 for measuring the revolving speed (the number of revolutions per a predetermined time period) and the rotational angle of the crankshaft 156. A starter switch 179 for detecting a starting condition ST of an ignition key (not shown) is also connected to the EFIECU 170. Other sensors and switches connecting with the EFIECU 170 are omitted from the illustration.

The crankshaft 156 of the engine 150 is mechanically linked with a power transmission gear 111, which has a drive shaft 112 as a rotating axis, via a planetary gear 120 and first and second motors MG1 and MG2 (described later in detail). The power transmission gear 111 is further linked with a differential gear 114, so that the power output from the power output apparatus 110 is eventually transmitted to left and right driving wheels 116 and 118. The first motor MG1 and the second motor MG2 are electrically connected to and controlled by a controller 180. The controller 180 includes an internal control CPU and receives inputs from a gearshift position sensor 184 attached to a gearshift 182, an accelerator position sensor 164a attached to an accelerator pedal 164, and a brake pedal position sensor 165a attached to a brake pedal 165, as described later in detail. The controller 180 sends and receives a variety of data and information to and from the EFIECU 170 through communication. Details of the control procedure including a communication protocol will be described later.

Referring to FIGS. 1 and 2, the power output apparatus 110 of the first embodiment primarily includes the engine 150, the planetary gear 120 having a planetary carrier 124 mechanically linked with the crankshaft 156 of the engine 150, the first motor MG1 linked with a sun gear 121 of the planetary gear 120, the second motor MG2 linked with a ring gear 122 of the planetary gear 120, and the controller 180 for driving and controlling the first and the second motors MG1 and MG2.

The following describes structure of the planetary gear 120 and the first and the second motors MG1 and MG2 based on the drawing of FIG. 2. The planetary gear 120 includes the sun gear 121 linked with a hollow sun gear shaft 125 which the crankshaft 156 passes through, the ring gear 122 linked with a ring gear shaft 126 coaxial with the crankshaft 156, a plurality of planetary pinion gears 123 arranged between the sun gear 121 and the ring gear 122 to revolve around the sun gear 121 while rotating on its axis, and the planetary carrier 124 connecting with one end of the crankshaft 156 to support the rotating shafts of the planetary pinion gears 123. In the planetary gear 120, three shafts, that is, the sun gear shaft 125, the ring gear shaft 126, and the crankshaft 156 respectively connecting with the sun gear 121, the ring gear 122, and the planetary carrier 124, work as input and output shafts of the power. Determination of the power input to or output from any two shafts among the three shafts automatically determines the power input to or output from the residual one shaft. The details of the input and output operations of the power into or from the three shafts of the planetary gear 120 will be discussed later.

A power feed gear 128 for taking out the power is linked with the ring gear 122 and arranged on the side of the first motor MG1. The power feed gear 128 is further connected to the power transmission gear 111 via a chain belt 129, so that the power is transmitted between the power feed gear 128 and the power transmission gear 111.

The first motor MG1 is constructed as a synchronous motor-generator and includes a rotor 132 having a plurality of permanent magnets 135 on its outer surface and a stator 133 having three-phase coils 134 wound thereon to form a revolving magnetic field. The rotor 132 is linked with the sun gear shaft 125 connecting with the sun gear 121 of the planetary gear 120. The stator 133 is prepared by laying thin plates of non-directional electromagnetic steel one upon another and is fixed to a casing 119. The first motor MG1 works as a motor for rotating the rotor 132 through the interaction between a magnetic field produced by the permanent magnets 135 and a magnetic field produced by the three-phase coils 134, or as a generator for generating an electromotive force on either ends of the three-phase coils 134 through the interaction between the magnetic field produced by the permanent magnets 135 and the rotation of the rotor 132. The sun gear shaft 125 is further provided with a resolver 139 for measuring its rotational angle $\theta s$.

Like the first motor MG1, the second motor MG2 is also constructed as a synchronous motor-generator and includes a rotor 142 having a plurality of permanent magnets 145 on its outer surface and a stator 143 having three-phase coils 144 wound thereon to form a revolving magnetic field. The rotor 142 is linked with the ring gear shaft 126 connecting with the ring gear 122 of the planetary gear 120, whereas the stator 14 is fixed to the casing 119. The stator 143 of the motor MG2 is also produced by laying thin plates of non-directional electromagnetic steel one upon another. Like the first motor MG1, the second motor MG2 also works as a motor or a generator. The ring gear shaft 126 is further provided with a resolver 149 for measuring its rotational angle $\theta r$.

The controller 180 for driving and controlling the first and the second motor MG1 and MG2 has the following configuration. Referring back to FIG. 1, the controller 180 includes a first driving circuit 191 for driving the first motor MG1, a second driving circuit 192 for driving the second motor MG2, a control CPU 190 for controlling both the first and the second driving circuits 191 and 192, and a battery 194 including a number of secondary cells. The control CPU 190 is a one-chip microprocessor including a RAM 190a used as a working memory, a ROM 190b in which various control programs are stored, an input/output port (not shown), and a serial communication port (not shown) through which data are sent to and received from the EFIECU 170. The control CPU 190 receives a variety of data via the input port. The input data include a rotational angle $\theta s$ of the sun gear shaft 125 measured with the resolver 139, a rotational angle $\theta r$ of the ring gear shaft 126 measured with the resolver 149, an accelerator pedal position AP (step-on amount of the accelerator pedal 164) output from the accelerator position sensor 164a, a brake pedal position BP (step-on amount of the brake pedal 165) output from the brake pedal position sensor 165a, a gearshift position SP output from the gearshift position sensor 184, values of currents Iu1 and Iv1 from two ammeters 195 and 196 disposed in the first driving circuit 191, values of currents Iu2 and Iv2 from two ammeters 197 and 198 disposed in the second driving circuit 192, and a remaining charge BRM of the battery 194 measured with a remaining charge meter 199. The remaining charge meter 199 may determine the remaining charge BRM of the battery 194 by any known method; for example, by measuring the specific gravity of an electrolytic solution in the battery 194 or the whole weight of the battery 194, by computing the currents and time of charge and discharge, or by causing an instantaneous short circuit between terminals of the battery 194 and measuring an internal resistance against the electric current.

The control CPU 190 outputs a first control signal SW1 for driving six transistors Tr1 through Tr6 working as switching elements of the first driving circuit 191 and a second control signal SW2 for driving six transistors Tr11 through Tr16 working as switching elements of the second driving circuit 192. The six transistors Tr1 through Tr6 in the first driving circuit 191 constitute a transistor inverter and are arranged in pairs to work as a source and a drain with respect to a pair of power lines L1 and L2. The three-phase coils (U,V,W) 134 of the first motor MG1 are connected to the respective contacts of the paired transistors in the first driving circuit 191. The power lines L1 and L2 are respectively connected to plus and minus terminals of the battery 194. The control signal SW1 output from the control CPU 190 thus successively controls the power-on time of the paired transistors Tr1 through Tr6. The electric currents flowing through the three-phase coils 134 undergo PWM (pulse width modulation) control to give quasi-sine waves, which enable the three-phase coils 134 to form a revolving magnetic field.

The six transistors Tr11 through Tr16 in the second driving circuit 192 also constitute a transistor inverter and are arranged in the same manner as the transistors Tr1 through Tr6 in the first driving circuit 191. The three-phase coils (U,V,W) 144 of the second motor MG2 are connected to the respective contacts of the paired transistors in the second driving circuit 192. The second control signal SW2 output from the control CPU 190 thus successively controls the power-on time of the paired transistors Tr11 through Tr16. The electric currents flowing through the three-phase coils 144 undergo PWM control to give quasi-sine waves, which enable the three-phase coils 144 to form a revolving magnetic field.

(2) Principle of Operation

Figure 4:
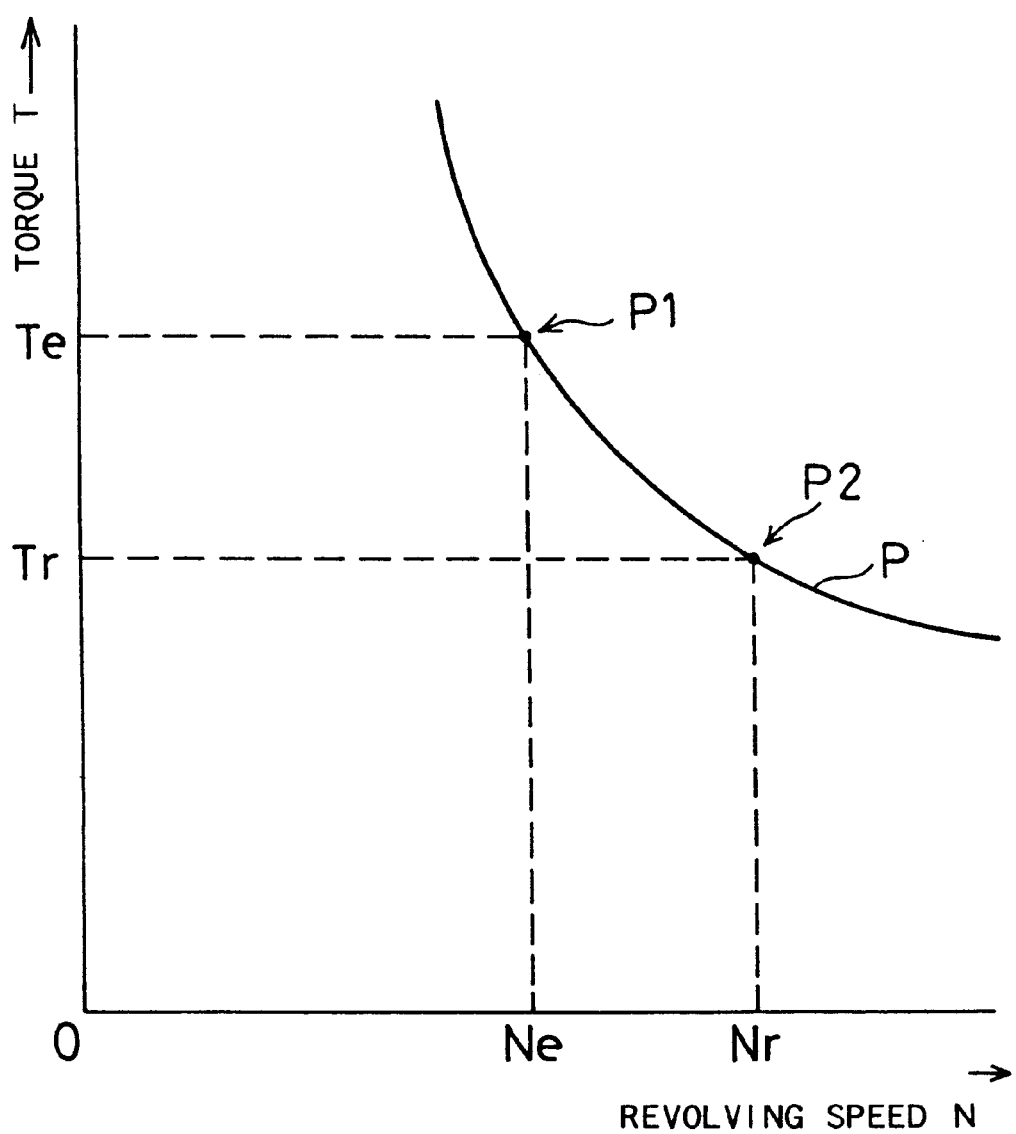
FIG. 4 is a graph showing the operation principle of the power output apparatus 110 of the first embodiment.

The power output apparatus 110 of the first embodiment thus constructed works in accordance with the operation principles discussed below, especially with the principle of torque conversion. By way of example, it is assumed that the engine 150 is driven at a driving point P1 of the revolving speed Ne and the torque Te and that the ring gear shaft 126 is driven at another driving point P2, which is defined by another revolving speed Nr and another torque Tr but gives an amount of energy identical with an energy Pe output from the engine 150. This means that the power output from the engine 150 is subjected to torque conversion and applied to the ring gear shaft 126. The relationship between the torque and the revolving speed of the engine 150 and the ring gear shaft 126 under such conditions is shown in the graph of FIG. 4.

Figure 5:
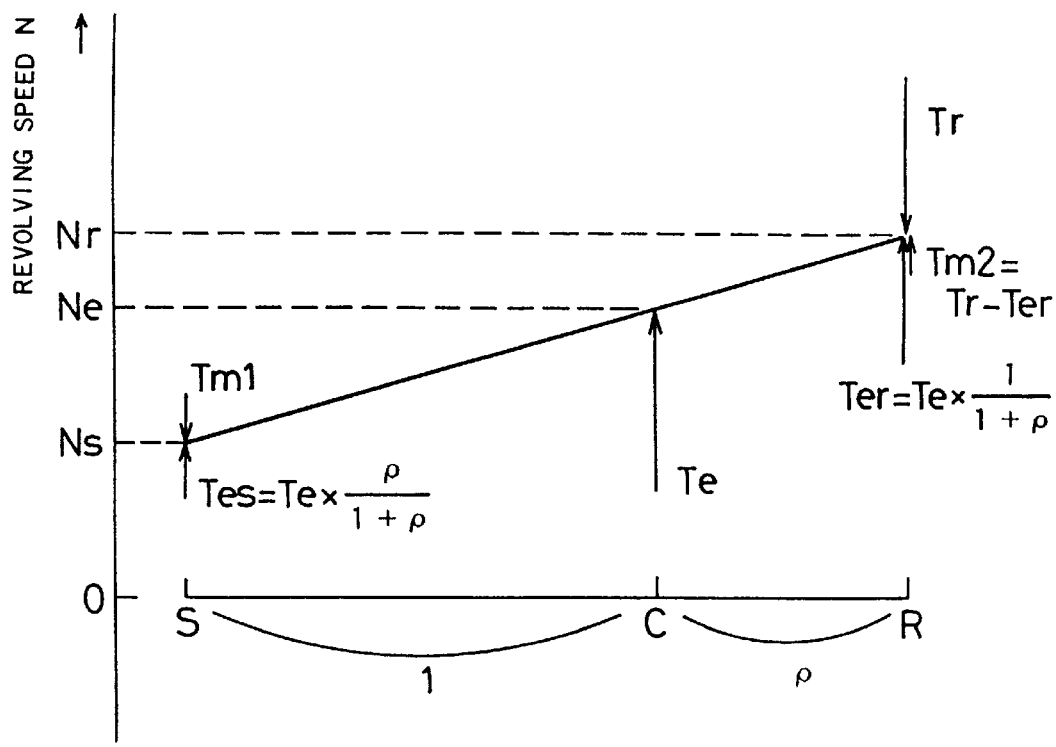
FIG. 5 is a nomogram showing the relationship between the revolving speed and the torque on the three shafts linked with the planetary gear 120 in the power output apparatus 110 of the first embodiment.
Figure 6:
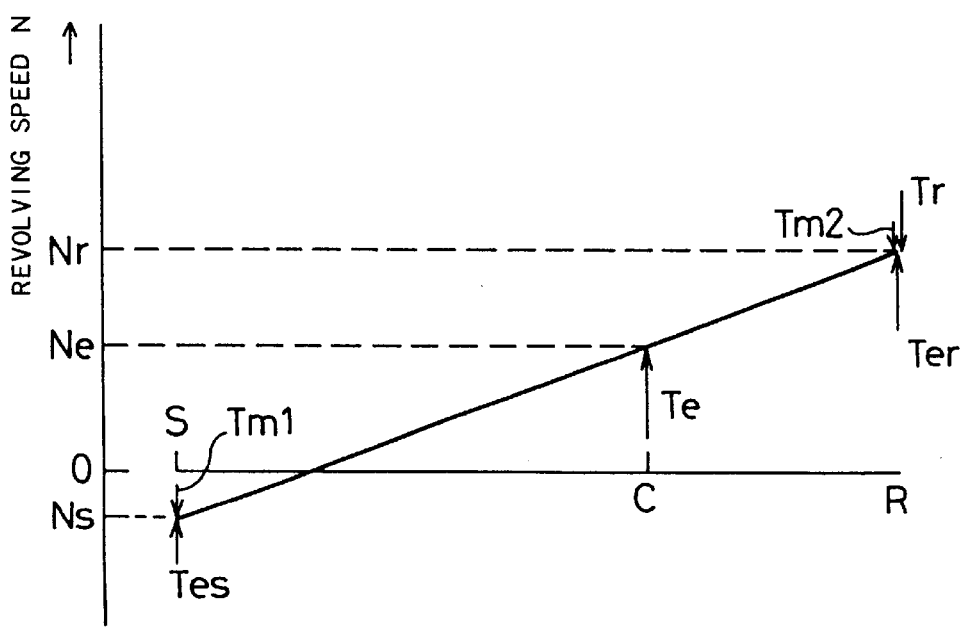
FIG. 6 is a nomogram showing the relationship between the revolving speed and the torque on the three shafts linked with the planetary gear 120 in the power output apparatus 110 of the first embodiment.

According to the mechanics, the relationship between the revolving speed and the torque of the three shafts in the planetary gear 120 (that is, the sun gear shaft 125, the ring gear shaft 126, and the planetary carrier 124) can be expressed as nomograms illustrated in FIGS. 5 and 6 and solved geometrically. The relationship between the revolving speed and the torque of the three shafts in the planetary gear 120 may be analyzed numerically through calculation of energies of the respective shafts, without using the nomograms. For the clarity of explanation, the nomograms are used in the first embodiment.

In the graph of FIG. 5, the revolving speed of the three shafts is plotted as ordinate and the positional ratio of the coordinate axes of the three shafts as abscissa. When a coordinate axis S of the sun gear shaft 125 and a coordinate axis R of the ring gear shaft 126 are positioned on either ends of a line segment, a coordinate axis C of the planetary carrier 124 is given as an interior division of the axes S and R at the ratio of 1 to $\rho$, where $\rho$ represents a ratio of the number of teeth of the ring gear 122 to that of the sun gear 121 and expressed as Equation (1) given below:

$$\rho = \frac{\text{the number of teeth of the sun gear}}{\text{the number of teeth of the ring gear}} \quad (1)$$

As mentioned above, the engine 150 is driven at the revolving speed Ne, while the ring gear shaft 126 is driven at the revolving speed Nr. The revolving speed Ne of the engine 150 can thus be plotted on the coordinate axis C of the planetary carrier 124 linked with the crankshaft 156 of the engine 150, and the revolving speed Nr of the ring gear shaft 126 on the coordinate axis R of the ring gear shaft 126. A straight line passing through both the points is drawn, and a revolving speed Ns of the sun gear shaft 125 is then given as the intersection of this straight line and the coordinate axis S. This straight line is hereinafter referred to as dynamic collinear line. The revolving speed Ns of the sun gear shaft 125 can be calculated from the revolving speed Ne of the engine 150 and the revolving speed Nr of the ring gear shaft 126 according to a proportional expression given as Equation (2) below. In the planetary gear 120, the determination of the rotations of the two gears among the sun gear 121, the ring gear 122, and the planetary carrier 124 results in automatically setting the rotation of the residual one gear.

$$Ns = Nr - (Nr - Ne)\frac{1+\rho}{\rho} \quad (2)$$

The torque Te of the engine 150 is then applied (upward in the drawing) to the dynamic collinear line on the coordinate axis C of the planetary carrier 124 functioning as a line of action. The dynamic collinear line against the torque can be handled as a rigid body to which a force is applied as a vector. Based on the technique of dividing the force into different lines of action having the same directions the torque Te acting on the coordinate axis C is divided into a torque Tes on the coordinate axis S and a torque Ter on the coordinate axis R. The magnitudes of the torques Tes and Ter are given by Equations (3) and (4) below:

$$Tes = Te \times \frac{\rho}{1+\rho} \quad (3)$$

$$Ter = Te \times \frac{1}{1+\rho} \quad (4)$$

The equilibrium of forces on the dynamic collinear line is essential for the stable state of the dynamic collinear line. In accordance with a concrete procedure, a torque Tm1 having the same magnitude as but the opposite direction to the torque Tes is applied to the coordinate axis S, whereas a torque Tm2 having the same magnitude as but the opposite direction to a resultant force of the torque Ter and the torque that has the same magnitude as but the opposite direction to the torque Tr output to the ring gear shaft 126 is applied to the coordinate axis R. The torque Tm1 is given by the first motor MG1, and the torque Tm2 by the second motor MG2. The first motor MG1 applies the torque Tm1 in reverse of its rotation and thereby works as a generator to regenerate an electrical energy Pm1, which is given as the product of the torque Tm1 and the revolving speed Ns, from the sun gear shaft 125. The second motor MG2 applies the torque Tm2 in the direction of its rotation and thereby works as a motor to output an electrical energy or power Pm2, which is given as the product of the torque Tm2 and the revolving speed Nr, to the ring gear shaft 126.

In case that the electrical energy Pm1 is identical with the electrical energy Pm2, all the electric power consumed by the second motor MG2 can be supplied by the electric power regenerated by the first motor MG1. In order to attain such a state, all the input energy should be output; that is, the energy Pe output from the engine 150 should be equal to an energy Pr output to the ring gear shaft 126. Namely the energy Pe expressed as the product of the torque Te and the revolving speed Ne is made equal to the energy Pr expressed as the product of the torque Tr and the revolving speed Nr.

Referring to FIG. 4, the power that is expressed as the product of the torque Te and the revolving speed Ne and output from the engine 150 driven at the driving point P1 is subjected to torque conversion and output to the ring gear shaft 126 as the power of the same energy but expressed as the product of the torque Tr and the revolving speed Nr. As discussed previously, the power output to the ring gear shaft 126 is transmitted to a drive shaft 112 via the power feed gear 128 and the power transmission gear 111, and further transmitted to the driving wheels 116 and 118 via the differential gear 114. A linear relationship is accordingly held between the power output to the ring gear shaft 126 and the power transmitted to the driving wheels 116 and 118. The power transmitted to the driving wheels 116 and 118 can thus be controlled by adjusting the power output to the ring gear shaft 126.

Although the revolving speed Ns of the sun gear shaft 125 is positive in the nomogram of FIG. 5, it may be negative according to the revolving speed Ne of the engine 150 and the revolving speed Nr of the ring gear shaft 126 as shown in the nomogram of FIG. 6. In the latter case, the first motor MG1 applies the torque in the direction of its rotation and thereby works as a motor to consume the electrical energy Pm1 given as the product of the torque Tm1 and the revolving speed Ns. The second motor MG2, on the other hand, applies the torque in reverse of its rotation and thereby works as a generator to regenerate the electrical energy Pm2, which is given as the product of the torque Tm2 and the revolving speed Nr, from the ring gear shaft 126. In case that the electrical energy Pm1 consumed by the first motor MG1 is made equal to the electrical energy Pm2 regenerated by the second motor MG2 under such conditions, all the electric power consumed by the first motor MG1 can be supplied by the electric power regenerated by the second motor MG2.

The operation principle discussed above is on the assumption that the efficiency of power conversion by the planetary gear 120, the motors MG1 and MG2, and the transistors Tr1 through Tr16 is equal to the value '1', which represents 100%. In the actual state, however, the conversion efficiency is less than the value '1', and it is required to make the energy Pe output from the engine 150 a little greater than the energy Pr output to the ring gear shaft 126 or alternatively to make the energy Pr output to the ring gear shaft 126 a little smaller than the energy Pe output from the engine 150. By way of example, the energy Pe output from the engine 150 may be calculated by multiplying the energy Pr output to the ring gear shaft 126 by the reciprocal of the conversion efficiency. In the state of the nomogram of FIG. 5, the torque Tm2 of the second motor MG2 may be calculated by multiplying the electric power regenerated by the first motor MG1 by the efficiencies of both the motors MG1 and MG2. In the state of the nomogram of FIG. 6, on the other hand, the torque Tm2 of the second motor MG2 may be calculated by dividing the electric power consumed by the first motor MG1 by the efficiencies of both the motors MG1 and MG2. In the planetary gear 120, there is an energy loss or heat loss due to a mechanical friction or the like, though the amount of energy loss is significantly small, compared with the whole amount of energy concerned. The efficiency of the synchronous motors used as the first and the second motors MG1 and MG2 is very close to the value '1'. Known devices such as GTOs applicable to the transistors Tr1 through Tr16 have extremely small ON-resistance. The efficiency of power conversion is thus practically equal to the value '1'. For the matter of convenience, in the following discussion of the embodiment, the efficiency is considered equal to the value '1' (=100%), unless otherwise specified.

The above description refers to the fundamental operation of the power output apparatus 110 of the first embodiment. The power output apparatus 110 can, however, perform other operations as well as the above fundamental operation that carries out the torque conversion for all the power output from the engine 150 and outputs the converted torque to the ring gear shaft 126. The possible operations include an operation of adding electrical energy stored in the battery 194 to the power output from the engine 150 and outputting the total energy to the ring gear shaft 126 and another operation of storing part of the power output from the engine 150 into the battery 194 as electrical energy. These alternative operations will be discussed later.

(3) Operation Control

Figure 7:
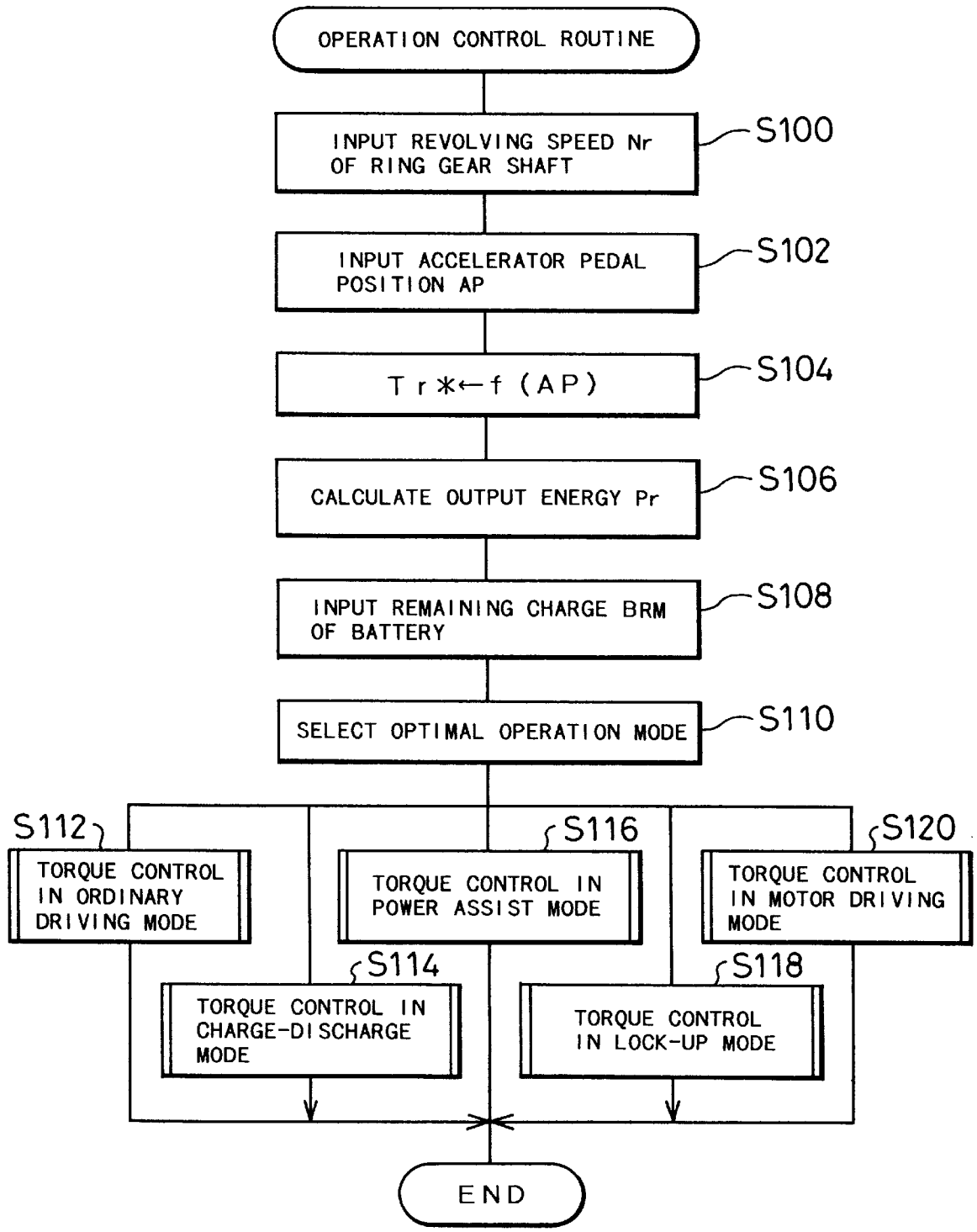
FIG. 7 is a flowchart showing an operation control routine executed by the control CPU 190 of the controller 180.

FIG. 7 is a flowchart showing an operation control routine executed to control the operation of the power output apparatus 110 of the first embodiment constructed as discussed above. When the program enters the operation control routine of FIG. 7, the control CPU 190 of the controller 180 first reads the revolving speed Nr of the ring gear shaft 126 at step S100. The revolving speed Nr of the ring gear shaft 126 may be calculated from the rotational angle θr of the ring gear shaft 126 read from the resolver 149. The control CPU 190 then reads the accelerator pedal position AP detected by the accelerator position sensor 164a at step S102. The driver steps on the accelerator pedal 164 when feeling insufficiency of the output torque. The value of the accelerator pedal position AP accordingly represents the desired output torque (that is, the torque to be output to the driving wheels 116 and 118) which the driver requires.

Figure 8:
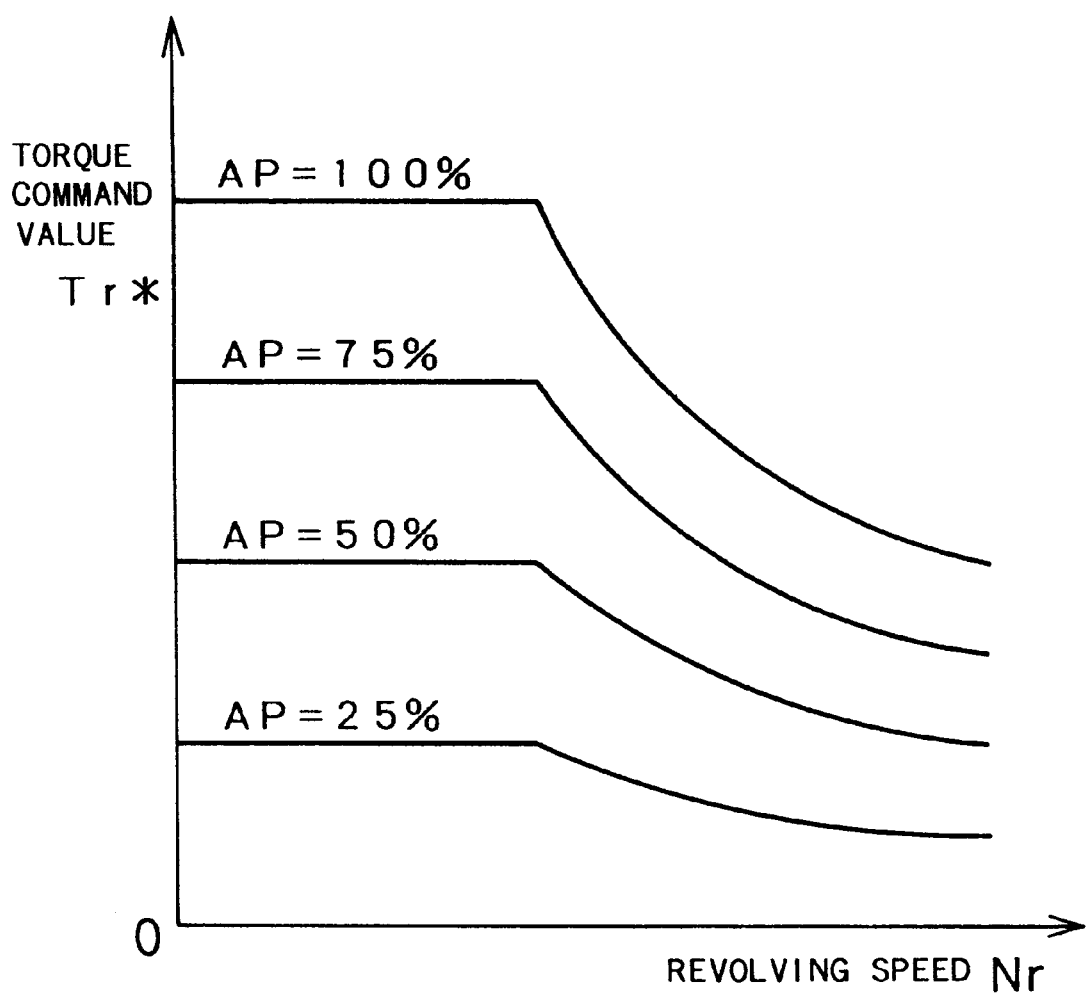
FIG. 8 is a map showing the relationship between the torque command value Tr*, the revolving speed Nr, and the accelerator pedal position AP.

The control CPU 190 subsequently determines a torque command value Tr* or a target torque to be output to the ring gear shaft 126, based on the input accelerator pedal position AP at step S104. Not the torque to be output to the driving wheels 116 and 118 but the torque to be output to the ring gear shaft 126 is calculated here from the accelerator pedal position AP. This is because the ring gear shaft 126 is mechanically linked with the driving wheels 116 and 118 via the power feed gear 128, the power transmission gear 111, and the differential gear 114 and the determination of the torque to be output to the ring gear shaft 126 thus results in determining the torque to be output to the driving wheels 116 and 118. In this embodiment, a map representing the relationship between the torque command value Tr*, the revolving speed Nr of the ring gear shaft 126, and the accelerator pedal position AP is prepared in advance and stored in the ROM 190b. The torque command value Tr* corresponding to the input accelerator pedal position AP and the input revolving speed Nr of the ring gear shaft 126 is read from the map. An example of such maps is shown in FIG. 8.

At subsequent step S106, the control CPU 190 calculates an energy Pr to be output to the ring gear shaft 126 from the torque command value Tr* thus obtained and the input revolving speed Nr of the ring gear shaft 126 (Pr=Tr*×Nr). The program then proceeds to step S108 to read the remaining charge BRM of the battery 194 measured with the remaining charge meter 199 and to step S110 to determine the operation mode. The determination of the operation mode is carried out according to an operation mode determination routine shown in the flowchart of FIG. 9. The operation mode determination routine selects an optimal operation mode of the power output apparatus 110 under the current conditions based on the data read or calculated at steps S100 through S108 in the operation control routine of FIG. 7. The following describes a concrete procedure of determining the operation mode, based on the operation mode determination routine of FIG. 9.

When the program enters the operation mode determination routine, the control CPU 190 of the controller 180 first determines whether or not the remaining charge BRM of the battery 194 is within a specific range defined by a first threshold value BL and a second threshold value BH at step S130. When the remaining charge BRM is out of the specific range, the program determines the necessity for charge or discharge of the battery 194 and proceeds to step S132, at which a charge-discharge mode is selected as the optimal operation mode of the power output apparatus 110. The first threshold value BL and the second threshold value BH respectively represent a lower limit and an upper limit of the remaining charge BRM of the battery 194. In this embodiment, the first threshold value BL is set to be not less than a required amount of electric power for continuing the operation only with the second motor MG2 in a motor driving mode (described later) or the addition of electric power discharged from the battery 194 in a power assist mode (described later) for a predetermined time period. The second threshold value BH is, on the other hand, set to be not greater than a value obtained by subtracting an amount of electric power that is regenerated by the first motor MG1 or the second motor MG2 when the vehicle stops from an ordinary running state, from the remaining charge BRM under the condition of full charge of the battery 194.

When the remaining charge BRM of the battery 194 is determined to be within the specific range defined by the first threshold value BL and the second threshold value BH at step S130, on the contrary, the program proceeds to step S134, at which the energy Pr to be output to the ring gear shaft 126 is compared with a maximum energy Pemax that can be output from the engine 150. When the energy Pr exceeds the maximum energy Pemax, the program determines the necessity for supplementing the insufficiency of the maximum energy Pemax output from the engine 150 by the energy stored in the battery 194 and proceeds to step S136, at which a power assist mode is selected as the optimal operation mode of the power output apparatus 110.

Figure 10:
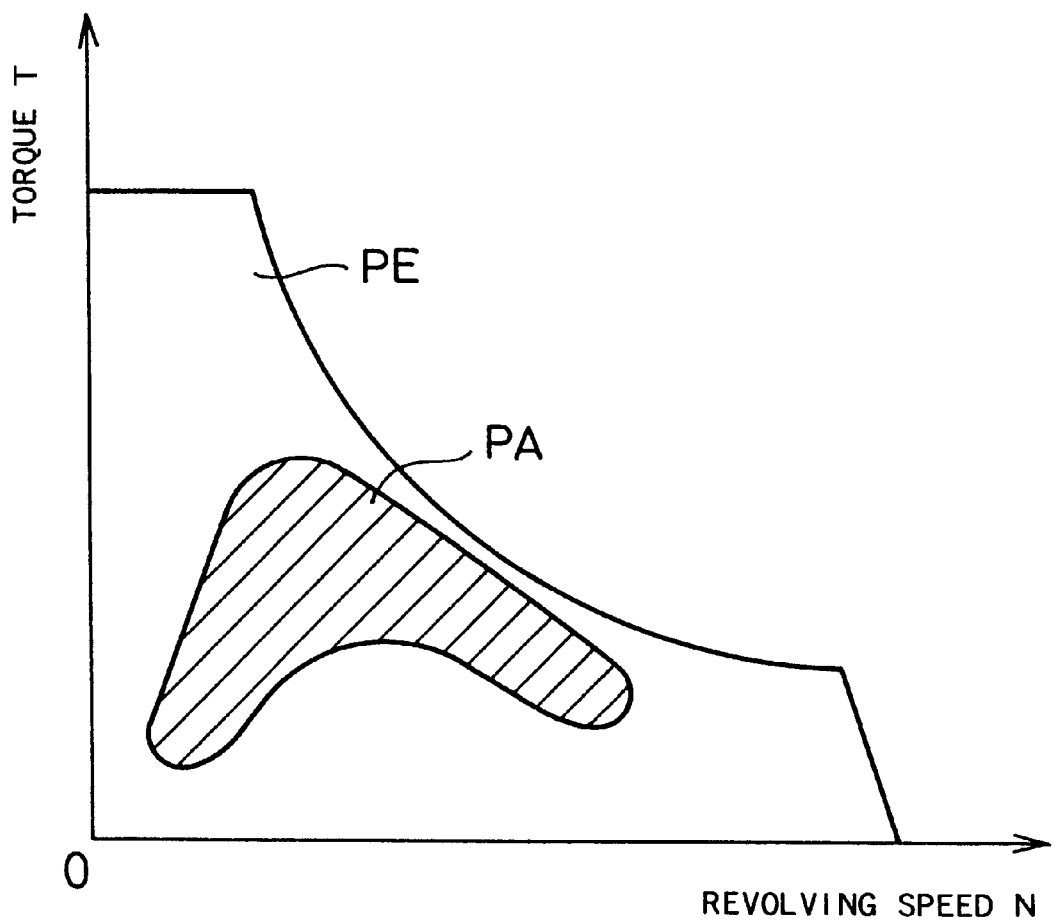
FIG. 10 shows an efficient operable range of the engine 150.

When the energy Pr to be output to the ring gear shaft 126 is equal to or less than the maximum energy Pemax that can be output from the engine 150 at step S134, on the other hand, the program goes to step S138, at which it is determined whether or not the torque command value Tr* and the revolving speed Nr are within a predetermined range. When the torque command value Tr* and the revolving speed Nr are within the predetermined range, a lock-up mode, in which rotation of the sun gear shaft 125 is at a stop, is selected as the optimal operation mode of the power output apparatus 110 at step S140. The predetermined range herein represents a specific range that allows the engine 150 to be driven at a high efficiency while the sun gear 121 stops its rotation. In accordance with a concrete procedure, the relationship between the revolving speed of the ring gear shaft 126 and the torque output to the ring gear shaft 126 when the engine 150 is driven at respective driving points within the specific range, which allows the engine 150 to be driven at a high efficiency while the sun gear 121 stops its operation, is prepared in advance and stored as a map in the ROM 190b. It is accordingly determined at step S138 whether or not the driving point defined by the torque command value Tr* and the revolving speed Nr is within the range of the map. The specific range that allows the engine 150 to be driven at a high efficiency is illustrated as an example in FIG. 10. In the drawing of FIG. 10, the engine 150 can be driven in a range PE, whereas the engine 150 can be driven at a high efficiency in a range PA. The range PA depends upon the driving efficiency of the engine 150, the emission, and the other conditions and can be set in advance experimentally.

When it is determined that the torque command value Tr* and the revolving speed Nr of the ring gear shaft 126 are out of the predetermined range at step S138, the program further proceeds to step S142, at which it is determined whether or not the energy Pr to be output to the ring gear shaft 126 is smaller than a predetermined energy PML and whether or not the revolving speed Nr of the ring gear shaft 126 is lower than a predetermined revolving speed NML. When both the answers are YES at step S142, the program goes to step S144 to set a motor driving mode, in which only the second motor MG2 is driven, as the optimal operation mode of the power output apparatus 110. The engine 150 lowers its efficiency under the condition of low revolving speed and small torque. The predetermined energy PML and the predetermined revolving speed NML accordingly define a certain range, in which the driving efficiency of the engine 150 is smaller than a predetermined level. The concrete values of PML and NML are determined by taking into account the properties of the engine 150 and the gear ratio of the planetary gear 120. When the energy Pr is not less than the predetermined energy PML or when the revolving speed Nr is not lower than the predetermined revolving speed NML at step S142, the program proceeds to step S146, at which an ordinary driving mode is selected as the optimal operation mode of the power output apparatus 110 for ordinary driving.

Figure 9:
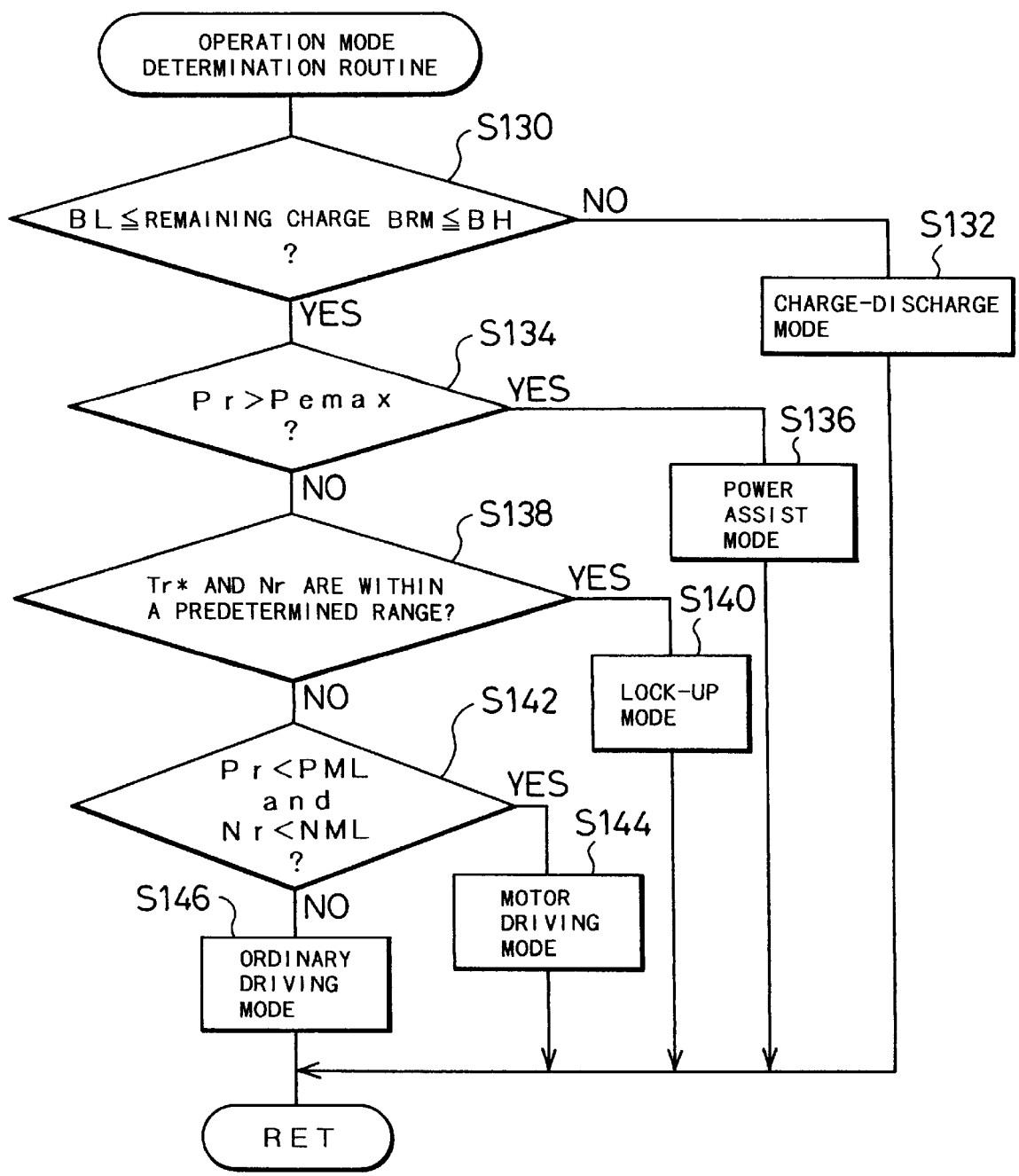
FIG. 9 is a flowchart showing an operation mode determination routine executed by the control CPU 190 of the controller 180.

Referring back to the operation control routine of FIG. 7, required processing is carried out, based on the results of the operation mode determination routine of FIG. 9. When the ordinary driving mode is selected as the optimal operation mode at step S110, a process of controlling the torque in the ordinary driving mode is executed at step S112. When the charge-discharge mode is selected, a process of controlling the torque in the charge-discharge mode is executed at step S114. When the power assist mode is selected, a process of controlling the torque in the power assist mode is executed at step S116. When the lock-up mode is selected, a process of controlling the torque in the lock-up mode is executed at step S118. When the motor driving mode is selected, a process of controlling the torque in the motor driving mode is executed at step S120. The following describes concrete procedures of such toque control processes.

(4) Process of Controlling Torque in Ordinary Driving Mode

Figure 11:
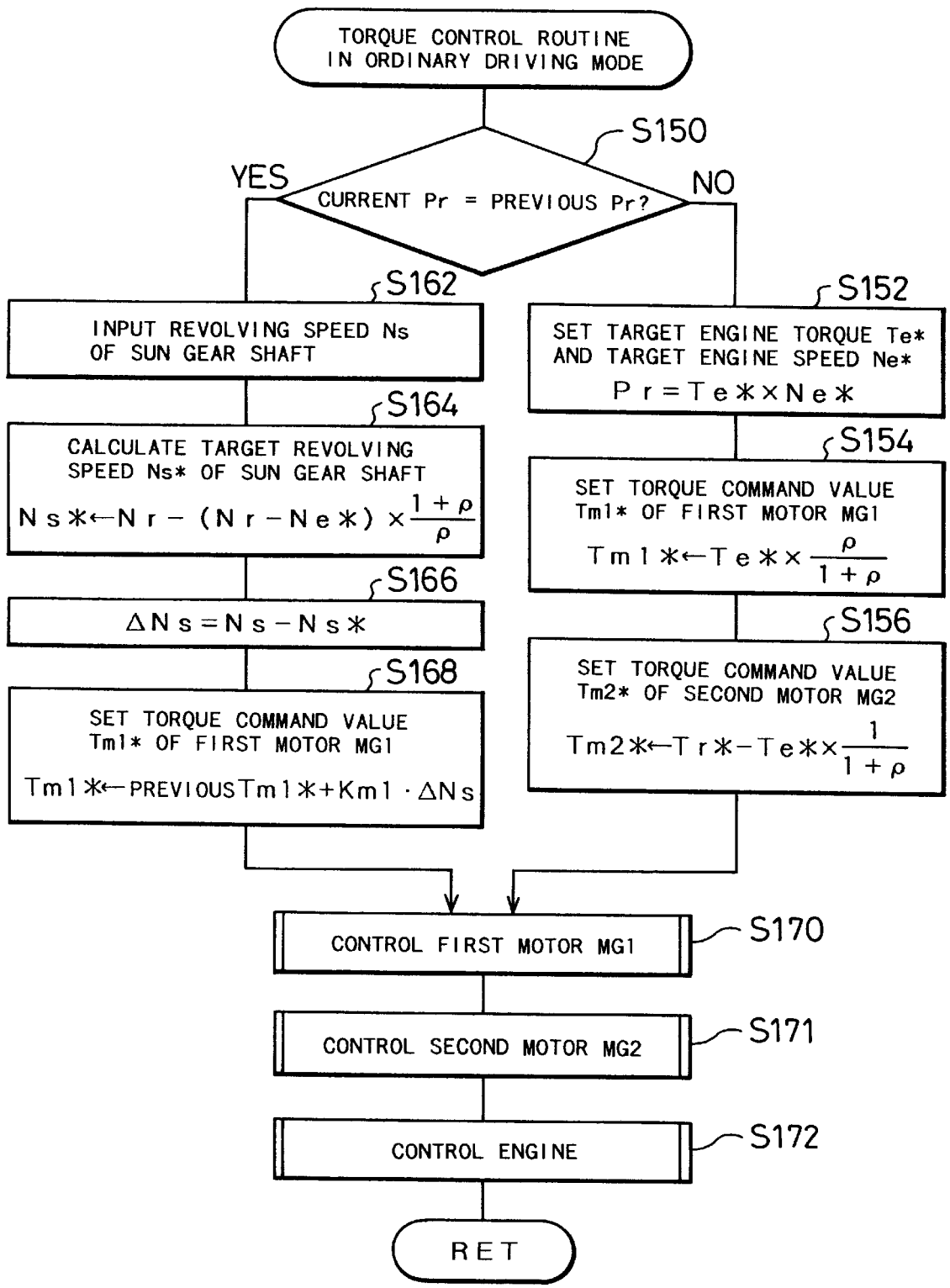
FIG. 11 is a flowchart showing a torque control routine in the ordinary driving mode executed by the control CPU 190 of the controller 180.

The torque control in the ordinary driving mode at step S112 in the flowchart of FIG. 7 is carried out according to a routine of controlling the torque in the ordinary driving mode shown in the flowchart of FIG. 11. When the program enters the routine of FIG. 11, at step S150, the control CPU 190 of the controller 180 first compares the current value of energy Pr to be output to the ring gear shaft 126 with a previous value of energy Pr used in the previous cycle of this routine. The 'previous cycle' herein represents the last time when the torque control routine in the ordinary driving mode shown in FIG. 11 is activated as the processing of step S112 is continuously executed in the operation control routine of FIG. 7. When the current value of energy Pr is different from the previous value of energy Pr, the program executes the processing of steps S152 through S156 and steps S170 through S172. When the current value of energy Pr is identical with the previous value of energy Pr, on the other hand, the program executes the processing of steps S162 through S172. The following describes first the processing when the current value of energy Pr is different from the previous value of energy Pr and then the processing when the current value of energy Pr is identical with the previous value of energy Pr.

When the current value of energy Pr is different from the previous value of energy Pr, the control CPU 190 sets a target engine torque Te* and a target engine speed Ne* of the engine 150 based on the current value of energy Pr to be output to the ring gear shaft 126 at step S152. The energy supplied from the engine 150 is equal to the product of the torque Te and the revolving speed Ne of the engine 150, so that the relationship between the energy Pr, the target engine torque Te*, and the target engine speed Ne* can be defined as Pr=Te*×Ne*. There are, however, numerous combinations of the target engine torque Te* and the target engine speed Ne* of the engine 150 satisfying the above relationship. In this embodiment, favorable combinations of the target torque Te* and the target revolving speed Ne* of the engine 150 are experimentally or otherwise determined in advance for the respective amounts of energy Pr. In such favorable combinations, the engine 150 is driven at the highest possible efficiency and the driving state of the engine 150 is smoothly varied with a variation in amount of energy Pr. The predetermined favorable combinations are stored in the form of a map in the ROM 190b. In practice, the combination of the target torque Te* and the target revolving speed Ne* of the engine 150 corresponding to the amount of energy Pr is read from the map at step S152. The following gives a further description of the map.

Figure 12:
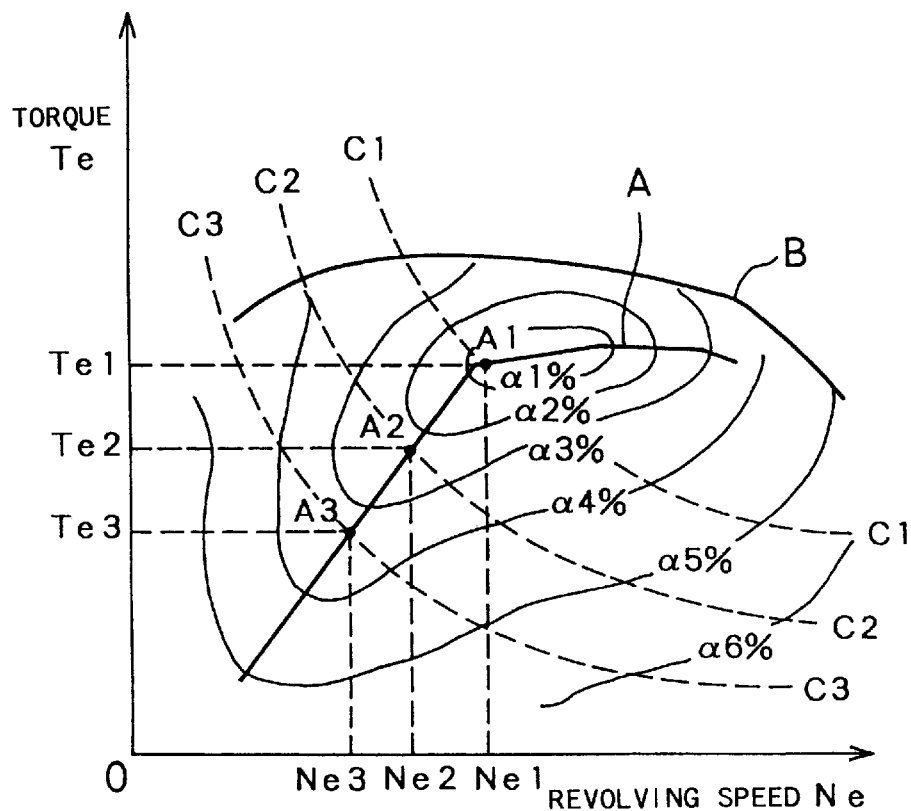
FIG. 12 is a graph illustrating the relationship between the driving point and the efficiency of the engine 150.

FIG. 12 is a graph showing the relationship between the driving point of the engine 150 (defined by the engine torque Te and the engine speed Ne) and the efficiency of the engine 150. The curve B in FIG. 12 represents a boundary of an engine-operable range, in which the engine 150 can be driven. In the engine-operable range, efficiency curves, such as curves α1 through α6, can be drawn by successively joining the driving points having the identical efficiency. In the engine-operable range, constant energy curves expressed as the product of the torque Te and the revolving speed Ne, such as curves C1—C1 through C3—C3, can also be drawn. The graph of FIG. 13 shows the efficiency of the respective driving points along the constant energy curves C1—C1 through C3—C3 plotted against the revolving speed Ne of the engine 150.

Figure 13:
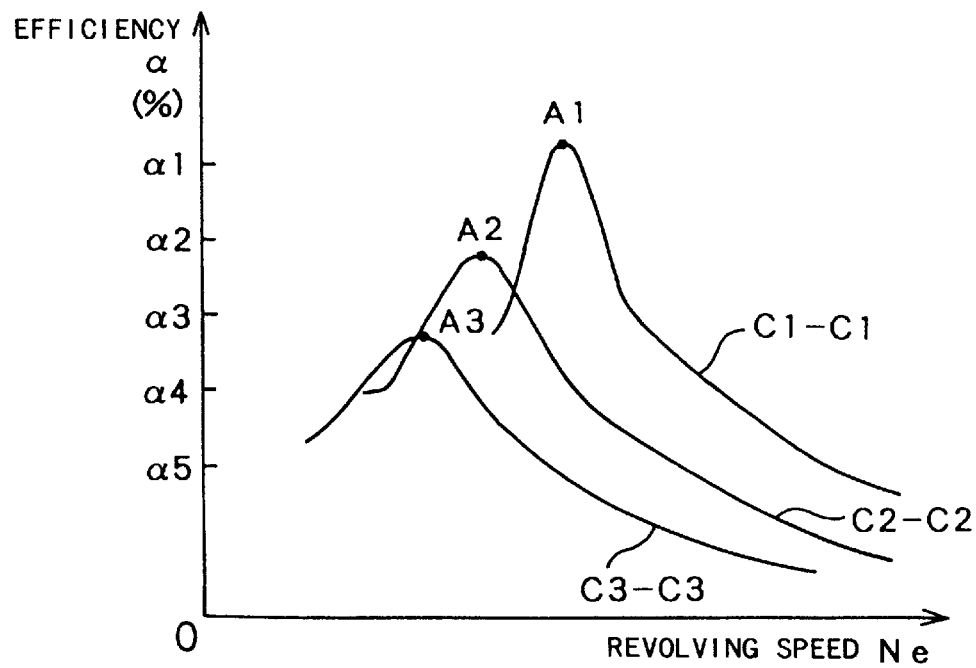
FIG. 13 is a graph showing the efficiencies of the engine 150 at various driving points along the constant-output energy curves, which are plotted against the revolving speed Ne of the engine 150.

Referring to FIG. 13, the efficiency of the engine 150 with respect to the same output energy is significantly varied by the driving point of the engine 150. On the constant energy curve C1—C1, for example, the efficiency of the engine 150 reaches its maximum when the engine 150 is driven at a driving point A1 (torque Te1 and revolving speed Ne1). Such a driving point attaining the highest possible efficiency exists on each constant energy curve; a driving point A2 for the constant energy curve C2—C2 and a driving point A3 for the constant energy curve C3—C3. The curve A in FIG. 12 is obtained by joining such driving points attaining the highest possible efficiency of the engine 150 for the respective amounts of energy Pr by a continuous curve. In this embodiment, the map representing the relationship between each driving point (torque Te and revolving speed Ne) on the curve A and the amount of energy Pr is used at step S152 in the flowchart of FIG. 11 for setting the target torque Te* and the target revolving speed Ne* of the engine 150.

The curve A should be continuous because of the following reason. In case that discontinuous curves are used to set the driving points of the engine 150 against a variation in amount of energy Pr, the driving state of the engine 150 is abruptly varied with a variation in amount of energy Pr crossing over the discontinuous driving points. The abrupt variation may prevent the driving state from being smoothly shifted to a target level, thereby knocking or even stopping the vehicle. Each driving point on the continuous curve A may accordingly not correspond to the driving point attaining the highest possible efficiency on the constant energy curve.

After setting the target torque Te* and the target revolving speed Ne* of the engine 150 at step S152, the control CPU 190 calculates a torque command value Tm1* of the first motor MG1 from the target engine torque Te* and the gear ratio ρ according to Equation (5) given below at step S154, and calculates a torque command value Tm2* of the second motor MG2 from the torque command value Tr*, the target engine torque Te*, and the gear ratio ρ according to Equation (6) given below at step S156. Equations (5) and (6) can determine the torque command values Tm1* and Tm2*, because of the balance on the dynamic collinear line as discussed above in the nomograms of FIGS. 5 and 6.

$$Tm1^* \leftarrow Te^* \times \frac{\rho}{1+\rho} \quad (5)$$

$$Tm2^* \leftarrow Tr^* - Tc^* \times \frac{1}{1+\rho} \quad (6)$$

After setting the target torque Te* and the target revolving speed Ne* of the engine 150 and the torque command values Tm1* and Tm2* of the first and the second motors MG1 and MG2, the program proceeds to steps S170, S171, and S172 to control the first motor MG1, the second motor MG2, and the engine 150. As a matter of convenience of illustration, the control operations of the first motor MG1, the second motor MG2, and the engine 150 are shown as separate steps. In the actual procedure, however, these control operations are carried out simultaneously. By way of example, the control CPU 190 simultaneously controls the first motor MG1 and the second motor MG2 by utilizing an interrupting process, while transmitting an instruction to the EFIECU 170 through communication in order to allow the EFIECU 170 to control the engine 150 concurrently.

Figure 14:
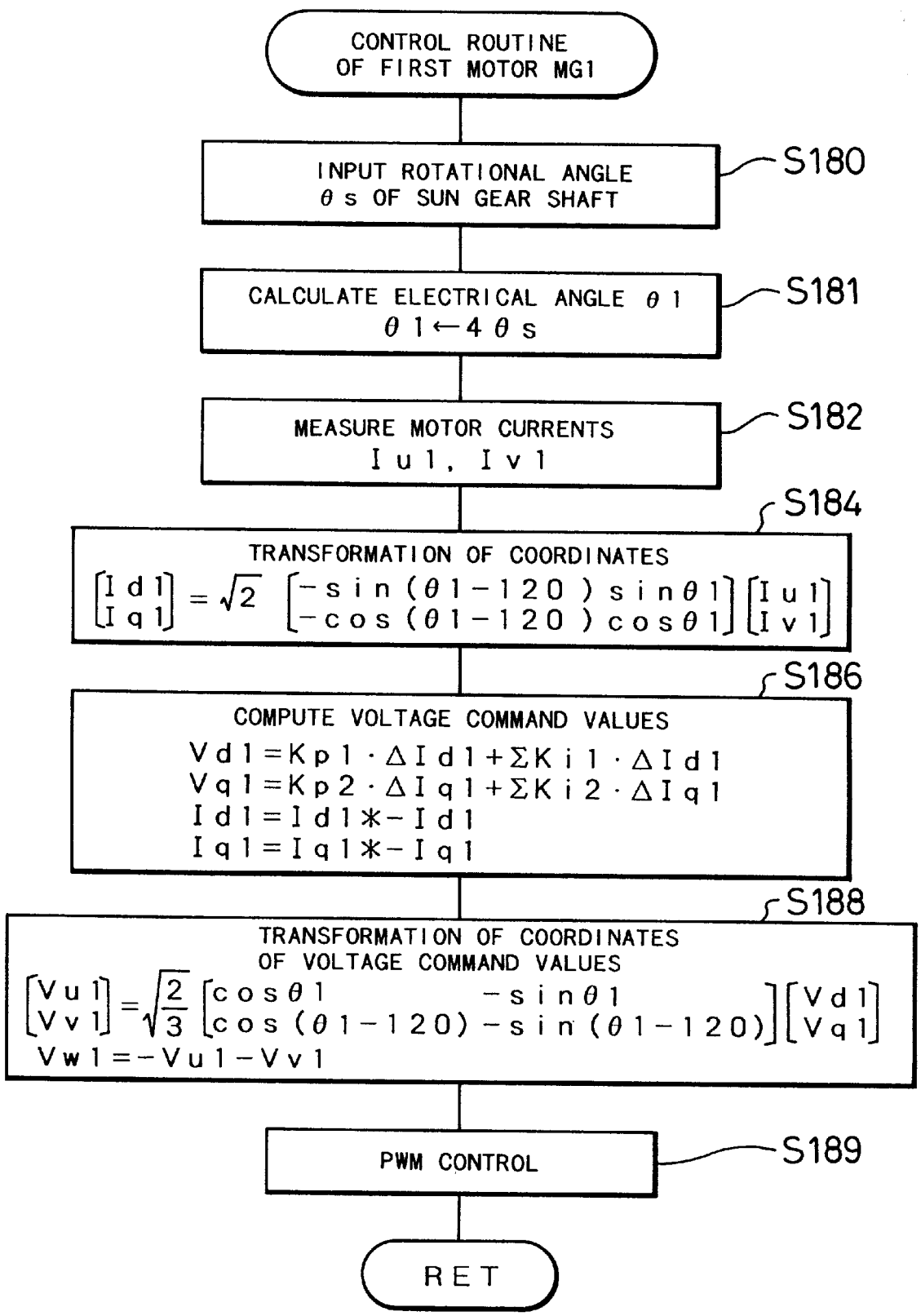
FIG. 14 is a flowchart showing an essential routine of controlling the first motor MG1 executed by the control CPU 190 of the controller 180.

FIG. 14 is a flowchart showing details of the control process of the first motor MG1 executed at step S170 in the flowchart of FIG. 11. When the program enters the control routine the control CPU 190 first receives the rotational angle θs of the sun gear shaft 125 from the revolver 139 at step S180, and calculates an electrical angle θ1of the first motor MG1 at step S181. In this embodiment, since a synchronous motor of four-pole pair (that is, four N poles and four S poles) is used as the first motor MG1 the rotational angle θs of the sun gear shaft 125 is quadrupled to yield the electrical angle θ1 (θ1=4θs). The CPU190 then detects values of currents Iu1 and Iv1 flowing through the U phase and V phase of the three-phase coils 134 in the first motor MG1 with the ammeters 195 and 196 at step S182. Although the currents naturally flow through all the three phases U, V, and W, measurement is required only for the currents passing through the two phases since the sum of the currents is equal to zero. At subsequent step S184, the control CPU 190 executes transformation of coordinates (three-phase to two-phase transformation) using the values of currents flowing through the three phases obtained at step S182. The transformation of coordinates maps the values of currents flowing through the three phases to the values of currents passing through d and q axes of the permanent magnet-type synchronous motor and is executed according to Equation (7) given below:

$$\begin{bmatrix} Id1 \\ Iq1 \end{bmatrix} = \sqrt{2} \begin{bmatrix} -\sin(\theta1 - 120) & \sin\theta1 \\ -\cos(\theta1 - 120) & \cos\theta1 \end{bmatrix} \begin{bmatrix} Iu1 \\ Iv1 \end{bmatrix} \quad (7)$$

The transformation of coordinates is carried out because the currents flowing through the d and q axes are essential for the torque control in the permanent magnet-type synchronous motor. Alternatively, the torque control may be executed directly with the currents flowing through the three phases. After the transformation to the currents of two axes, the control CPU 190 computes deviations of currents Id1 and Iq1 actually flowing through the d and q axes from current command values Id1* and Iq1* of the respective axes, which are calculated from the torque command value Tm1* of the first motor MG1 and subsequently determines voltage command values Vd1 and Vq1 with respect to the d and q axes at step S186. In accordance with a concrete procedure, the control CPU 190 executes arithmetic operations of Equations (8) and Equations (9) given below:

$$\Delta Id1 = Id1^* - Id1 \quad (8)$$

$$\Delta Iq1 = Iq1^* - Iq1$$

$$Vd1 = Kp1 \cdot \Delta Id1 + \sum Ki1 \cdot \Delta Id1 \quad (9)$$

$$Vq1 = Kp2 \cdot \Delta Iq1 + \sum Ki2 \cdot \Delta Iq1$$

wherein Kp1, Kp2, Ki1, and Ki2 represent coefficients, which are adjusted to be suited to the characteristics of the motor applied. Each voltage command value Vd1 (Vq1) includes a part in proportion to the deviation ΔI from the current command value I* (the first term on the right side of Equation (9)) and a summation of historical data of the deviations ΔI for 'i' times (the second term on the right side). The control CPU 190 then re-transforms the coordinates of the voltage command values thus obtained (two-phase to three-phase transformation) at step S188. This corresponds to an inverse of the transformation executed at step S184. The inverse transformation determines voltages Vu1, Vv1, and Vw1 actually applied to the three-phase coils 134 as expressed by Equations (10) given below:

$$\begin{bmatrix} Vu1 \\ Vv1 \end{bmatrix} = \sqrt{\frac{2}{3}} \begin{bmatrix} \cos\theta1 & -\sin\theta1 \\ \cos(\theta1 - 120) & -\sin(\theta1 - 120) \end{bmatrix} \begin{bmatrix} Vd1 \\ Vq1 \end{bmatrix} \quad (10)$$

$$Vw1 = -Vu1 - Vv1$$

The actual voltage control is accomplished by on-off operation of the transistors Tr1 through Tr6 in the first driving circuit 191. At step S189, the on- and off-time of the transistors Tr1 through Tr6 in the first driving circuit 191 is PWM (pulse width modulation) controlled, in order to attain the voltage command values Vu1, Vv1, and Vw1 determined by Equations (10) given above.

It is assumed that the torque command value Tm1* of the first motor MG1 is positive when the torque Tm1 is applied in the direction shown in the nomograms of FIGS. 5 and 6. For an identical positive torque command value Tm1*, the first motor MG1 is controlled to carry out the regenerative operation when the torque command value Tm1* acts in reverse of the rotation of the sun gear shaft 125 as in the state of the nomogram of FIG. 5, and controlled to carry out the power operation when the torque command value Tm1* acts in the direction of rotation of the sun gear shaft 125 as in the state of the nomogram of FIG. 6. For the positive torque command value Tm1*, both the regenerative operation and the power operation of the first motor MG1 implement the identical switching control. In accordance with a concrete procedure, the transistors Tr1 through Tr6 in the first driving circuit 191 are controlled to enable a positive torque to be applied to the sun gear shaft 125 by the combination of the magnetic field generated by the permanent magnets 135 set on the outer surface of the rotor 132 with the revolving magnetic field generated by the currents flowing through the three-phase coils 134. The identical switching control is executed for both the regenerative operation and the power operation of the first motor MG1 as long as the sign of the torque command value Tm1* is not changed. The control routine of the first motor MG1 shown in the flowchart of FIG. 14 is thus applicable to both the regenerative operation and the power operation. When the torque command value Tm1* is negative, the rotational angle θs of the sun gear shaft 125 read at step S180 is varied in a reverse direction. The control routine of the first motor MG1 shown in FIG. 14 is thus also applicable to this case.

Figure 15:
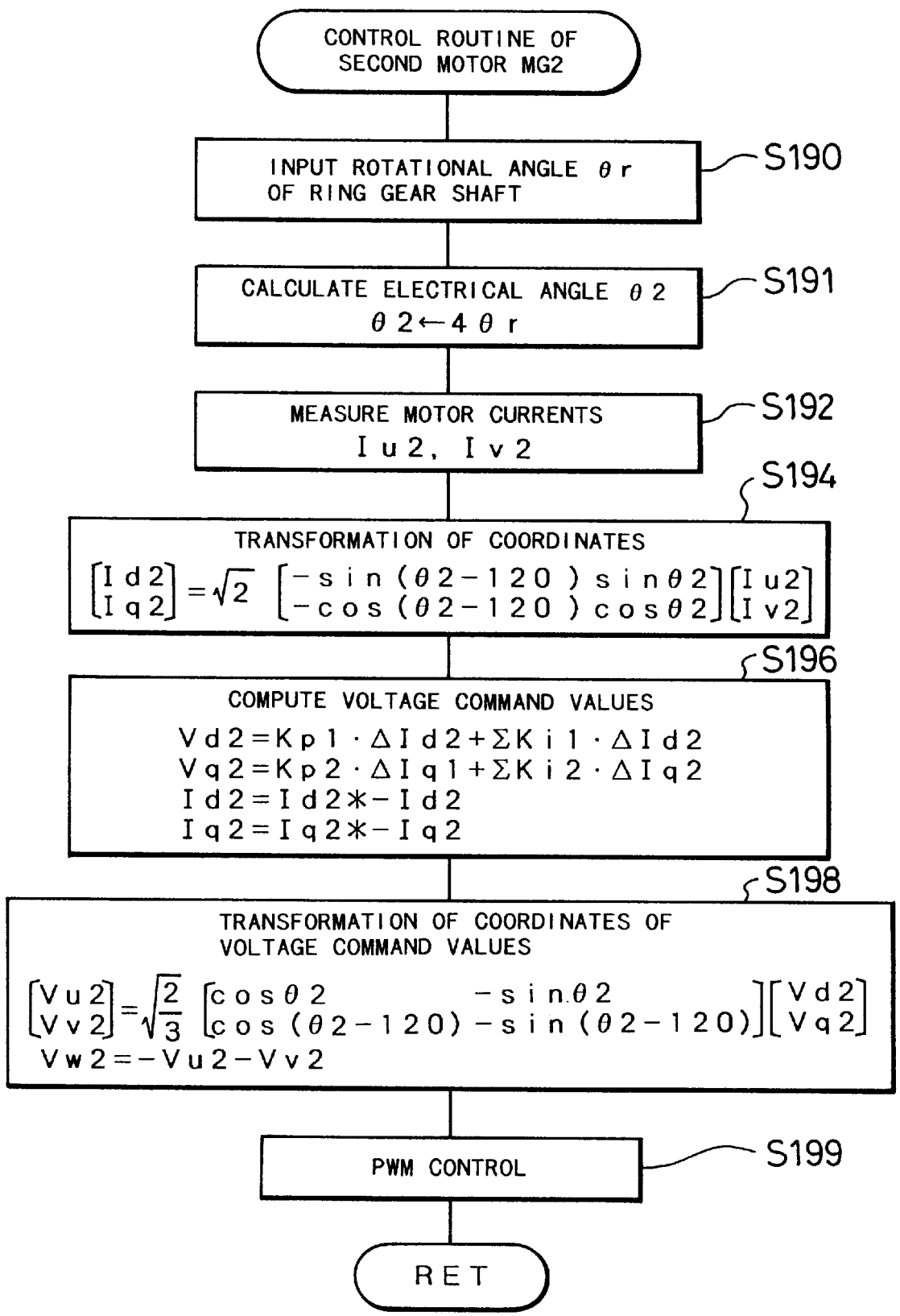
FIG. 15 is a flowchart showing an essential routine of controlling the second motor MG2 executed by the control CPU 190 of the controller 180.

FIG. 15 is a flowchart showing details of the control process of the second motor MG2 executed at step S171 in the flowchart of FIG. 11. The control process of the second motor MG2 is identical with that of the first motor MG1, except that a torque command value Tm2* and the rotational angle θr of the ring gear shaft 126 are used in place of the torque command value Tm1* and the rotational angle θs of the sun gear shaft 125 in the control procedure of the first motor MG1. When the program enters the control routine, the control CPU 190 of the controller 180 first receives the rotational angle θr of the ring gear shaft 126 from the revolver 149 at step S190, and calculates an electrical angle θ2 of the second motor MG2 from the observed rotational angle θr of the ring gear shaft 126 at step S191. In this embodiment, since the second motor MG2 is also constructed as a synchronous motor of four-pole pair, the electrical angle θ2 is calculated by the equation of θ2=4θr. At subsequent step S192, phase currents Iu2 and Iv2 of the second motor MG2 are measured with the ammeters 197 and 198. The control CPU 190 then executes transformation of coordinates for the phase currents at step S194, computes voltage command values Vd2 and Vq2 at step S196, and executes inverse transformation of coordinates for the voltage command values at step S198. At subsequent step S199, the control CPU 190 determines the on- and off-time of the transistors Tr11 through Tr16 in the second driving circuit 192 for driving and controlling the second motor MG2 and carries out the PWM control.

The second motor MG2 is also controlled to carry out either the regenerative operation or the power operation, based on the relationship between the direction of the torque command value Tm2* and the direction of the rotation of the ring gear shaft 126. Like the first motor MG1 the control process of the second motor MG2 shown in the flowchart of FIG. 15 is applicable to both the regenerative operation and the power operation. In this embodiment, it is assumed that the torque command value Tm2* of the second motor MG2 is positive when the torque Tm2 is applied in the direction shown in the nomogram of FIG. 5.

The control of the engine 150 (step S172 in the flowchart of FIG. 11) is executed in the following manner. In order to attain stationary driving at the driving point defined by the target engine torque Te* and the target engine speed Ne* set at step S152 in FIG. 11, the control CPU 190 regulates the torque Te and the revolving speed Ne of the engine 150. In accordance with a concrete procedure, the control CPU 190 transmits an instruction to the EFIECU 170 through communication, and the EFIECU 70 controls the amount of fuel injection from the fuel injection valve 151 and the position of the throttle valve 166, thereby enabling the output torque and the revolving speed of the engine 150 to gradually approach the target engine torque Te* and the target engine speed Ne*. As discussed later on the processing of steps S162 through S172 in the torque control routine in the ordinary driving mode of FIG. 11, the revolving speed Ne of the engine 150 is controlled by regulating the revolving speed Ns of the sun gear shaft 125 with the first motor MG1, so that the engine 150 is controlled to make its actual torque Te approach the target engine torque Te*.

The following describes the processing carried out when the energy Pr to be output to the ring gear shaft 126 is determined to be identical with the previous value of energy Pr at step S150 of the torque control routine in the ordinary driving mode shown in FIG. 11 (that is, the processing of steps S162 through S172). In this case, the control CPU 190 of the controller 180 first receives the revolving speed Ns of the sun gear shaft 125 at step S162, and calculates a target revolving speed Ns* of the sun gear shaft 125 based on the target engine speed Ne* of the engine 150 at step S164 according to Equation (11), which is equivalent to Equation (2) discussed above. The control CPU 190 then determines a deviation ΔNs of the input revolving speed Ns of the sun gear shaft 125 from the calculated target revolving speed Ns* at step S166, and calculates the torque command value Tm1* of the first motor MG1 according to Equation (12) given below at step S168. Km1 in Equation (12) represents a control gain.

$$Ns^* \leftarrow Nr - (Nr - Ne^*) \times \frac{1+\rho}{\rho} \quad (11)$$

$$Tm1^* \leftarrow \text{previous } Tm1^* + Km1 \cdot \Delta Ns \quad (12)$$

After setting the torque command value Tm1* of the first motor MG1, the program proceeds to steps S170 through S172 to carry out the control operations of the first motor MG1, the second motor MG2, and the engine 150. The values used for the respective control operations are identical with those set at steps S152 through S156 based on the previous value of energy Pr in the previous cycle of this routine, except the torque command value Tm1* set at step S168.

The processing of steps S162 through S172 is a feed-back control to make the revolving speed Ns of the sun gear shaft 125 coincide with the target revolving speed Ns*. In this embodiment, the revolving speed Ne of the engine 150 is controlled by regulating the revolving speed Ns of the sun gear shaft 125. As discussed above with the nomograms of FIGS. 5 and 6, in the planetary gear 120, the determination of the two revolving speeds among the revolving speeds of the sun gear shaft 125, the ring gear shaft 126, and the planetary carrier 124 results in automatically setting the remaining one revolving speed. The revolving speed Nr of the ring gear shaft 126 mechanically linked with the driving wheels 116 and 118 is given as input data. Controlling either the revolving speed Ns of the sun gear shaft 125 or the revolving speed Ne of the engine 150 determines the rotating conditions of the three shafts of the planetary gear 120. Controlling the revolving speed Ne of the engine 150 is required, in order to enable the engine 150 to be driven at the driving point of high efficiency defined by the target engine torque Te* and the target engine speed Ne*. In this case, the method of controlling the position of the throttle valve 166 and the amount of fuel injection may be applied to control the revolving speed Ne of the engine 150. This control procedure is, however, rather complicated, since the torque Te of the engine 150 should be controlled simultaneously to the target engine torque Te*. On the other hand, control of the revolving speed Ns of the sun gear shaft 125 can be attained more readily and with a higher accuracy simply by controlling the revolving speed of the first motor MG1. In this embodiment, the revolving speed Ne of the engine 150 is controlled by regulating the revolving speed Ns of the sun gear shaft 125 with the first motor MG1.

As discussed above the torque control process in the ordinary driving mode converts the power output from the engine 150 to a desired torque by means of the planetary gear 120, the first motor MG1, and the second motor MG2, and outputs the desired torque to the ring gear shaft 126 and eventually to the driving wheels 116 and 118. As long as the output energy Pe coincides with the energy Pr to be output to the ring gear shaft 126, the engine 150 may be driven at any driving point defined by the revolving speed Ne and the torque Te. This allows the engine 150 to be driven at a desired driving point of highest possible efficiency, thereby enhancing the efficiency of the whole apparatus. The first motor MG1 controls the revolving speed Ns of the sun gear shaft 125 to the target revolving speed Ns*, thereby enabling the revolving speed Ne of the engine 150 to approach the target engine speed Ne*.

In the power output apparatus 110 of the first embodiment, the feed-back control is carried out with the first motor MG1 to make the revolving speed Ns of the sun gear shaft 125 approach the target revolving speed Ns*, when the current value of energy Pr to be output to the ring gear shaft 126 is identical with the previous value of energy Pr. Such feed-back control may, however, be omitted. In the power output apparatus 110 of the first embodiment, the target torque Te* and the target revolving speed Ne* of the engine 150 are read from the map that enables the engine 150 to be driven at the highest possible efficiency with respect to the energy Pr to be output to the ring gear shaft 126 and to vary its driving state smoothly with a variation in energy Pr. Other maps applicable for the same purpose include one for storing discontinuous driving points that enable the engine 150 to be driven at the highest possible efficiency but do not enable the engine 150 to vary its driving state smoothly with a variation in energy Pr and one for storing driving points that enable the engine 150 to improve the emission to the lowest possible level, driving points that reduce the noise of the engine 150 to the lowest possible level, or other various driving points.

(5) Process of Controlling Torque in Charge-Discharge Mode

Figure 16:
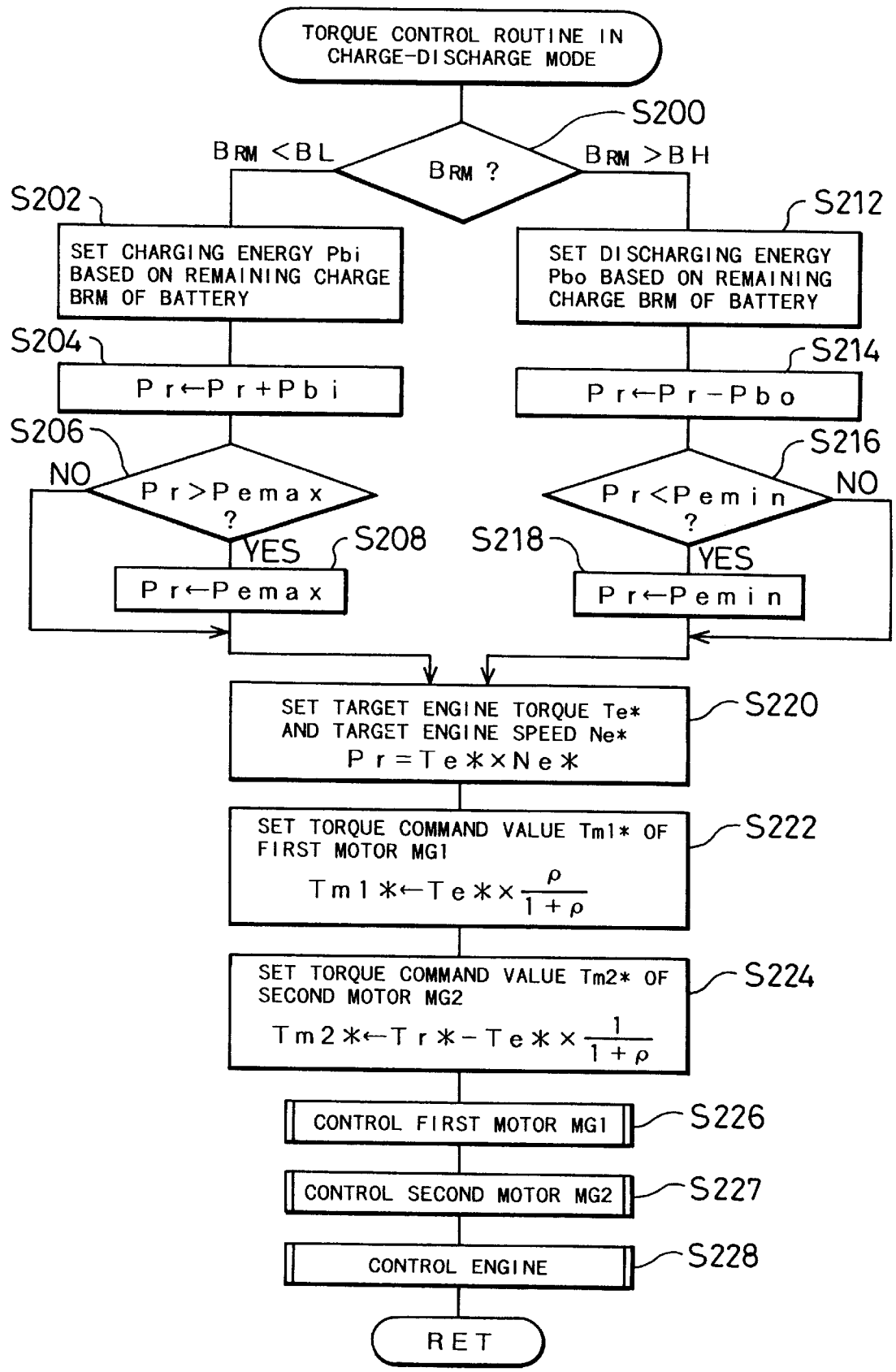
FIG. 16 is a flowchart showing a torque control routine in the charge-discharge mode executed by the control CPU 190 of the controller 180.

The torque control in the charge-discharge mode at step S114 in the flowchart of FIG. 7 is carried out according to a routine of controlling the torque in the charge-discharge mode shown in the flowchart of FIG. 16. As discussed previously, the charge-discharge mode is selected as the optimal operation mode of the power output apparatus 110 at step S132 in the flowchart of FIG. 9, when it is determined at step S130 that the remaining charge BRM is out of the specific range defined by the first threshold value BL and the second threshold value BH and that the battery 194 thereby requires either charging or discharging. This routine is executed under such conditions.

When the program enters the routine of FIG. 16, the control CPU 190 of the controller 180 first compares the remaining charge BRM of the battery 194 with the first threshold value BL and the second threshold value BH at step S200. The definitions of the first threshold value BL and the second threshold value BH are given above in the description of step S130 in the flowchart of FIG. 9. In case that the remaining charge BRM of the battery 194 is less than the first threshold value BL, the program determines that the battery 194 requires charging and executes the charging process of the battery 194 according to steps S202 through S208 prior to the processing of steps S220 through S228. In case that the remaining charge BRM of the battery 194 is greater than the second threshold value BH, on the other hand, the program determines that the battery 194 requires discharging and executes the discharging process of the battery 194 according to steps S212 through S218 prior to the processing of steps S220 through S228. The following describes the charging process of the battery 194 and the discharging process of the battery 194 in this sequence.

Figure 17:
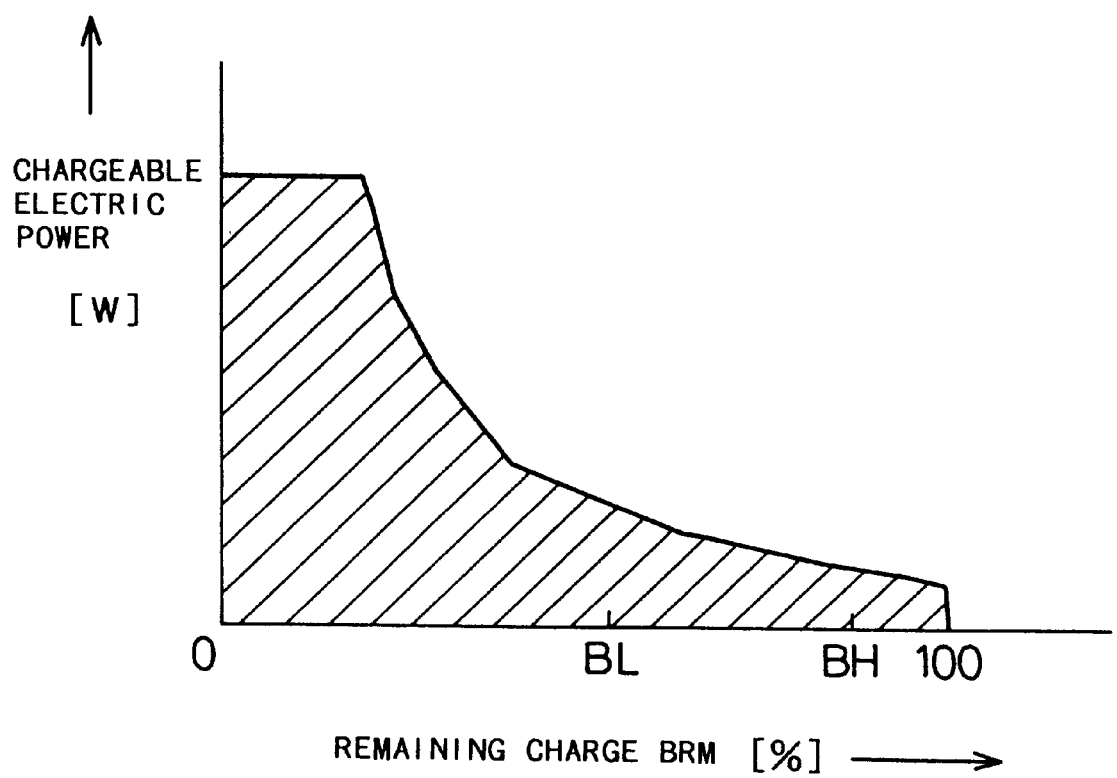
FIG. 17 is a graph illustrating the relationship between the remaining charge BRM of the battery 194 and the chargeable electric power.

When it is determined at step S200 that the remaining charge BRM of the battery 194 is less than the first threshold value BL and that the battery 194 requires charging, the program proceeds to step S202, at which the control CPU 190 sets a charging energy Pbi based on the remaining charge BRM of the battery 194. The charging energy Pbi is set based on the remaining charge BRM of the battery 194, since the chargeable electric power (energy) of the battery 194 as well as appropriate charging voltage and charging current vary with a variation in remaining charge BRM. FIG. 17 is a graph showing the chargeable electric power plotted against the remaining charge BRM of the battery 194. In this embodiment, optimum values of charging energy Pbi are determined experimentally or otherwise for the respective values of remaining charge BRM of the battery 194 and stored in advance as a map (not shown) in the ROM 190b. In accordance with a concrete procedures at step S202, the charging energy Pbi corresponding to the remaining charge BRM of the battery 194 is read from the map stored in the ROM 190b.

After determining the charging energy Pbi, the control CPU 190 sets the energy Pr anew by adding the charging energy Pbi to the energy Pr at step S204. It is then determined at step S206 whether or not the newly set energy Pr exceeds a maximum energy Pemax that can be output from the engine 150. When the newly set energy Pr exceeds the maximum energy Pemax, the energy Pr is limited to the maximum energy Pemax at step S208. Namely the maximum energy Pemax is set to the energy Pr. The program subsequently sets the target torque Te* and the target revolving speed Ne* of the engine 150 at step S220, sets the torque command value Tm1* of the first motor MG1 at step S222 and sets the torque command value Tm2* of the second motor MG2 at step S224. The processing of steps S220 through S224 is identical with that of steps S152 through S156 in the flowchart of FIG. 11. The program then proceeds to steps S226 through S228 to control the first motor MG1 the second motor MG2, and the engine 150, respectively. The control procedures of steps S226 through S228 are identical with those of steps S170 through S172 in the flowchart of FIG. 11 and are not specifically described here.

Figure 18:
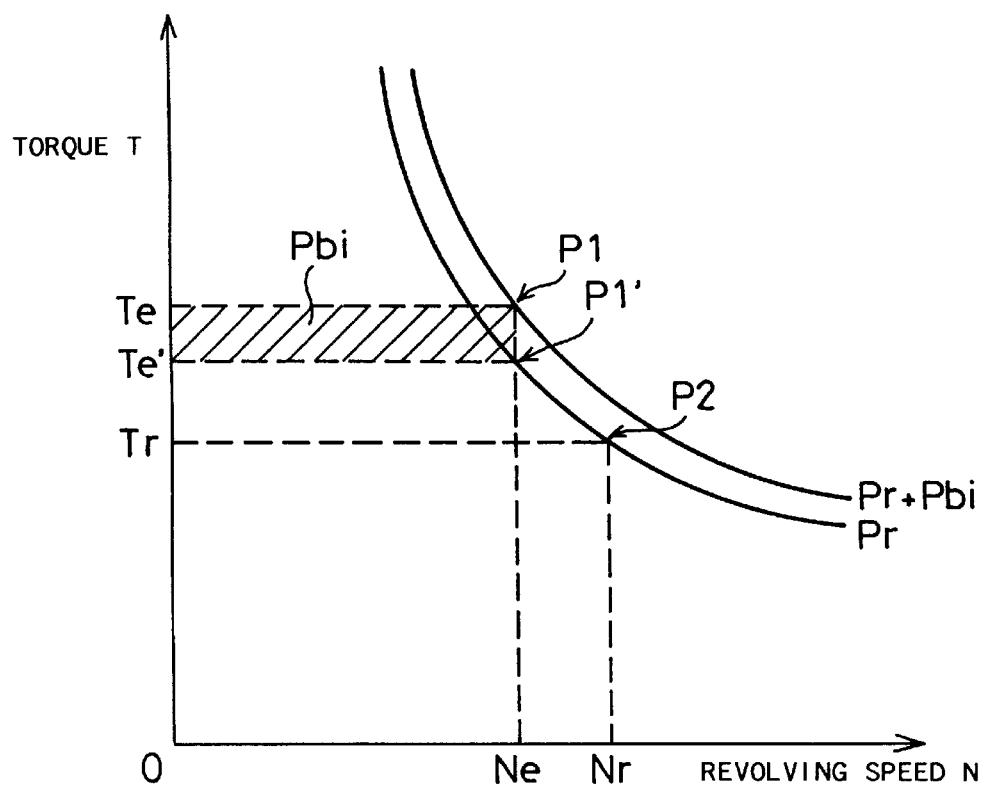
FIG. 18 shows the state of torque conversion of the power in the charging process.

The respective settings at steps S220 through S224 are calculated according to the same equations as those used at steps S152 through S156 in the torque control routine in the ordinary driving mode shown in FIG. 11 in the routine of FIG. 16, however, the program sets the energy Pr anew by taking into account the charging energy Pbi through the processing of steps S202 to S208, and sets the target torque Te* and the target revolving speed Ne* of the engine 150 and the torque command value Tm1* of the first motor MG1 based on the newly set energy Pr. The torque command value Tm2* of the second motor MG2 is then determined by subtracting a portion of the target engine torque Te* applied to the ring gear shaft 126 not from a recalculated torque Trr but from the torque command value Tr*. The recalculated torque Trr is obtained by dividing the newly set energy Pr by the revolving speed Nr of the ring gear shaft 126, whereas the torque command value Tr* has been used as the basis of calculation of the energy Pr before being set anew and is smaller than the recalculated torque Trr. The torque command value Tm2* of the second motor MG2 set at step S224 is accordingly smaller than a required torque for consuming or regenerating the electric power that is regenerated or consumed by the first motor MG1. This means that the electric power regenerated by the first motor MG1 or the second motor MG2 becomes greater than the electric power consumed by the first motor MG1 or the second motor MG2. This results in generating excess electric power, with which the battery 194 is charged. FIG. 18 shows the state of torque conversion, provided that the newly set energy Pr is not limited to the maximum energy Pemax at steps S206 and S208. In the drawing of FIG. 18, a hatched area represents the excess electric power, that is, the charging energy Pbi.

When it is determined at step S200 that the remaining charge BRM of the battery 194 is greater than the second threshold value BH and that the battery 194 requires discharging, on the other hand, the program proceeds to step S212, at which the control CPU 190 sets a discharging energy Pbo based on the remaining charge BRM of the battery 194. The discharging energy Pbo is set based on the remaining charge BRM of the battery 194 since the dischargeable electric power (energy) of the battery 194 may be varied with a variation in remaining charge BRM. In this embodiment, optimum values of discharging energy Pbo are determined experimentally or otherwise for the respective values of remaining charge BRM of the battery 194 and stored in advance as a map (not shown) in the ROM 190b. In accordance with a concrete procedures at step 212, the discharging energy Pbo corresponding to the remaining charge BRM of the battery 194 is read from the map stored in the ROM 190b.

After determining the discharging energy Pbo, the control CPU 190 sets the energy Pr anew by subtracting the discharging energy Pbo from the energy Pr to be output to the ring gear shaft 126 at step S214. It is then determined at step S216 whether or not the newly set energy Pr is smaller than a minimum energy Pemin that can be output from the engine 150. When the newly set energy Pr is smaller than the minimum energy Pemin, the energy Pr is limited to the minimum energy Pemin at step S218. Namely the minimum energy Pemin is set to the energy Pr. The program subsequently sets the target torque Te* and the target revolving speed Ne* of the engine 150, the torque command value Tm1* of the first motor MG1, and the torque command value Tm2* of the second motor MG2 at steps S220 through S224. The program then proceeds to steps S226 through S228 to control the first motor MG1 the second motor MG2, and the engine 150, respectively.

Figure 19:
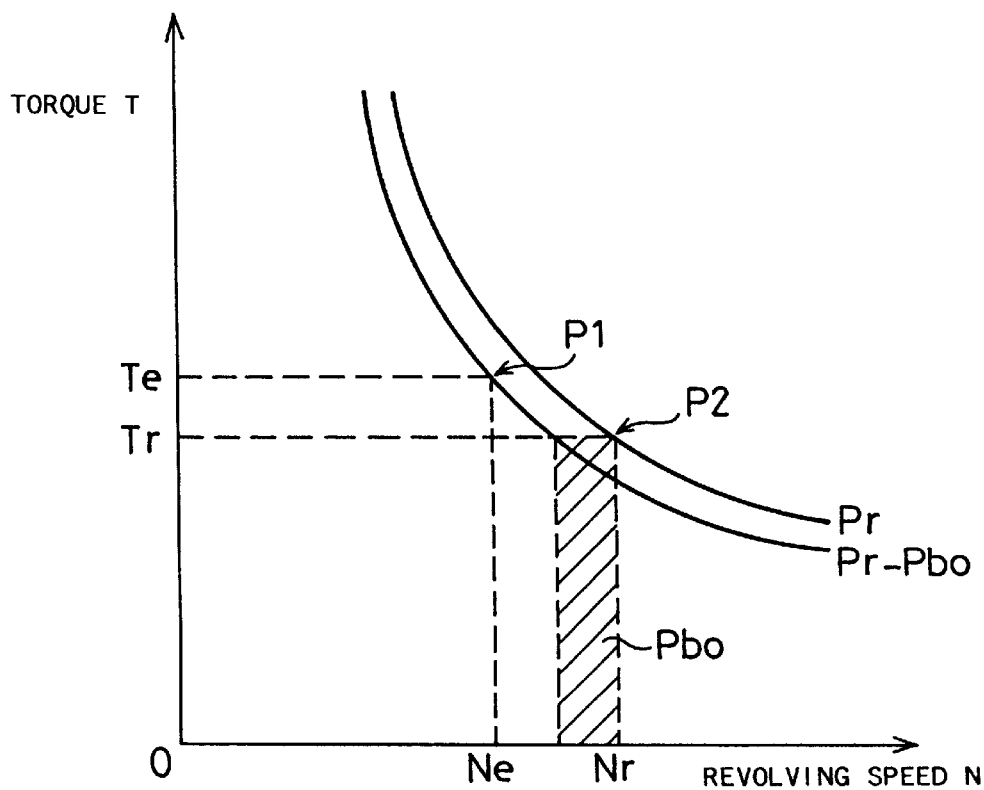
FIG. 19 shows the state of torque conversion of the power in the discharging process.

The concrete procedure of steps S220 through S224 in the discharging process is identical with that in the charging process. The discharging process however sets the energy Pr anew by taking into account the discharging energy Pbo through the processing of steps S212 to S218, and sets the target torque Te* and the target revolving speed Ne* of the engine 150 and the torque command value Tm1* of the first motor MG1 based on the newly set energy Pr. The torque command value Tm2* of the second motor MG2 is then determined by subtracting a portion of the target engine torque Te* applied to the ring gear shaft 126 not from a recalculated torque Trr but from the torque command value Tr*. The recalculated torque Trr is obtained by dividing the newly set energy Pr by the revolving speed Nr of the ring gear shaft 126, whereas the torque command value Tr* has been used as the basis of calculation of the energy Pr before being set anew and is greater than the recalculated torque Trr. The torque command value Tm2* of the second motor MG2 set at step S224 is accordingly greater than a required torque for consuming or regenerating the electric power that is regenerated or consumed by the first motor MG1. This means that the electric power consumed by the first motor MG1 or the second motor MG2 becomes greater than the electric power regenerated by the first motor MG1 or the second motor MG2. This results in insufficiency of electric power, which is supplied from the battery 194. FIG. 19 shows the state of torque conversion, provided that the newly set energy Pr is not limited to the minimum energy Pemin at steps S216 and S218. In the drawing of FIG. 19 a hatched area represents the electric power discharged from the battery 194, that is, the discharging energy Pbo.

The torque control process in the charge-discharge mode discussed above can keep the remaining charge BRM of the battery 194 within a desired range thereby effectively preventing the battery 194 from being charged or discharged to an excessive degree. This process also enables a desired amount of power to be output to the ring gear shaft 126 and eventually to the driving wheels 116 and 118 by the functions of the engine 150, the planetary gear 120, the first motor MG1, the second motor MG2, and the battery 194. The engine 150 may be driven at any driving point that can output the preset energy Pr. This allows the engine 150 to be driven at a desired driving point of highest possible efficiency, thereby enhancing the efficiency of the whole apparatus.

Although the power output apparatus 110 of the first embodiment sets the charging energy Pbi and the discharging energy Pbo based on the remaining charge BRM of the battery 194, the charging energy Pbi and the discharging energy Pbo may be any predetermined values.

(6) Process of Controlling Torque in Power Assist Mode

Figure 20:
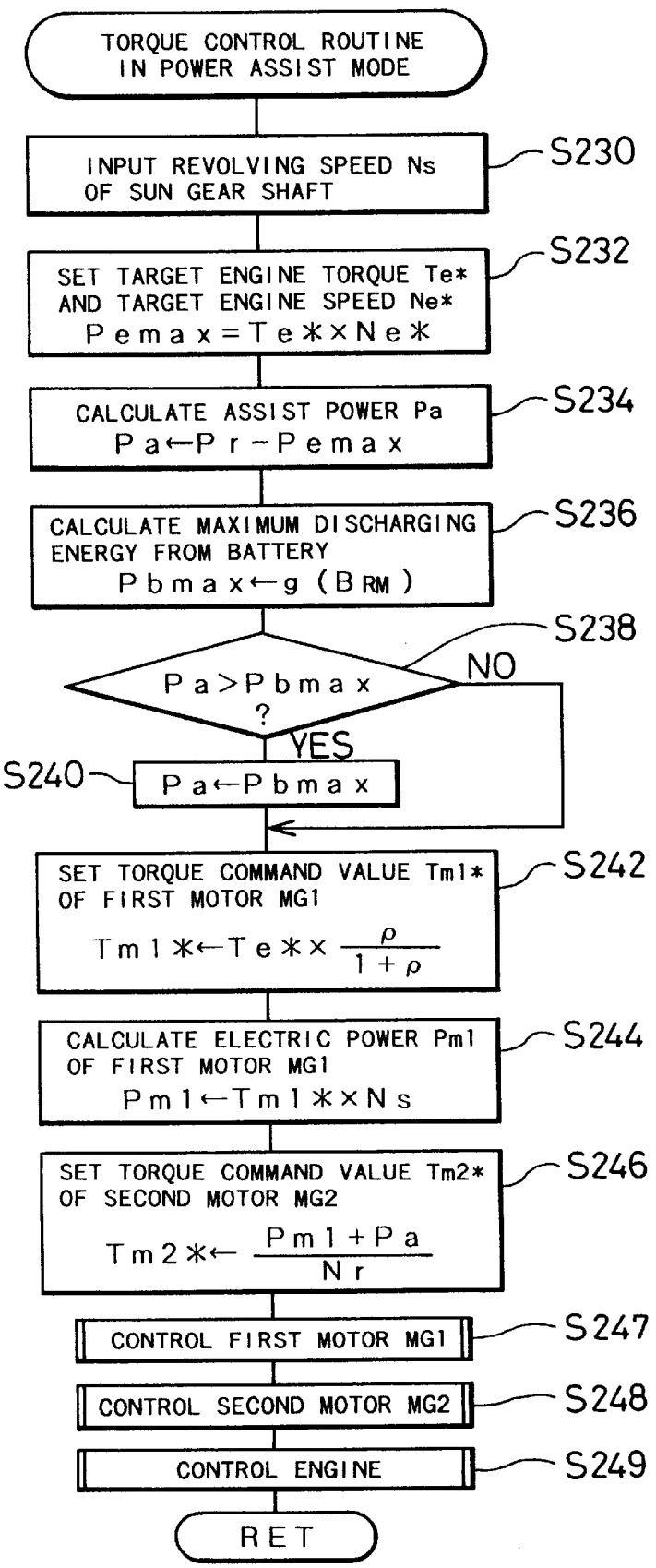
FIG. 20 is a flowchart showing a torque control routine in the power assist mode executed by the control CPU 190 of the controller 180.

The torque control in the power assist mode at step S116 in the flowchart of FIG. 7 is carried out according to a routine of controlling the torque in the power assist mode shown in the flowchart of FIG. 20. As discussed previously, the power assist mode is selected as the optimal operation mode of the power output apparatus 110 at step S136 in the flowchart of FIG. 9, when it is determined at step S134 that the energy Pr to be output to the ring gear shaft 126 exceeds the maximum energy Pemax that can be output from the engine 150. This routine is executed under such conditions.

When the program enters the routine of FIG. 20, the control CPU 190 of the controller 180 first receives data of revolving speed Ns of the sun gear shaft 125 at step S230, and sets the target torque Te* and the target revolving speed Ne* of the engine 150 to attain the maximum energy Pemax that can be output from the engine 150 at step S232. At step S134 in the operation mode determination routine of FIG. 9, it is determined that the energy Pr to be output to the ring gear shaft 126 is greater than the maximum energy Pemax. The maximum energy Pemax is accordingly set to the energy Pe output from the engine 150, in order to enable a largest possible portion of the required output energy Pr to the ring gear shaft 126 to be supplied by the power output from the engine 150.

An assist power that should be added to the power output from the engine 150 is calculated at step S234 by subtracting the maximum energy Pemax that can be output from the engine 150 from the required output energy Pr to the ring gear shaft 126. At subsequent step S236, the control CPU 190 determines a maximum discharging energy Pbmax, which is the maximum of dischargeable energy from the battery 194, based on the remaining charge BRM of the battery 194. The maximum discharging energy Pbmax is set based on the remaining charge BRM of the battery 194, since the dischargeable electric power (energy) of the battery 194 may be varied with a variation in remaining charge BRM. In this embodiment, values of maximum discharging energy Pbmax are determined experimentally or otherwise for the respective values of remaining charge BRM of the battery 194 and stored in advance as a map (not shown) in the ROM 190*b*. In accordance with a concrete procedure, at step 236, the maximum discharging energy Pbmax corresponding to the remaining charge BRM of the battery 194 is read from the map stored in the ROM 190*b*.

After determining the maximum discharging energy Pbmax, the control CPU 190 compares the assist power Pa with the maximum discharging energy Pbmax at step S238. When the assist power Pa is greater than the maximum discharging energy Pbmax, the maximum discharging energy Pbmax is set to the assist power Pa at step S240. This prevents the assist power Pa from exceeding the maximum discharging energy Pbmax.

The control CPU 190 computes the torque command value Tm1* of the first motor MG1 according to Equation (5) given above at step S242, and calculates an electric power (electrical energy) Pm1 regenerated or consumed by the first motor MG1 by the equation of Pm1=Tm1*×Ns at step S244. The torque command value Tm2* of the second motor MG2 is then calculated from the calculated electrical energy Pm1 and the assist power Pa according to Equation (13) given below at step S246. The program subsequently proceeds to steps S247 through S249 to control the first motor MG1, the second motor MG2, and the engine 150 with the preset command values. The concrete procedures of steps S247 through S249 are identical with those of steps S170 through S172 in the flowchart of FIG. 11.

$$Tm2^* \leftarrow \frac{Pm1 + Pa}{Nr} \quad (13)$$

Figure 21:
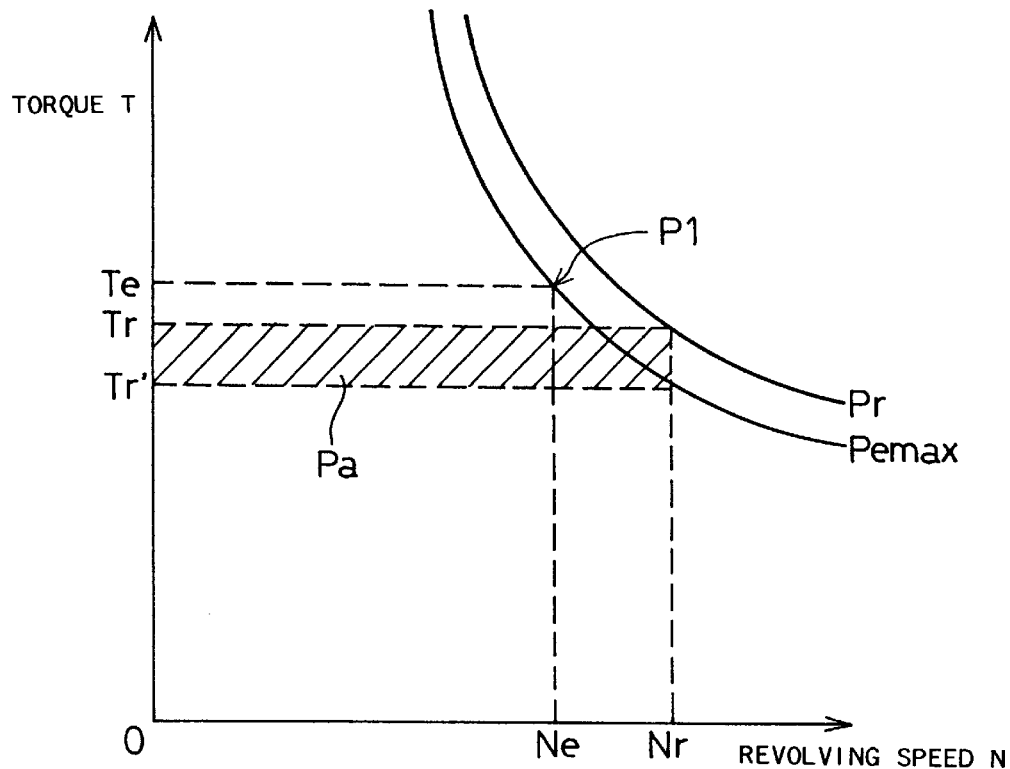
FIG. 21 shows the state of torque conversion of the power in the torque control process in the power assist mode.
Figure 22:
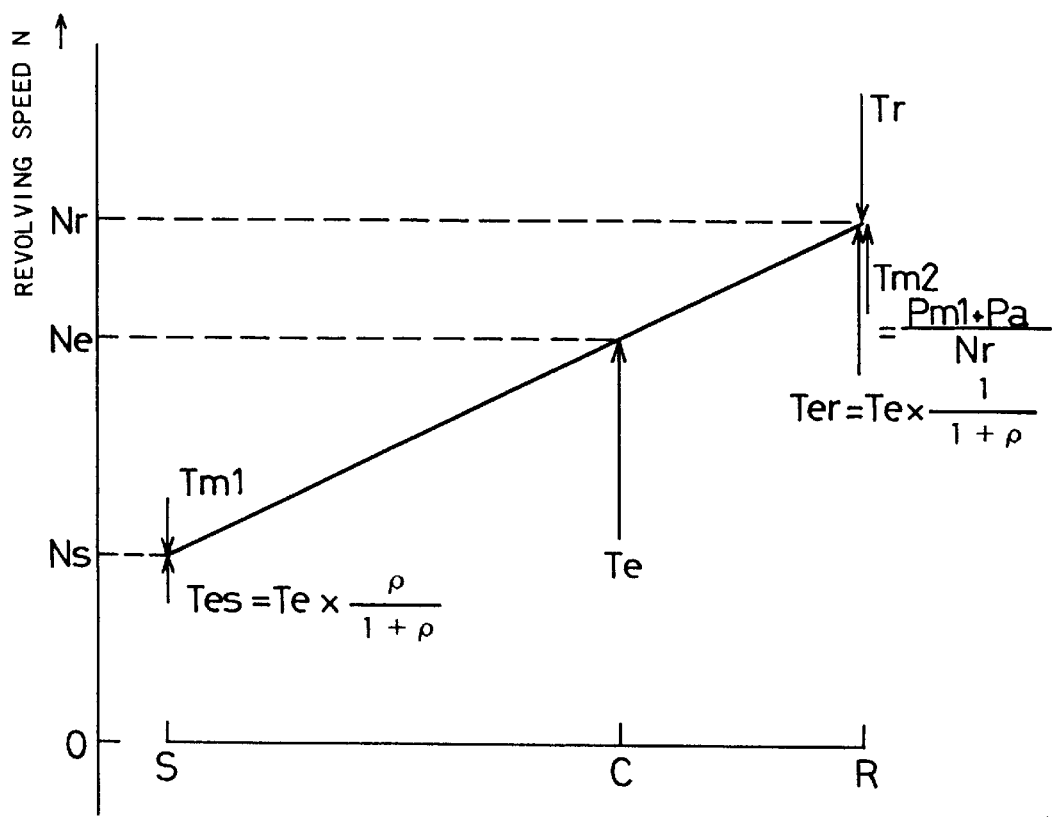
FIG. 22 is a nomogram showing the relationship between the revolving speed and the torque on the three shafts linked with the planetary gear 120 in the torque control process in the power assist mode.

FIG. 21 shows the state of torque conversion in the torque control process in the power assist mode, and FIG. 22 is a nomogram in the torque control process in the power assist mode. Referring to FIG. 21, in the torque control process in the power assist mode, a torque Tr', which is obtained as a result of torque conversion of the power from the engine 150 driven at a driving point PI outputting the maximum energy Pemax and can be output to the ring gear shaft 126 driven at the revolving speed Nr, is smaller than the desired torque Tr which the driver requires. Namely energy corresponding to a hatched area Pa in the drawing of FIG. 21 is short among all the required energy for applying a desired power. In this embodiments the deficient energy Pa is supplied from the battery 194 as the assist power Pa and output to the ring gear shaft 126 via the second motor MG2. This is clearly shown as the relationship of the torque Tm2 in the nomogram of FIG. 22.

The torque control process in the power assist mode discussed above enables energy equal to or greater than the maximum energy Pemax of the engine 150 to be output to the ring gear shaft 126 and eventually to the driving wheels 116 and 118. The engine 150 may accordingly have a low rated capacity having the maximum energy smaller than the required output energy to the ring gear shaft 126. This effectively reduces the size of the whole apparatus and saves energy. The engine 150 may be driven at any driving point (defined by the revolving speed Ne and the torque Te) that can output the maximum energy Pemax. This allows the engine 150 to be driven at a desired driving point of highest possible efficiency, thereby enhancing the efficiency of the whole apparatus.

(7) Process of Controlling Torque in Lock-up Mode

Figure 23:
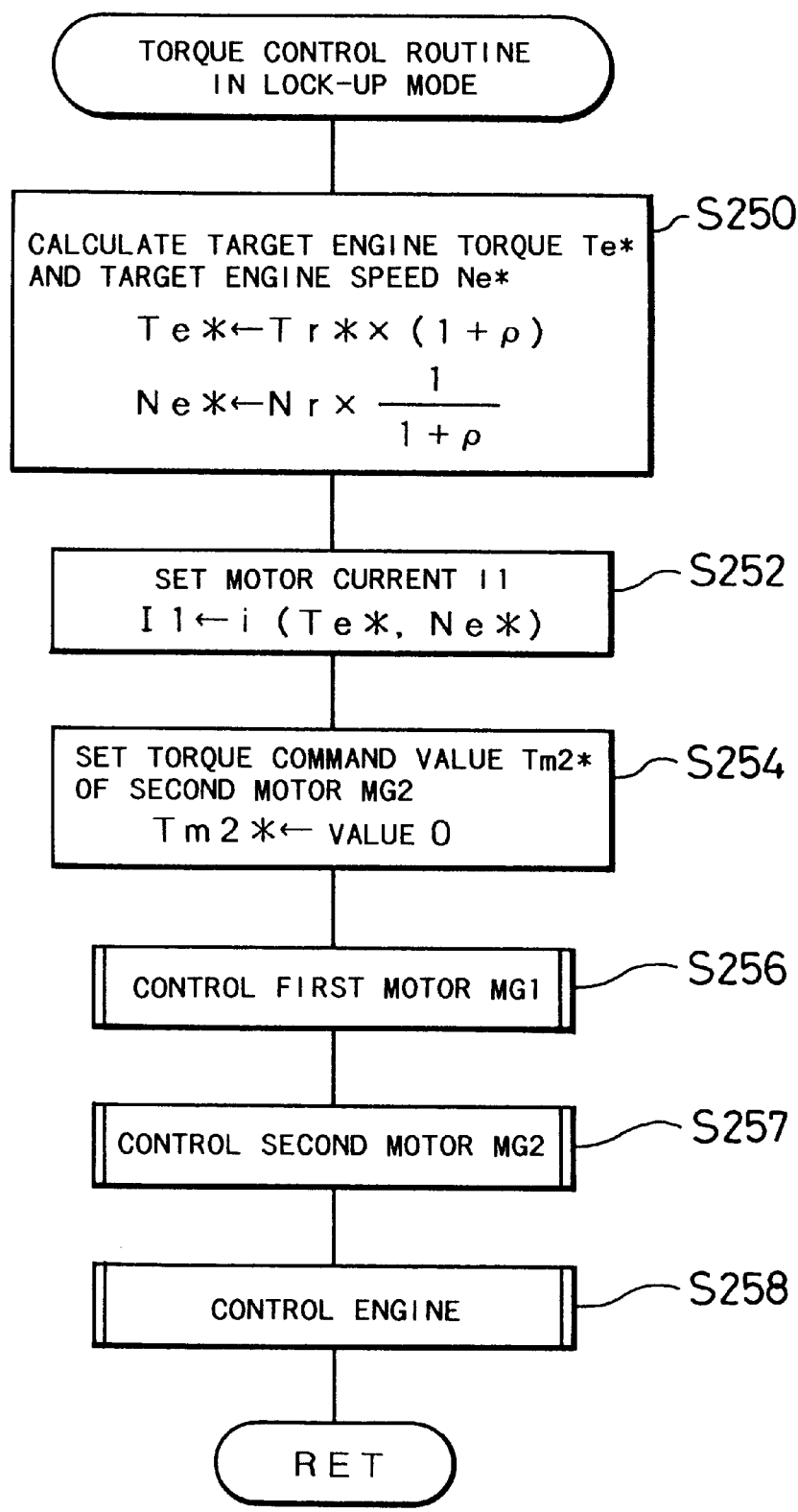
FIG. 23 is a flowchart showing a torque control routine in the lock-up mode executed by the control CPU 190 of the controller 180.

The torque control in the lock-up mode at step S118 in the flowchart of FIG. 7 is carried out according to a routine of controlling the torque in the lock-up mode shown in the flowchart of FIG. 23. As discussed previously, the lock-up mode is selected as the optimal operation mode of the power output apparatus 110 at step S140 in the flowchart of FIG. 9, when it is determined at step S138 that the torque command value Tr* and the revolving speed Nr are within the efficient driving range (see FIG. 10) of the engine 150 while the sun gear 121 is at a stop. This routine is executed under such conditions. When the program enters the routine of FIG. 23, the control CPU 190 of the controller 180 first calculates the target torque Te* and the target revolving speed Ne* of the engine 150 according to Equations (14) and (15) given below at step S250:

$$Te^* \leftarrow Tr^* \times (1 + \rho) \qquad (14)$$

$$Ne^* \leftarrow Nr \times \frac{1}{1 + \rho} \qquad (15)$$

Figure 24:
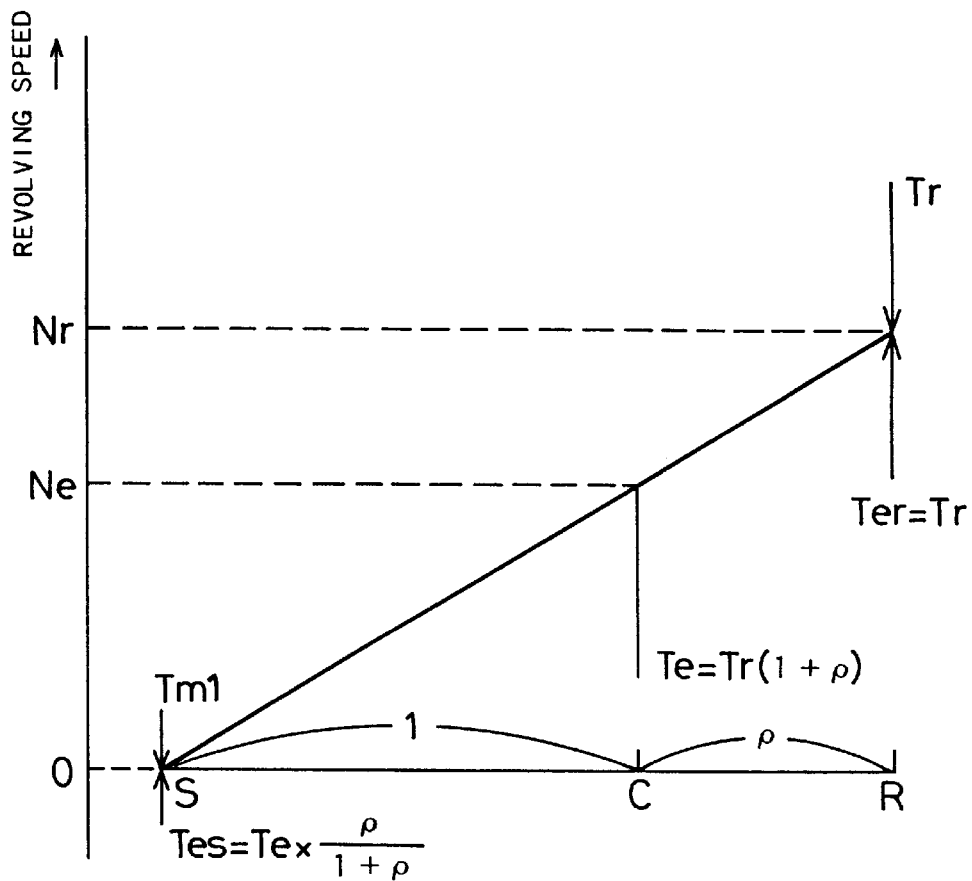
FIG. 24 is a nomogram showing the relationship between the revolving speed and the torque on the three shafts linked with the planetary gear 120 in the torque control process in the lock-up mode.

Equations (14) and (15) used for the calculation of the target torque Te* and the target revolving speed Ne* of the engine 150 are obtained in the following manner. FIG. 24 shows the state of torque conversion of the power in the torque control process in the lock-up mode. Referring to FIG. 24, on the assumption that the revolving speed of the sun gear shaft 125 is fixed to the value '0', the relationship between the revolving speed Ne of the engine 150 and the revolving speed Nr of the ring gear shaft 126 satisfies a simple proportional equation of Ne:1=Nr:1+ρ. Equation (15) is obtained by solving this proportional equation with respect to the revolving speed Ne and substituting the target engine speed Ne* in the revolving speed Ne. The balance of the moment on the left end S of the dynamic collinear line in the nomogram yields the relationship of Tr×(1+ρ) −Te× 1=0. Equation (14) is obtained by solving this relationship with respect to the torque Te and substituting the target engine torque Te* in the torque Te.

Figure 25:
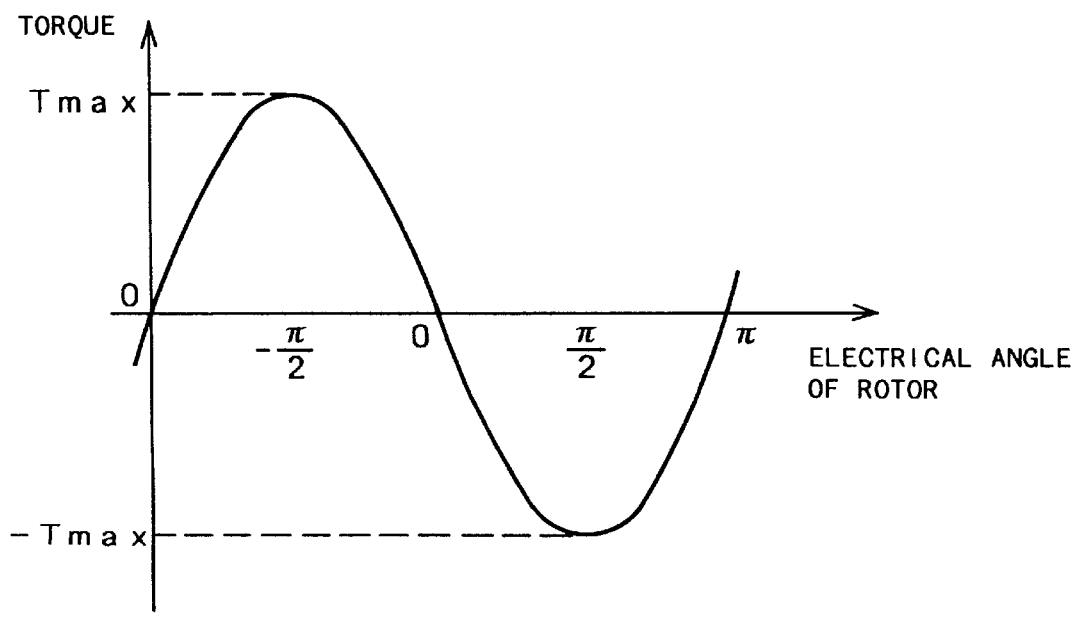
FIG. 25 is a graph illustrating the relationship between the electrical angle of the rotor and the torque when a constant current is flown through the three-phase coils 134.

Referring back to the torque control routine in the lock-up mode shown in FIG. 23, after calculating the target torque Te* and the target revolving speed Ne* of the engine 150, the control CPU 190 sets a value of constant current I1 that is flown through the three-phase coils 134 to lock-up the first motor MG1, based on the calculated target engine torque Te* and target engine speed Ne* at step S252. When a constant current is flown through the three-phase coils 134 of the first motor MG1, the torque Tm1 of the first motor MG1 varies with a variation in electrical angle of the rotors as shown in the graph of FIG. 25 that illustrates the relationship between the position of the rotor and the torque. The torque Tm1 reaches its maximum when the electrical angle of the rotor goes ahead or behind by π/2. In order to lock up the first motor MG1, the value of constant current flown through the three-phase coils 134 is determined, such that the maximum value of the torque Tm1 becomes equal to or greater than a momentary maximum torque Tmax output from the engine 150 that is driven at the driving point defined by the target engine torque Te* and the target engine speed Ne* calculated at step S250. In this embodiment, values of constant current I1 corresponding to the respective combinations of the target engine torque Te* and the target engine speed Ne* are determined experimentally in order to make the torque Tm1 of the first motor MG1 at the rotor electrical angle of π/2 a little greater than the momentary maximum torque Tmax output from the engine 150 driven at the driving point of the target engine torque Te* and the target engine speed Ne*. The experimental data are stored in advance into the ROM 190*b* in the form of a map showing the relationship between the value of constant current I1 and the combination of the target engine torque Te* and the target engine speed Ne*. In accordance with a concrete procedure at step S252, the value of constant current I1 corresponding to the target engine torque Te* and the target engine speed Ne* is read from the map.

The control CPU 190 sets the value '0' to the torque command value Tm2* of the second motor MG2 at step S254, and controls the first motor MG1, the second motor MG2, and the engine 150 with the preset command values at steps S256 through S258. The control of the first motor MG1 at step S256 enables an electric current defined by the value of constant current I1 set at step S252 to flow through the three-phase coils 134. The control of the second motor MG2 at step S257 turns off all the transistors Tr11 through Tr16 in the second driving circuit 192.

The torque control process in the lock-up mode discussed above locks up the first motor MG1 and fixes the sun gear shaft 125, thereby enabling the power of the engine 150 to be directly output to the ring gear shaft 126 via the gear ratio. This structure can prevent even a little decrease in efficiency due to the operation of the first motor MG1 and the second motor MG2. Since the first motor MG1 functions to keep the sun gear shaft 125 at a stop, no additional constituent, such as an oil hydraulic brake or clutch, is required to fix the sun gear shaft 125. This results in a simpler structure of the apparatus.

In the power output apparatus 110 of the embodiment, the value '0' is set to the torque command value Tm2* of the second motor MG2 to realize the operation without the second motor MG2. In accordance with another possible structure, the second motor MG2 may consume the electrical energy discharged from the battery 194 to output the power to the ring gear shaft 126, or may regenerate electric power from the ring gear shaft 126 to charge the battery 194. This alternative structure does not restrict the torque control process in the lock-up mode to the case in which both the torque command value Tr* and the revolving speed Nr are within the efficient driving range (see FIG. 10) of the engine 150 while the sun gear 121 is at a stop, but enables the torque control process in the lock-up mode to be carried out as long as the revolving speed Nr is within the efficient driving range of the engine 150 while the sun gear 121 is at a stop.

(8) Process of Controlling Torque in Motor Driving Mode

Figure 26:
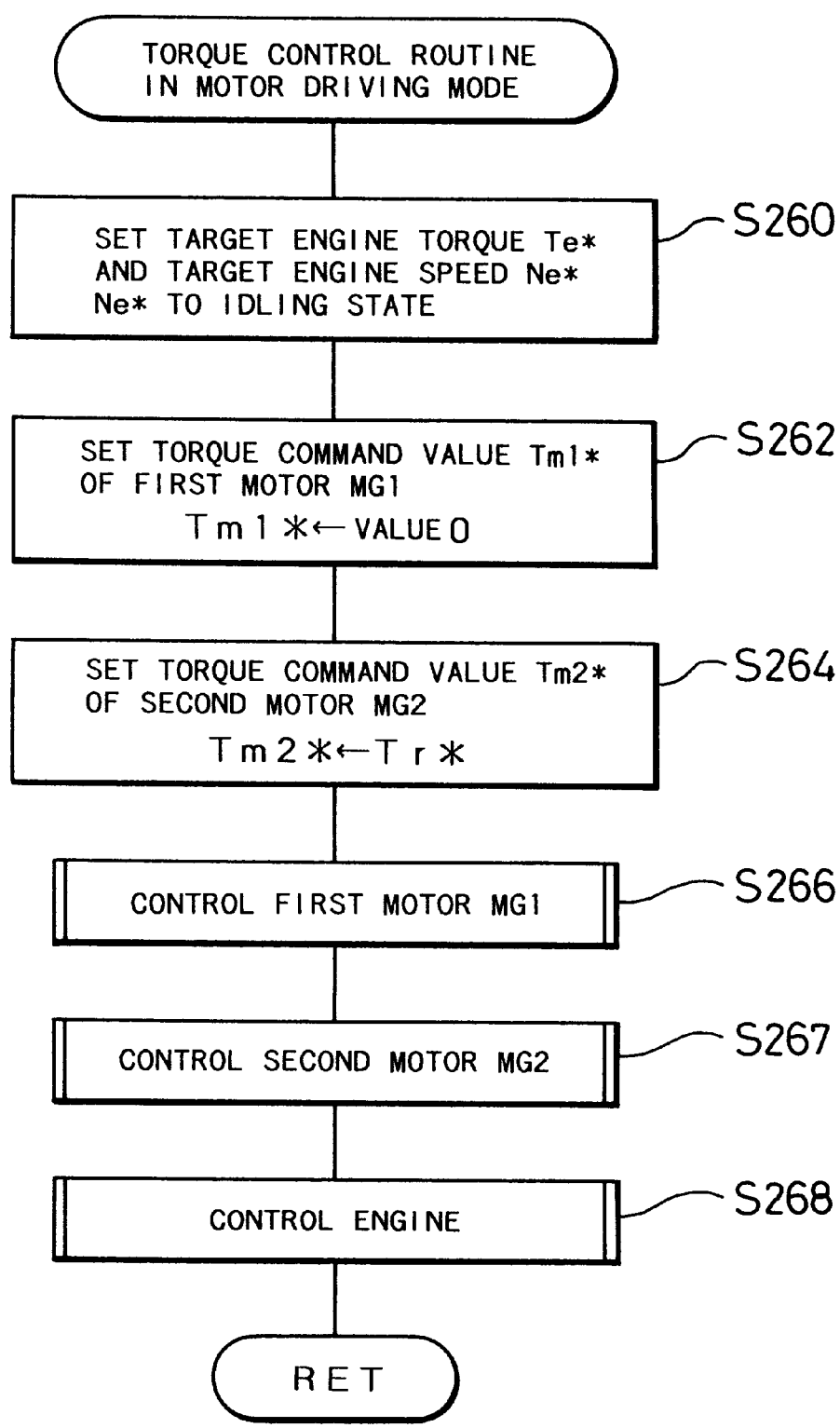
FIG. 26 is a flowchart showing a torque control routine in the motor driving mode executed by the control CPU 190 of the controller 180.

The torque control in the motor driving mode at step S120 in the flowchart of FIG. 7 is carried out according to a routine of controlling the torque in the motor driving mode shown in the flowchart of FIG. 26. As discussed previously, the motor driving mode is selected as the optimal operation mode of the power output apparatus 110 at step S144 in the flowchart of FIG. 9, when it is determined at step S142 that the energy Pr to be output to the ring gear shaft 126 is smaller than the predetermined energy PML and that the revolving speed Nr of the ring tear shaft 126 is lower than the predetermined revolving speed NML. This routine is executed under such conditions.

Figure 27:
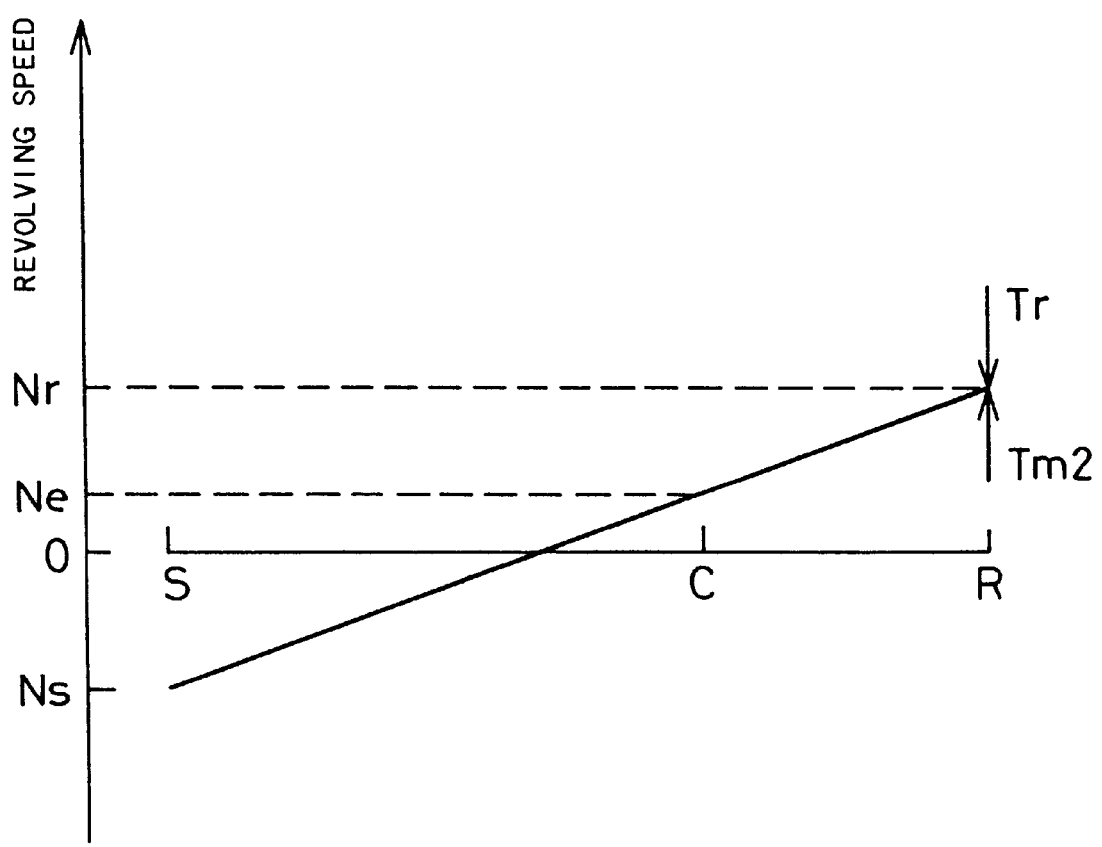
FIG. 27 s a nomogram showing the relationship between the revolving speed and the torque on the three shafts linked with the planetary gear 120 in the torque control process in the motor driving mode.

When the program enters the routine of FIG. 26, the control CPU 190 of the controller 180 sets the engine 150 at an idle at step S260. In accordance with a concrete procedures the target engine torque Te* is set equal to zero and the target engine speed Ne* is set equal to an idle revolving speed Ni. The control CPU 190 subsequently sets the value '0' to the torque command value Tm1* of the first motor MG1 at step S262, and the torque command value Tr* to the torque command value Tm2* of the second motor MG2 at step S264. The first motor MG1, the second motor MG2, and the engine 150 are controlled respectively with the preset torque command values at steps S266 through S268. Since the torque command value Tm1* is equal to zero, the control of the first motor MG1 at step S266 turns off all the transistors Tr1 through Tr6 in the first driving circuit 191. The control of the engine 150 at step S268 fully closes the throttle valve 166 and subsequently regulates the amount of fuel injection as well as the position of an idle speed control valve (not shown) disposed in a connection pipe for idling control (not shown) that bypasses the throttle valve 166 in order to enable the engine 150 to be driven at the idle revolving speed Ni. FIG. 27 is a nomogram in the torque control process in the motor driving mode.

The torque control in the motor driving mode discussed above enables only the power from the second motor MG2 to be output to the ring gear shaft 126. There is accordingly no output of the power from the engine 150 in the specific ranges where the engine 150 has a low efficiency and outputs a relatively small energy. This structure effectively enhances the efficiency of the whole apparatus. Although the torque control in the motor driving mode of this embodiment drives the engine 150 at the idle revolving speed, an alternative structure may stop operation of the engine 150 and set the engine speed We equal to zero.

As discussed above, the power output apparatus 110 of the first embodiment carries out the various torque control processes to enable the power to be output to the ring gear shaft 126 and eventually to the driving wheels 116 and 118 with a high efficiency. The structure of the first embodiment also enables the power output to the ring gear shaft 126 to be taken out of the arrangement between the first motor MG1 and the second motor MG2 and transmitted to the driving wheels 116 and 118.

The power output apparatus 110 of the first embodiment carries out the torque control processes in the charge-discharge mode, in the power assist mode, in the lock-up mode, and in the motor driving mode, based on the remaining charge BRM of the battery 194, the energy Pr to be output to the ring gear shaft 126, the torque command value Tr*, and the revolving speed Nr of the ring gear shaft 126. One or some of these torque control processes may, however, be omitted according to the requirements In the power output apparatus 110 of the first embodiment, the torque control in the motor driving mode is carried out when it is determined that the energy Pr to be output to the ring gear shaft 126 is smaller than the predetermined energy PML and that the revolving speed Nr of the ring gear shaft 126 is lower than the predetermined revolving speed NML. In accordance with an alternative structure, however, the torque control in the motor driving mode may be carried out irrespective of the energy to be output to the ring gear shaft 126 and the revolving speed Nr of the ring gear shaft 126.

Figure 28:
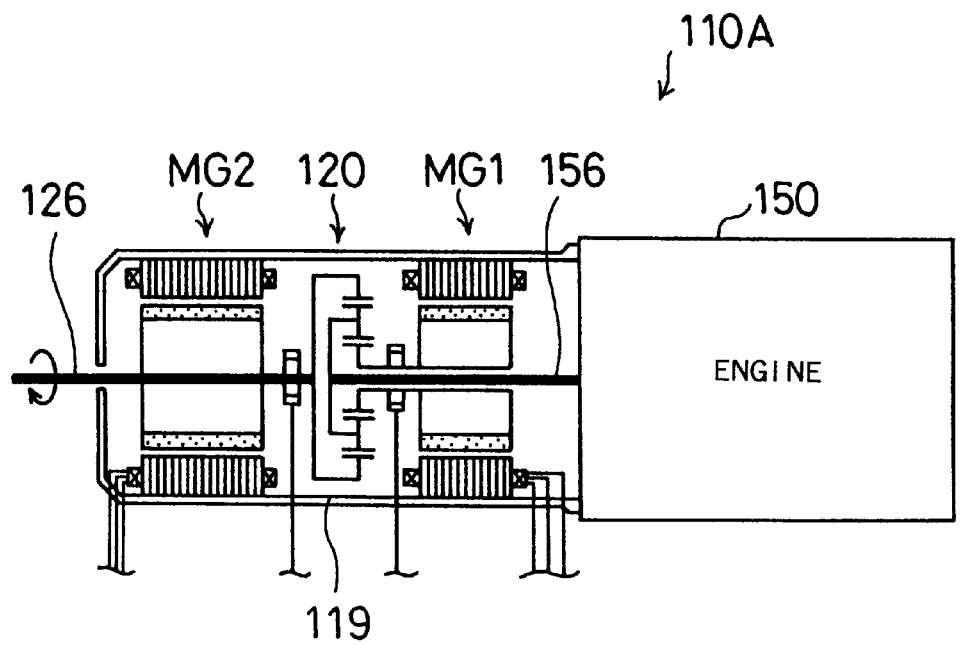
FIG. 28 schematically illustrates structure of another power output apparatus 110A as a modification of the first embodiment.
Figure 29:
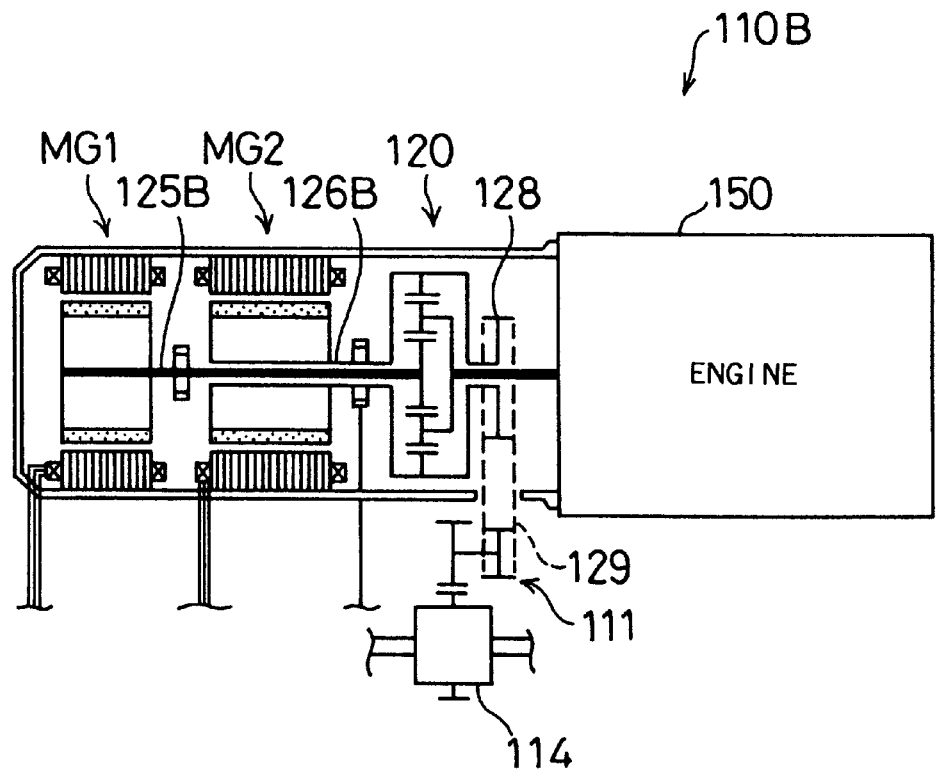
FIG. 29 schematically illustrates structure of still another power output apparatus 110B as another modification of the first embodiment.

In the power output apparatus 110 of the first embodiment, the power output to the ring gear shaft 126 is taken out of the arrangement between the first motor MG1 and the second motor MG2 via the power feed gear 128 linked with the ring gear 122. Like another power output apparatus 110A of modified structure shown in FIG. 28, however, the power may be taken out of the casing 119, from which the ring gear shaft 126 is extended. FIG. 29 shows still another power output apparatus 110B of modified structure, wherein the engine 150, the planetary gear 120, the second motor MG2, and the first motor MG1 are arranged in this sequence. In this case, a sun gear shaft 125B may not have a hollow structure, whereas a hollow ring gear shaft 126B is required. This modified structure enables the power output to the ring gear shaft 126B to be taken out of the arrangement between the engine 150 and the second motor MG2.

2. Power Output Apparatus 110C of Second Embodiment (1) Structure

Figure 30:
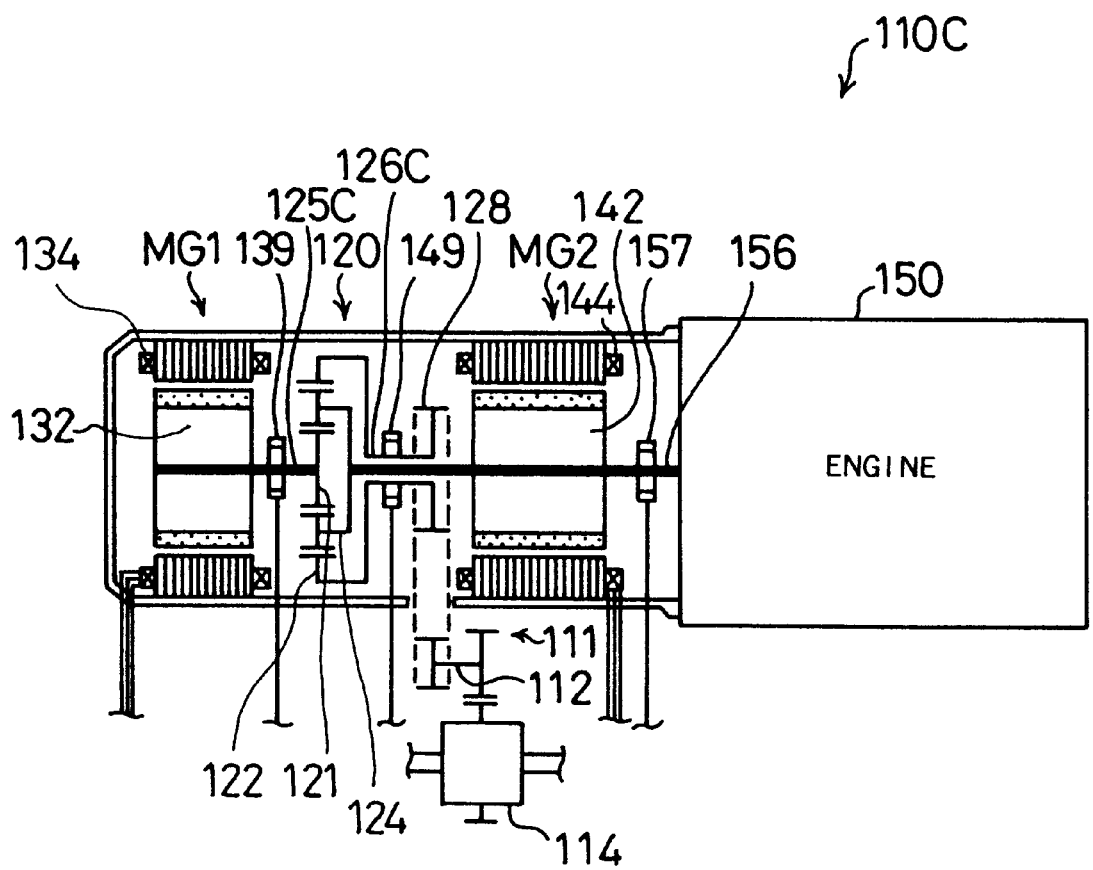
FIG. 30 schematically illustrates structure of a power output apparatus 110C as a second embodiment according to the present invention.

The following describes another power output apparatus 110C as a second embodiment according to the present invention. FIG. 30 shows an essential part of the power output apparatus 110C of the second embodiment. Referring to FIG. 30, the power output apparatus 110C of the second embodiment has a similar structure to that of the power output apparatus 110 of the first embodiments except that the rotor 142 of the second motor MG2 is attached to the crankshaft 156 and that the two motors MG1 and MG2 have a different arrangement. The same part as that of the power output apparatus 110 of the first embodiment shown in FIG. 1, such as the controller 180, is thus omitted from the drawing of FIG. 30. nThe power output apparatus 110C of the second embodiment can be mounted on the vehicle in the same manner as illustrated in FIG. 3. The constituents of the power output apparatus 110C of the second embodiment that are identical with those of the power output apparatus 110 of the first embodiment are expressed by like numerals and not specifically described here. The numerals and symbols used in the description of the first embodiment have the same meanings in the second embodiment, unless otherwise specified.

Referring to FIG. 30, in the power output apparatus 110C of the second embodiment, the engine 150, the second motor MG2, the planetary gear 120, and the first motor MG1 are arranged in this sequence. The rotor 132 of the first motor MG1 is attached to a sun gear shaft 125C connecting with the sun gear 121 of the planetary gear 120. Like the power output apparatus 110 of the first embodiments the planetary carrier 124 is attached to the crankshaft 156 of the engine 150. The rotor 142 of the second motor MG2 and a resolver 157 for measuring a rotational angle θe of the crankshaft 156 are further attached to the crankshaft 156. A ring gear shaft 126C linked with the ring gear 122 of the planetary gear 120 has another resolver 149 mounted thereon for measuring a rotational angle θr of the ring gear shaft 126C and is connected to the power feed gear 128.

The arrangement of the power output apparatus 110C of the second embodiment is different from that of the power output apparatus 110 of the first embodiment. In both the arrangements, however, the three-phase coils 134 of the first motor MG1 are connected with the first driving circuit 191 of the controller 180, and the three-phase coils 144 of the second motor MG2 with the second driving circuit 191. Although not being illustrated, the resolver 157 is connected to the input port of the control CPU 190 of the controller 180 via a signal line.

(2) Principle of Operation

Figure 31:
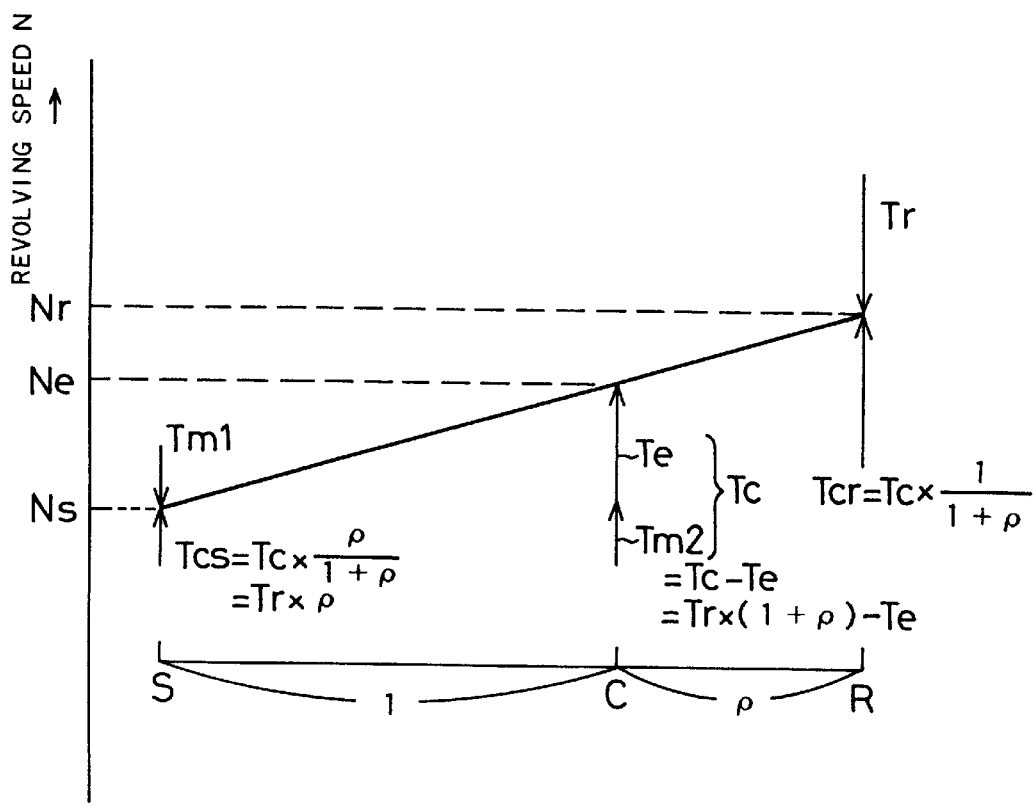
FIG. 31 is a nomogram showing the relationship between the revolving speed and the torque on the three shafts linked with the planetary gear 120 in the power output apparatus 110C of the second embodiment.
Figure 32:
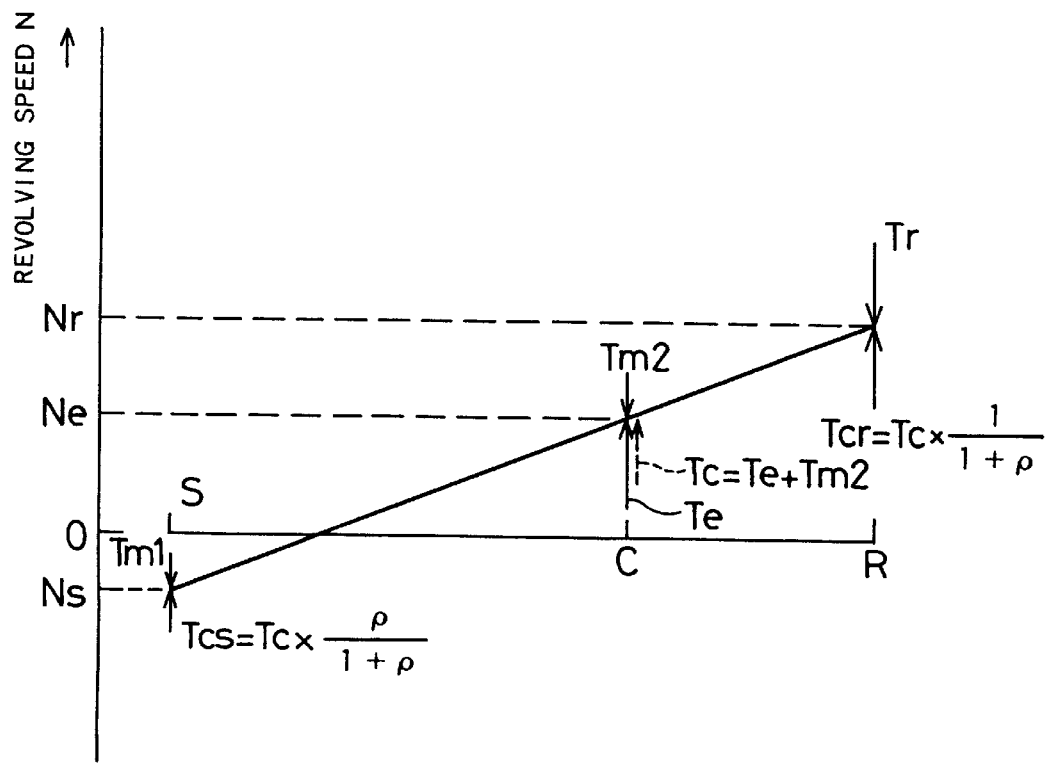
FIG. 32 is a nomogram showing the relationship between the revolving speed and the torque on the three shafts linked with the planetary gear 120 in the power output apparatus 110C of the second embodiment.

The power output apparatus 110C of the second embodiment works in the manner discussed below. By way of example, it is assumed that the engine 150 is driven at the driving point P1 of the revolving speed Ne and the torque Te and that the ring gear shaft 126C is driven at the driving point P2, which is defined by the revolving speed Nr and the torque Tr and gives an energy Pr (Pr=Nr×Tr) identical with an energy Pe (Pe=Ne×Te) output from the engine 150. This means that the power output from the engine 150 is subjected to torque conversion and applied to the ring gear shaft 126C. FIGS. 31 and 32 are nomograms under such conditions.

Equations (16) through (19) given below are led by taking into account the balance on a dynamic collinear line in the nomogram of FIG. 31. Equation (16) is derived from the balance between the energy Pe input from the engine 150 and the energy Pr output to the ring gear shaft 126C. Equation (17) is given as a sum of energy input into the planetary carrier 124 via the crankshaft 156. Equations (18) and (19) are obtained by dividing the torque acting on the planetary carrier 124 into torques on the coordinate axes S and R working as lines of action.

$$Te \times Ne = Tr \times Nr \quad (16)$$

$$Tc = Te + Tm2 \quad (17)$$

$$Tcs = Tc \times \frac{\rho}{1+\rho} \quad (18)$$

$$Tcr = Tc \times \frac{1}{1+\rho} \quad (19)$$

The equilibrium of forces on the dynamic collinear line is essential for the stable state of the dynamic collinear line. For that purposes the torque Tm1 should be made equal to a torque Tcs, and the torque Tr equal to a torque Tcr. Based on these relationships, the torques Tm1 and Tm2 are expressed as Equations (20) and (21) given below:

$$Tm1=Tr \times \rho \quad (20)$$

$$Tm2=Tr \times (1 \times \rho)-Te \quad (21)$$

The first motor MG1 applies the torque Tm1 determined by Equation (20) to the sun gear shaft 125C, while the second motor MG2 applies the torque Tm2 determined by Equation (21) to the crankshaft 156. This enables the power output from the engine 150 and defined by the torque Te and the revolving speed Ne to be converted to the power defined by the torque Tr and revolving speed Nr and output to the ring gear shaft 126. In the state of the nomogram of FIG. 31, the first motor MG1 applies the torque in reverse of the rotation of the rotor 132 and thereby functions as a generator to regenerate electrical energy Pm1 expressed as the product of the torque Tm1 and the revolving speed Ns. The second motor MG2, on the other hands applies the torque in the direction of rotation of the rotor 142 and thereby functions as a motor to consume electrical energy Pm2 expressed as the product of the torque Tm2 and the revolving speed Although the revolving speed Ns of the sun gear shaft 125C has a positive value in the nomogram of FIG. 31, it may be negative according to the revolving speed We of the engine 150 and the revolving speed Nr of the ring gear shaft 126C as shown in the nomogram of FIG. 32. In the latter case, the first motor MG1 applies the torque in the direction of rotation of the rotor 132 and thereby functions as a motor to consume the electrical energy Pm1 expressed as the product of the torque Tm1 and the revolving speed Ns. The second motor MG2, on the other hand, applies the torque in reverse of the rotation of the rotor 142 and thereby functions as a generator to regenerate the electrical energy Pm2, which is expressed as the product of the torque Tm2 and the revolving speed Nr, from the ring gear shaft 126C.

Like the power output apparatus 110 of the first embodiment, the operation principle of the power output apparatus 110C of the second embodiment discussed above is on the assumption that the efficiency of power conversion by the planetary gear 120, the motors MG1 and MG2, and the transistors Tr1 through Tr16 is equal to the value '1' which represents 100%. In the actual state, however, the conversion efficiency is less than the value '1', and it is thus required to make the energy Pe output from the engine 150 a little greater than the energy Pr output to the ring gear shaft 126C or alternatively to make the energy Pr output to the ring gear shaft 126C a little smaller than the energy Pe output from the engine 150. As discussed previously, an energy loss in the planetary gear 120 due to a mechanical friction or the like is significantly small and the efficiency of the synchronous motors used as the first and the second motors MG1 and MG2 is very close to the value '1'. The efficiency of power conversion is thus practically equal to the value '1'. In the following discussion of the second embodiment, the efficiency is considered equal to the value '1' (=100%), unless otherwise specified.

The above description refers to the fundamental operation of the power output apparatus 110C of the second embodiment. Like the power output apparatus 110 of the first embodiment, the power output apparatus 110C of the second embodiment can perform other operations as well as the above fundamental operation that carries out the torque conversion for all the power output from the engine 150 and outputs the converted torque to the ring gear shaft 126C. The possible operations include an operation of adding electrical energy stored in the battery 194 to the power output from the engine 150 and outputting the total energy to the ring gear shaft 126C and another operation of storing part of the power output from the engine 150 into the battery 194 as electrical energy.

(3) Operation Control

Like in the power output apparatus 110 of the first embodiment, in the power output apparatus 110C of the second embodiment, the controller 180 executes the operation control routine shown in the flowchart of FIG. 7 and the operation mode determination routine shown in the flowchart of FIG. 9. In the second embodiments these routines can be carried out in the same manner as the first embodiment, since they are not concerned in the operation of the second motor MG2. The following describes the torque control processes executed by the controller 180 of the second embodiment at steps S112 through S120 in the operation control routine of FIG. 7.

(4) Process of Controlling Torque in ordinary Driving Mode

Figure 33:
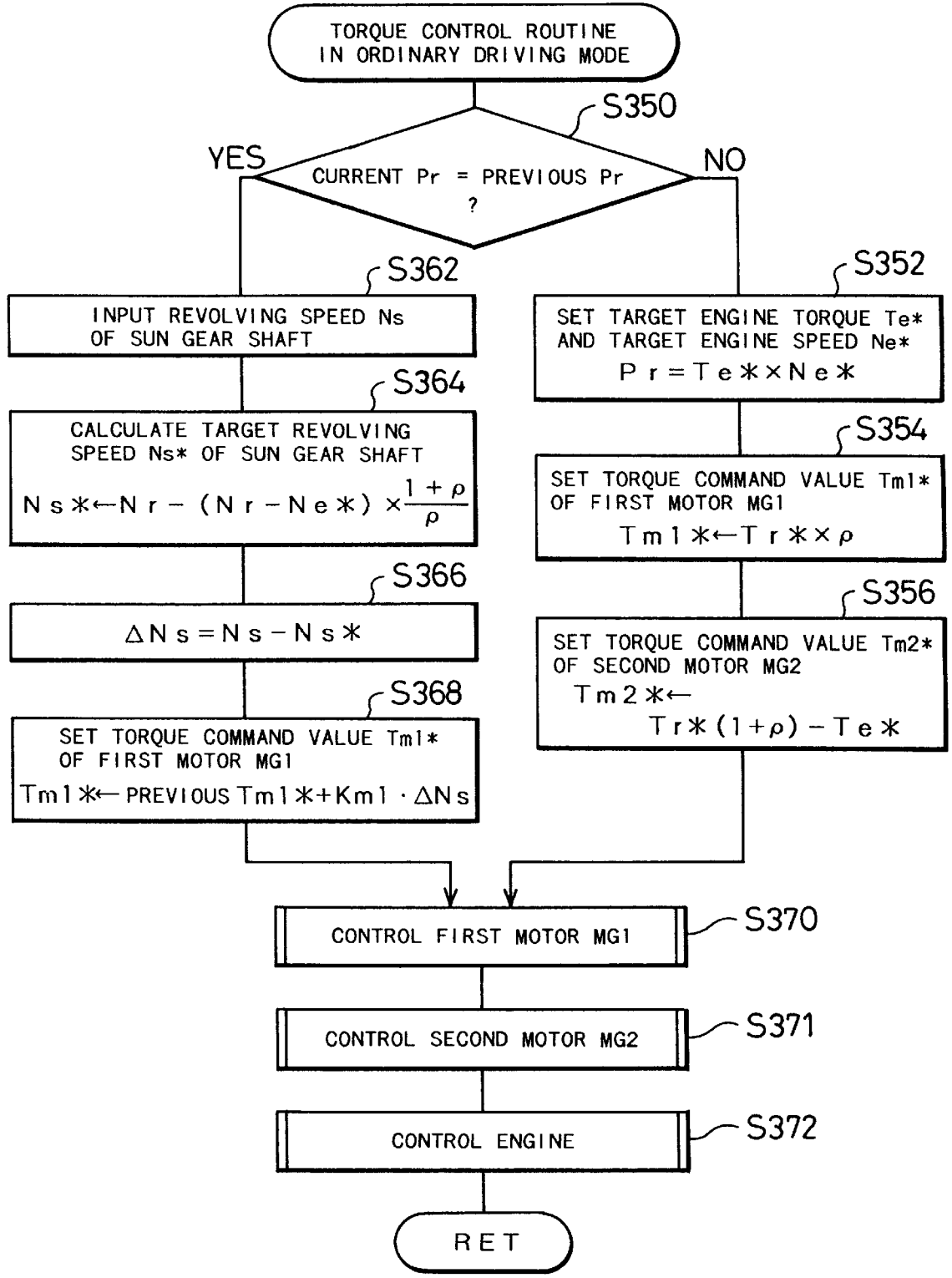
FIG. 33 is a flowchart showing a torque control routine in the ordinary driving mode executed by the control CPU 190 of the controller 180 of the second embodiment.

FIG. 33 is a flowchart showing a torque control routine in the ordinary driving mode executed by the controller 180 of the second embodiment. When the program enters the routine of FIG. 33, at step S350, the control CPU 190 of the controller 180 first compares the current value of energy Pr to be output to the ring gear shaft 126C with a previous value of energy Pr used in the previous cycle of this routine. When the current value of energy Pr is different from the previous value of energy Pr, the control CPU 190 sets the target torque Te* and the target revolving speed Ne* of the engine 150 at step S352 in the same manner as the first embodiment. The torque command values Tm1* and Tm2* of the first and second motors MG1 and MG2 are then calculated according to Equations (20) and (21) given above at steps S354 and S356. Equations (20) and (21) can determine the torque command values Tm1* and Tm2*, because of the balance on the dynamic collinear line as discussed above in the nomograms of FIGS. 31 and 32.

After setting the target torque Te* and the target revolving speed Ne* of the engine 150 and the torque command values Tm1* and Tm2* of the first and the second motors MG1 and MG2, the program proceeds to steps S370, S371, and S372 to control the first motor MG1, the second motor MG2, and the engine 150. Like in the first embodiment, the control operations of the first motor MG1, the second motor MG2, and the engine 150 are shown as separate steps in the second embodiment for convenience of illustration. In the actual procedure, however, these control operations are carried out comprehensively. The concrete procedures of steps S370 through S372 are identical with those of steps S170 through S172 in the torque control routine in the ordinary driving mode of the first embodiment shown in FIG. 11. The control process of the first motor MG1 at step S370 follows the control routine of the first motor MG1 shown in the flowchart of FIG. 14, whereas the control process of the second motor MG2 at step S371 follows the control routine of the second motor MG2 shown in the flowchart of FIG. 15. The control process of the engine 150 at step S372 drives the EFIECU 170 to regulate the amount of fuel injection from the fuel injection valve 151 and the position of the throttle valve 166, in order to make the torque Te and the revolving speed Ne of the engine 150 approach the target torque Te* and the target revolving speed Ne*. In the second embodiments since the rotor 142 of the second motor MG2 is attached to the crankshaft 156, the rotational angle θe of the crankshaft 156 measured with the resolver 157 mounted on the crankshaft 156 is input at step S190 in the control routine of the second motor MG2 shown in the flowchart of FIG. 15. The rotational angle θe is accordingly used in place of the rotational angle θr in the processing of step S191 and subsequent steps.

When it is determined that the current value of energy Pr to be output to the ring gear shaft 126 is identical with the previous value of energy Pr at step S350, on the other hands the program carries out the processing of steps S362 through S372, which is identical with the processing of steps S162 through S172 in the torque control routine in the ordinary driving mode of the first embodiment shown in the flowchart of FIG. 11. The processing carries out the feed back control to make the revolving speed Ns of the sun gear shaft 125C coincide with the target revolving speed Ns*, thereby enabling the revolving speed Ne of the engine 150 to approach the target revolving speed Ne*. The details of the control procedure are discussed above and thus omitted here.

As discussed above, the torque control process in the ordinary driving mode converts the power output from the engine 150 to a desired torque by means of the planetary gear 120, the first motor MG1 and the second motor MG2, and outputs the desired torque to the ring gear shaft 126C and eventually to the driving wheels 116 and 118. As long as the output energy Pe coincides with the energy Pr to be output to the ring gear shaft 126C the engine 150 may be driven at any driving point defined by the revolving speed Ne and the torque Te. This allows the engine 150 to be driven at a desired driving point of highest possible efficiency, thereby enhancing the efficiency of the whole apparatus. The first motor MG1 controls the revolving speed Ns of the sun gear shaft 125C to the target revolving speed Ns*, thereby enabling the revolving speed Ne of the engine 150 to approach the target engine speed Ne*.

Like in the power output apparatus 110 of the first embodiment, in the power output apparatus 110C of the second embodiment, the feed-back control is carried out with the first motor MG1 to make the revolving speed Ns of the sun gear shaft 125C approach the target revolving speed Ns*, when the current value of energy Pr to be output to the ring gear shaft 126C is identical with the previous value of energy Pr. Such feed-back control may, however, be omitted. The target torque Te* and the target revolving speed Ne* of the engine 150 may be set according to a map for storing discontinuous driving points that enable the engine 150 to be driven at the highest possible efficiency but do not enable the engine 150 to vary its driving state smoothly with a variation in energy Pr. These target values may alternatively be set as desirable driving points such as the driving points that enable the engine 150 to improve the emission to the lowest possible level and the driving points that reduce the noise of the engine 150 to the lowest possible level.

(5) Process of Controlling Torque in Charge-Discharge Mode

Figure 34:
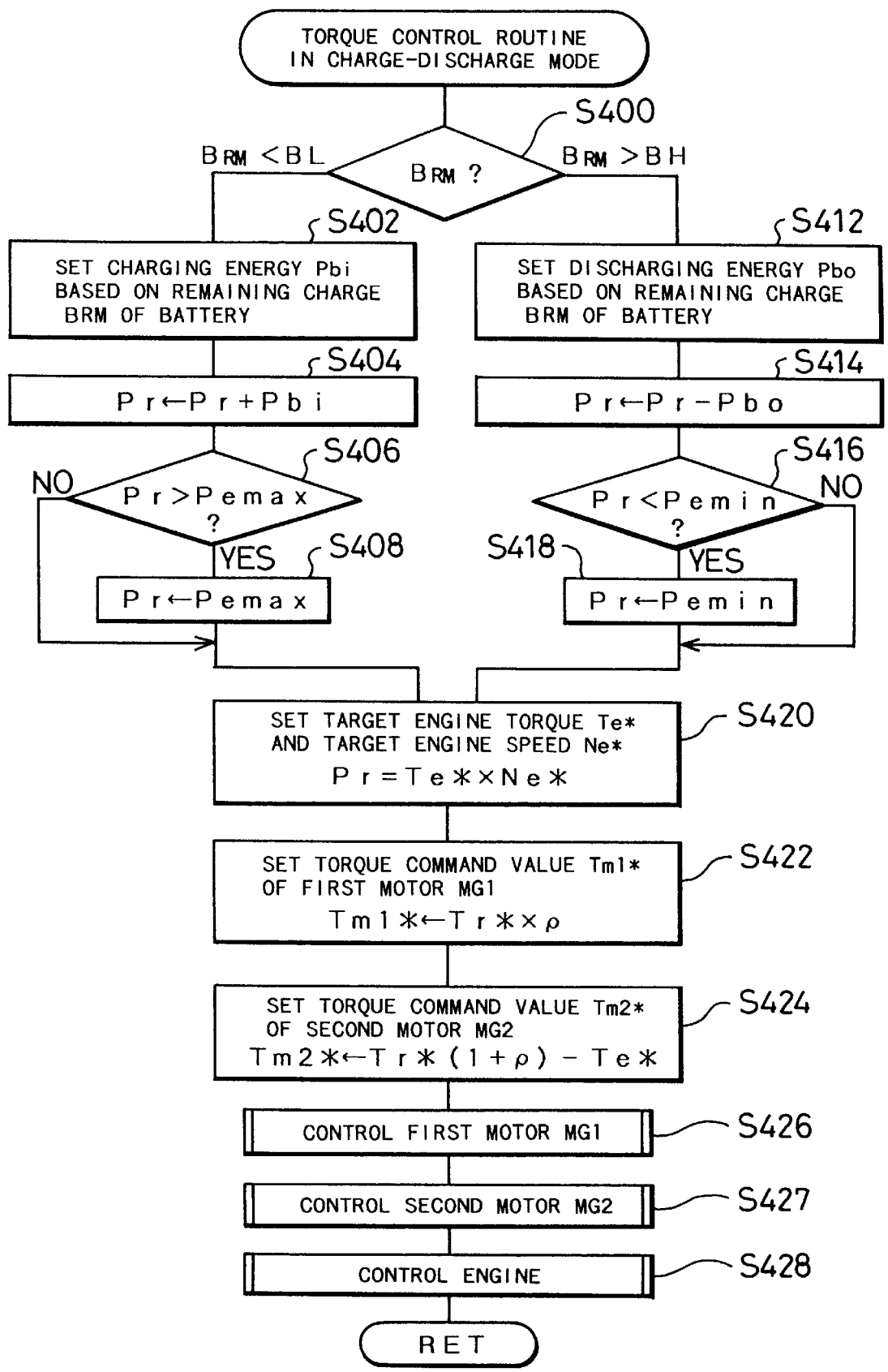
FIG. 34 is a flowchart showing a torque control routine in the charge-discharge mode executed by the control CPU 190 of the controller 180 of the second embodiment.

FIG. 34 is a flowchart showing a torque control routine in the charge-discharge mode executed by the controller 180 of the second embodiment. The processing of steps S400 through S420 in the flowchart of FIG. 34 is identical with the processing of steps S200 through S220 in the torque control routine in the charge-discharge mode of the first embodiment shown in the flowchart of FIG. 16. The procedures of steps S426 through S428 are also identical with those of steps S370 through S372 in the torque control routine in the ordinary driving mode shown in the flowchart of FIG. 33. The processes of steps S422 and S424 which are different from the first embodiment are discussed below.

The control CPU 190 of the controller 180 sets the torque command value Tm1* of the first motor MG1 according to Equation (20) given above at step S422, and sets the torque command value Tm2* of the second motor MG2 according to Equation (21) given above at step S424. The torque command values Tm1* and Tm2* set in this routine are calculated according to the same equations as those used at steps S354 and S356 in the torque control routine in the ordinary driving mode shown in the flowchart of FIG. 33. In this routine, however, the value of energy Pr is set anew by taking into account the charging energy Pbi through the processing of steps S402 to S408 or by taking into account the discharging energy Pbo through the processing of steps S412 to S418, and the target torque Te* of the engine 150 is set based on this newly set energy Pr. Whereas the torque command value Tm1* of the first motor MG1 set at step S422 is identical with that set at step S354 in the flowchart of FIG. 33, the torque command value Tm2* of the second motor MG2 set at step S424 is different from that set at step S356 in the flowchart of FIG. 33. Namely the energy Pm1 regenerated or consumed by the first motor MG1 becomes different from the energy Pm2 consumed or regenerated by the second motor MG2. This results in a surplus or deficiency in the energy balance. The processing of this routine accordingly charges the battery 194 with the excess energy or discharges the battery 194 to supplement the insufficient energy.

The torque control process in the charge-discharge mode discussed above can keep the remaining charge BRM of the battery 194 within a desired range, thereby effectively preventing the battery 194 from being charged or discharged to an excessive degree. This process also enables a desired amount of power to be output to the ring gear shaft 126C and eventually to the driving wheels 116 and 118 by the functions of the engine 150, the planetary gear 120, the first motor MG1, the second motor MG2, and the battery 194. The engine 150 may be driven at any driving point that can output the preset energy Pr. This allows the engine 150 to be driven at a desired driving point of highest possible efficiency, thereby enhancing the efficiency of the whole apparatus.

Like the power output apparatus 110 of the first embodiment, the power output apparatus 110C of the second embodiment sets the charging energy Pbi and the discharging energy Pbo based on the remaining charge BRM of the battery 194. The charging energy Pbi and the discharging energy Pbo may, however, be any predetermined values.

(6) Process of Controlling Torque in Power Assist Mode

Figure 35:
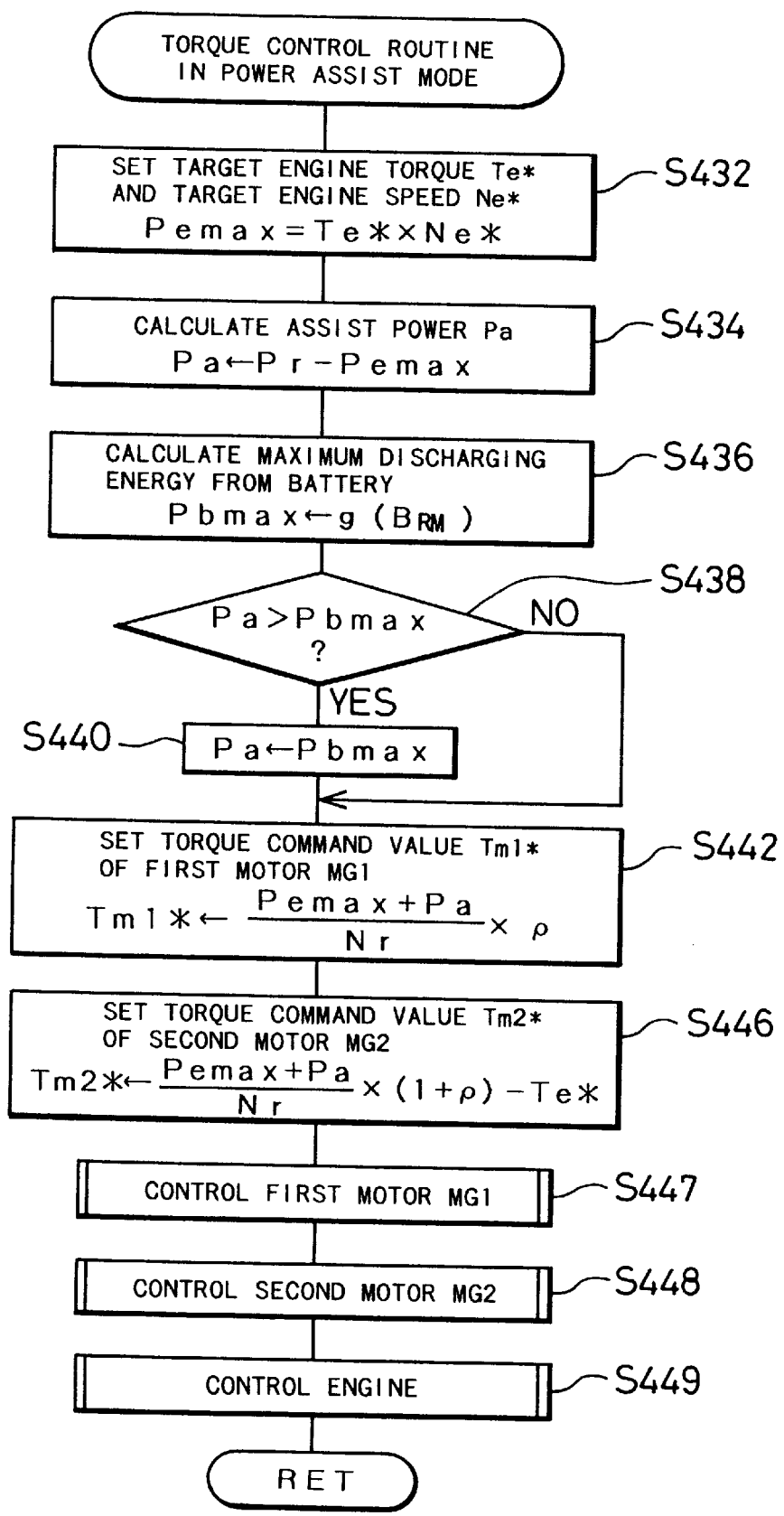
FIG. 35 is a flowchart showing a torque control routine in the power assist mode executed by the control CPU 190 of the controller 180 of the second embodiment.

FIG. 35 is a flowchart showing a torque control routine in the power assist mode executed by the controller 180 of the second embodiment. The processing of steps S432 through S440 in the flowchart of FIG. 35 is identical with the processing of steps S232 through S240 in the torque control routine in the power assist mode of the first embodiment shown in the flowchart of FIG. 20. The procedures of steps S447 through S449 are also identical with those of steps S370 through S372 in the torque control routine in the ordinary driving mode shown in the flowchart of FIG. 33. The processes of steps S442 and S446 which are different from the first embodiment are discussed below.

The control CPU 190 of the controller 180 sets the torque command value Tm1* of the first motor MG1 according to Equation (22) given below at step S442, and sets the torque command value Tm2* of the second motor MG2 according to Equation (23) given below at step S446:

$$Tm1^* \leftarrow \frac{Pe\max + Pa}{Nr} \times \rho \quad (22)$$

$$Tm2^* \leftarrow \frac{Pe\max + Pa}{Nr} \times (1 + \rho) - Te^* \quad (23)$$

Figure 36:
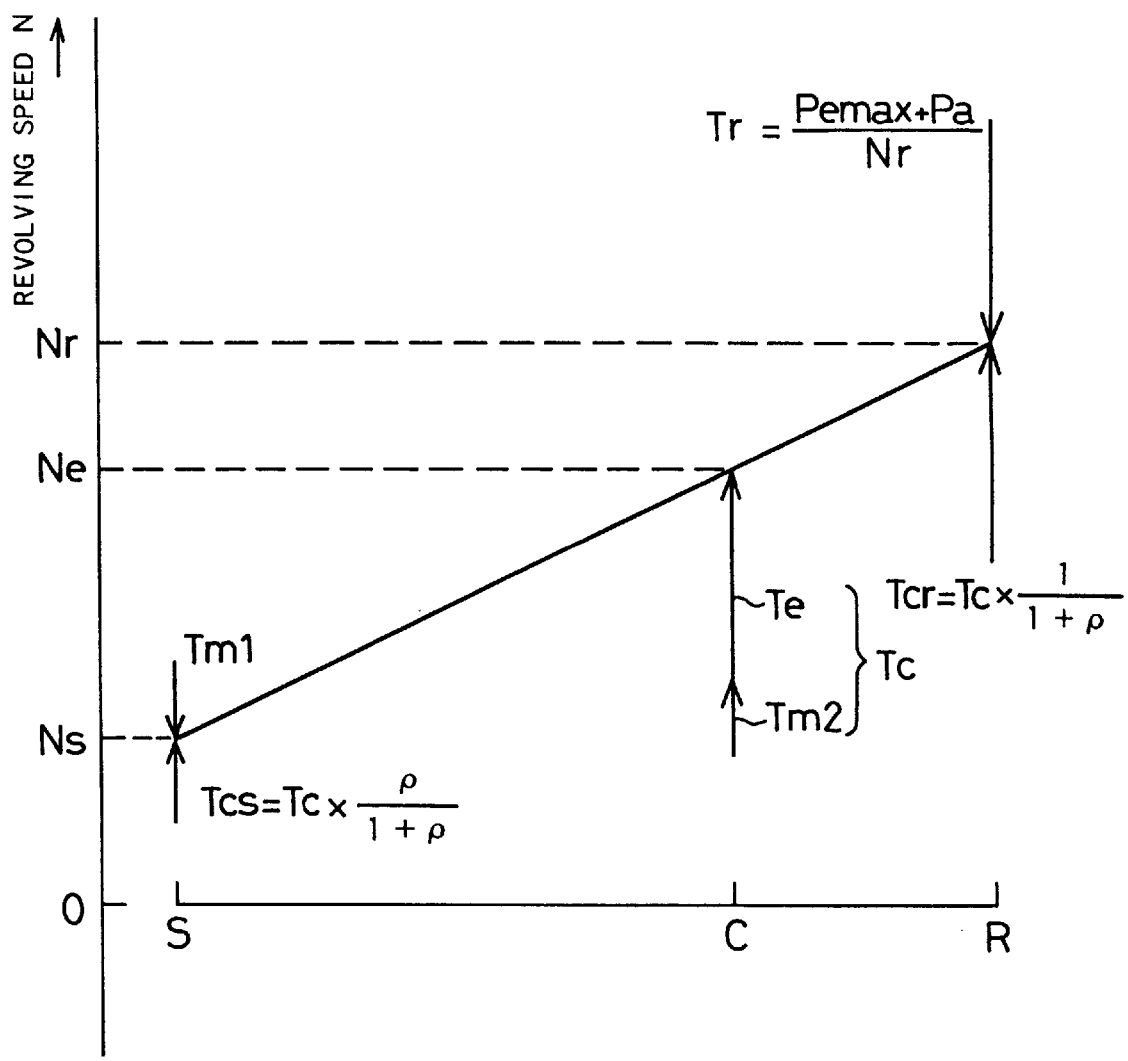
FIG. 36 is a nomogram showing the relationship between the revolving speed and the torque on the three shafts linked with the planetary gear 120 in the torque control process in the power assist mode of the second embodiment.

These Equations (22) and (23) are led from the nomogram of FIG. 36. It is assumed that the input power to the planetary carrier 124 is the sum of the maximum energy Pemax and the assist power Pa. In this case, the input power is based on the total torque Tc of the torque Te output from the engine 150 and the torque Tm2 output from the second motor MG2. The power is subjected to the torque conversion and output from the ring gear shaft 126C, so that the torque Tr output to the ring gear shaft 126C is obtained by dividing the sum of the maximum energy Pemax and the assist power Pa by the revolving speed Nr. The total torque Tc of the torque Te and the torque Tm2 can be divided into the torques Tcs and Tcr on the coordinates axes S and R functioning as the lines of action. Since the torque Tr is equal to the torque Tcr on the coordinate axis R, the torque Tc can be expressed as the first term on the right side of Equation (23). Equation (23) is accordingly led to determine the torque command value Tm2*. Since the torque Tc is expressed as the first term on the right side of Equation (23), the torque Tcs on the coordinate axis S working as the line of action is obtained by multiplying the torque Tc by $\rho/(1+\rho)$ (see Equation (3)). Equation (22) is accordingly led to determine the torque command value Tm1*. In case that the motors MG1 and MG2 are driven with the torque command values Tm1* and Tm2* set in this manner, the electric power consumed by the first motor MG1 or the second motor MG2 becomes greater than the electric power regenerated by the first motor MG1 or the second motor MG2. The battery 194 is thus discharged to supplement the insufficiency of electric power.

The torque control process in the power assist mode discussed above enables energy equal to or greater than the maximum energy Pemax of the engine 150 to be output to the ring gear shaft 126C and eventually to the driving wheels 116 and 118. The engine 150 may accordingly have a low rated capacity having the maximum energy smaller than the required output energy to the ring gear shaft 126C. This effectively reduces the size of the whole apparatus and saves energy. The engine 150 may be driven at any driving point (defined by the revolving speed me and the torque Te) that can output the maximum energy Pemax. This allows the engine 150 to be driven at a desired driving point of highest possible efficiency, thereby enhancing the efficiency of the whole apparatus.

(7) Process of Controlling Torque in Lock-up Mode

The torque control process in the lock-up mode of the second embodiment follows the torque control routine in the lock-up mode of the first embodiment shown in the flowchart of FIG. 23. The torque control in the lock-up mode is independent of the arrangement of the second motor MG2, since the torque command value Tm2* of the second motor MG2 is set equal to the value '0' in the lock-up mode of FIG. 23.

The power output apparatus 110C of the second embodiment carries out the torque control process in the lock-up mode shown in FIG. 23 and accordingly exerts the same effect as that of the power output apparatus 110 of the first embodiment. This effect is attributable to the structure that enables the power of the engine 150 to be directly output to the ring gear shaft 126C via the gear ratio. The first motor MG1 functions to keep the sun gear shaft 125C at a stop, so that no additional constituent, such as an oil hydraulic brake or clutch, is required to fix the sun gear shaft 125C.

Like in the power output apparatus 110 of the first embodiment, in the power output apparatus 110C of the second embodiment, the value '0' is set to the torque command value Tm2* of the second motor MG2. In accordance with another possible structure, the second motor MG2 may consume the electrical energy discharged from the battery 194 to output the power to the crankshaft 156, or may regenerate electric power from the crankshaft 156 to charge the battery 194. This alternative structure does not restrict the torque control process in the lock-up mode to the case in which both the torque command value Tr* and the revolving speed Nr are within the efficient driving range (see FIG. 10) of the engine 150 while the sun gear 121 is at a stop, but enables the torque control process in the lock-up mode to be carried out as long as the revolving speed Nr is within the efficient driving range of the engine 150 while the sun gear 121 is at a stop.

(8) Process of Controlling Torque in Motor Driving mode

Figure 37:
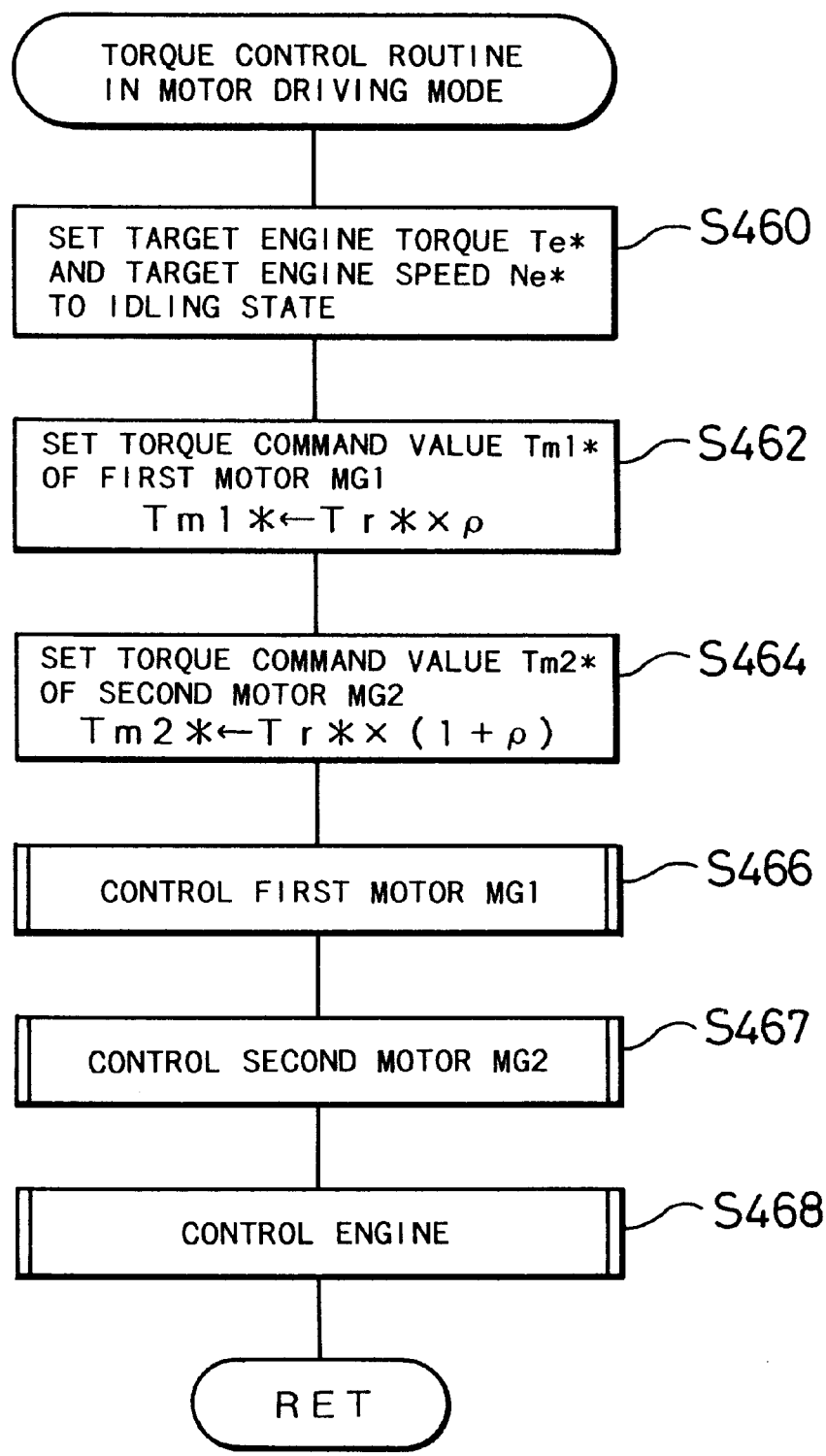
FIG. 37 is a flowchart showing a torque control routine in the motor driving mode executed by the control CPU 190 of the controller 180 of the second embodiment.

FIG. 37 is a flowchart showing a torque control routine in the motor driving mode executed by the controller 180 of the second embodiment When the program enters the routine of FIG. 37, the control CPU 190 of the controller 180 first sets the engine 150 at an idle at step S460, that is, sets the target engine torque Te* equal to zero and the target engine speed Ne* equal to an idle revolving speed Ni. This procedure is identical with the torque control routine in the motor driving mode of the first embodiment. The control CPU 190 then calculates and sets the torque command values Tm1* and Tm2* of the motors MG1 and MG2 according to Equations (20) and (21) given above at steps S462 and S464. The target engine torque Te* to be substituted in the torque Te in the second term on the right side of Equation (21) has been set equal to zero at step S460, and the second term is accordingly omitted in the flowchart of FIG. 37.

Figure 38:
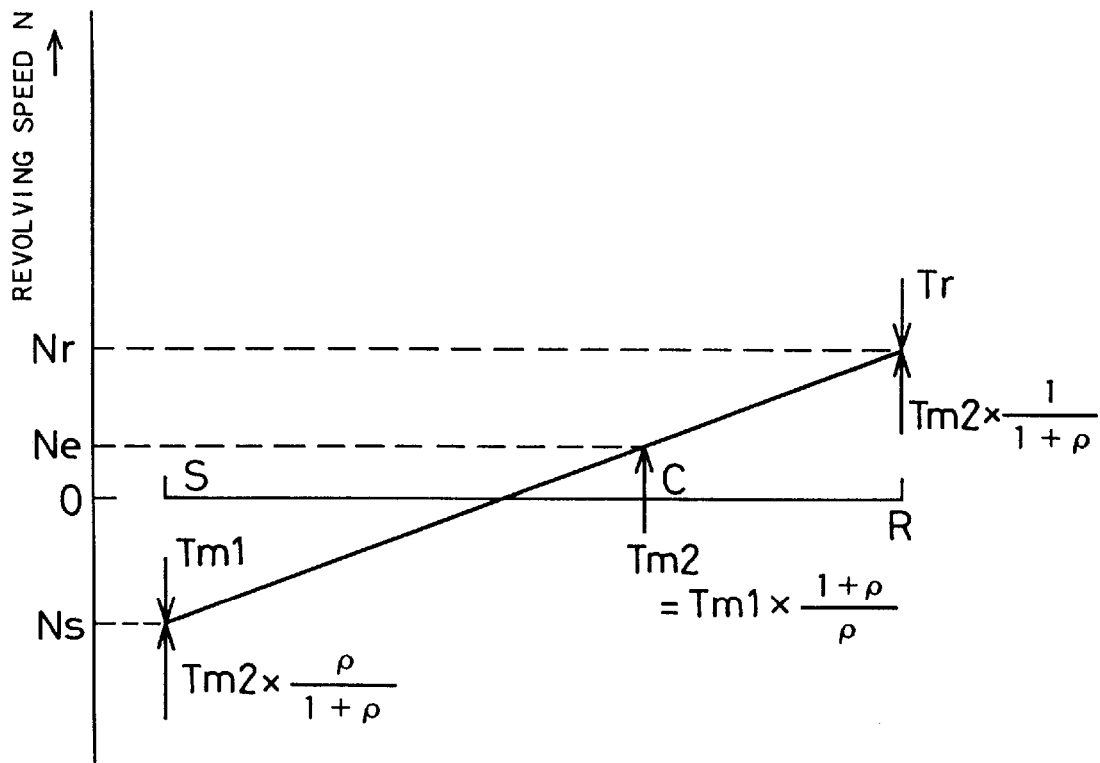
FIG. 38 is a nomogram showing the relationship between the revolving speed and the torque on the three shafts linked with the planetary gear 120 in the torque control process in the motor driving mode of the second embodiment.

Whereas the value '0' is set to the torque command value Tm1* of the first motor MG1 in the torque control process in the motor driving mode of the first embodiment, the value other than zero is set to the torque command value Tm1* in the second embodiment. This is because the second motor MG2 is attached to the crankshaft 156 in the structure of the second embodiment and operation of the first motor MG1 is thus essential to enable the power from the second motor MG2 to be output to the ring gear shaft 126C. FIG. 38 is a nomogram in the torque control process in the motor driving mode of the second embodiment. Referring to FIG. 38, the torque Tm2 from the second motor MG2 acts on the coordinate axis C. In order to allow a portion of the torque Tm2 to act on the coordinate axis R and stabilize the dynamic collinear line in the nomogram, the torque Tm1 is required to act as the reaction torque on the coordinate axis S. Both the first motor MG1 and the second motor MG2 apply the torques in the direction of their rotation and thereby function as motors, and are driven with the electric power discharged from the battery 194. The first motor MG1, the second motor MG2, and the engine 150 are controlled respectively with the preset torque command values at steps S466 through S468. Like in the first embodiment the control of the engine 150 at step S468 fully closes the throttle valve 166 and subsequently regulates the amount of fuel injection as well as the position of an idle speed control valve (not shown) disposed in a connection pipe for idling control (not shown) that bypasses the throttle valve 166 in order to enable the engine 150 to be driven at the idle revolving speed Ni.

The torque control in the motor driving mode discussed above enables only the power from the first motor MG1 and the second motor MG2 to be output to the ring gear shaft 126C. There is accordingly no output of the power from the engine 150 in the specific range, where the engine 150 has a low efficiency and outputs a relatively small energy. This structure effectively enhances the efficiency of the whole apparatus.

In the torque control routine in the motor driving mode shown in the flowchart of FIG. 37, the first motor MG1 is operated while the power of the second motor MG2 is output to the ring gear shaft 126C. In other words, the second motor MG2 is operated while the power of the first motor MG1 is output to the ring gear shaft 126C. In the description above, the power output from the first motor MG1 is used as the reaction force, in order to enable the power from the second motor MG2 to be output to the ring gear shaft 126C. This implies that the power output from the second motor MG2 is used as the reaction force, in order to enable the power from the first motor MG1 to be output to the ring gear shaft 126C. From this point of view, the second motor works to prevent the revolving speed Ne of the engine 150 from being lowered by the operation of the first motor MG1, that is, to keep the revolving speed Ne of the engine 150 at the idle revolving speed Ni.

Figure 39:
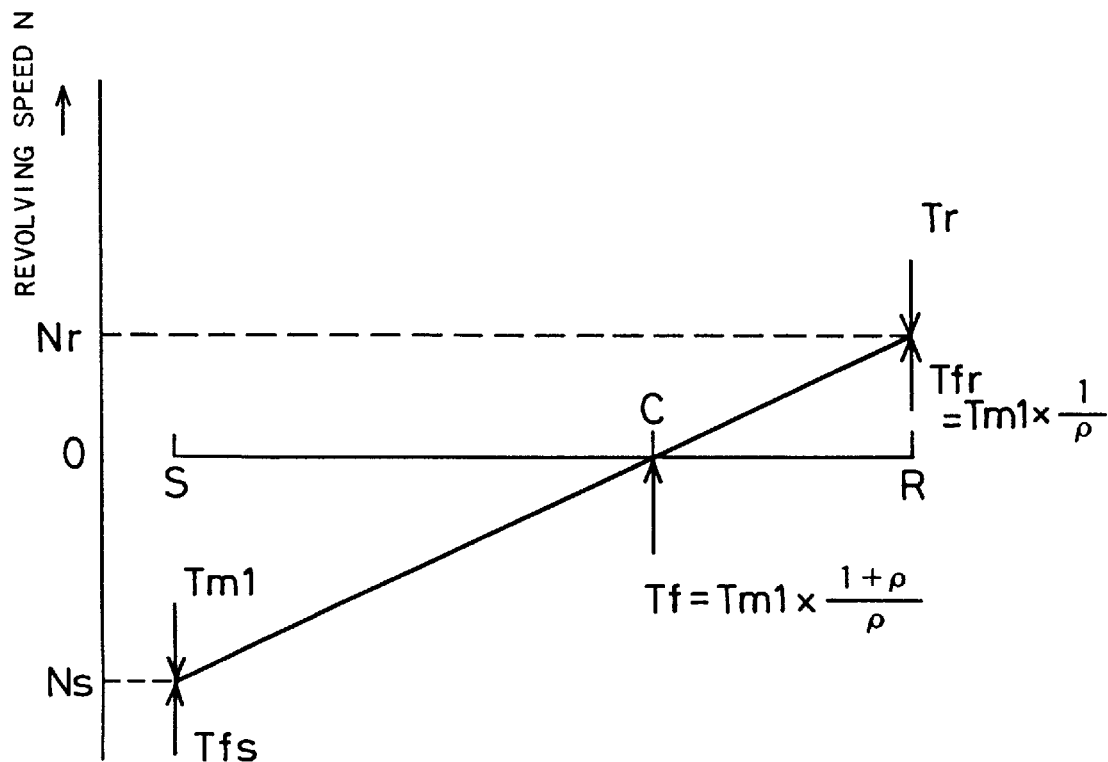
FIG. 39 is a nomogram showing the relationship between the revolving speed and the torque on the three shafts linked with the planetary gear 120 in the modified torque control process in the motor driving mode of the second embodiment.

In the torque control process in the motor driving mode executed by the power output apparatus 110C of the second embodiment, the first motor MG1 and the second motor MG2 output the power to the ring gear shaft 126C, in order to drive the engine 150 at the idle revolving speed. In accordance with another possible structure, the power from the first motor MG1 is output to the ring gear shaft 126C, while the engine 150 is at a stop, that is, while the planetary carrier 124 is fixed. In this case, the second motor MG2 may work to fix the crankshaft 156 or a brake mechanism for mechanically fixing the crankshaft 156 may be disposed in the crankshaft 156. FIG. 39 is a nomogram in this state. A torque Tf acting on the coordinate axis C in the nomogram of FIG. 39 is generated by fixing the crankshaft 156 and works as a reaction force against the power output from the first motor MG1.

As discussed above, the power output apparatus 110C of the second embodiment carries out the various torque control processes to enable the power to be output to the ring gear shaft 126C and eventually to the driving wheels 116 and 118 with a high efficiency. The structure of the second embodiment also enables the power output to the ring gear shaft 126C to be taken out of the arrangement between the first motor MG1 and the second motor MG2 and transmitted to the driving wheels 116 and 118.

The power output apparatus 110C of the second embodiment carries out the torque control processes in the charge-discharge mode, in the power assist mode, in the lock-up mode, and in the motor driving mode, based on the remaining charge BRM of the battery 194, the energy Pr to be output to the ring gear shaft 126C, the torque command value Tr*, and the revolving speed Nr of the ring gear shaft 126C. One or some of these torque control processes may, however, be omitted according to the requirements. In the power output apparatus 110C of the second embodiment, the torque control in the motor driving mode is carried out when it is determined that the energy Pr to be output to the ring gear shaft 126C is smaller than the predetermined energy PAL and that the revolving speed Nr of the ring gear shaft 126C is lower than the predetermined revolving speed NML. In accordance with an alternative structure, however, the torque control in the motor driving mode may be carried out irrespective of the energy to be output to the ring gear shaft 126C and the revolving speed Nr of the ring gear shaft 126C.

Figure 40:
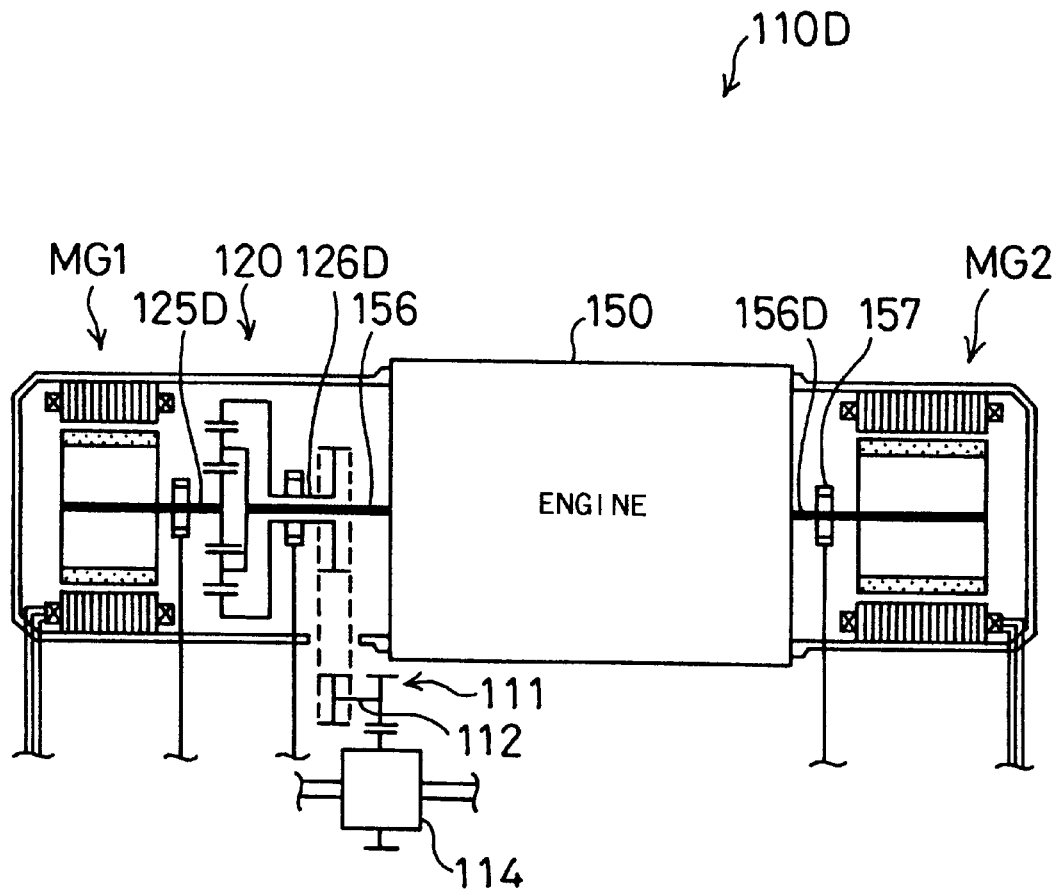
FIG. 40 schematically illustrates structure of another power output apparatus 110D as a modification of the second embodiment, and FIG. 41 schematically illustrates structure of still another power output apparatus 110E as another modification of the second embodiment.
Figure 41:
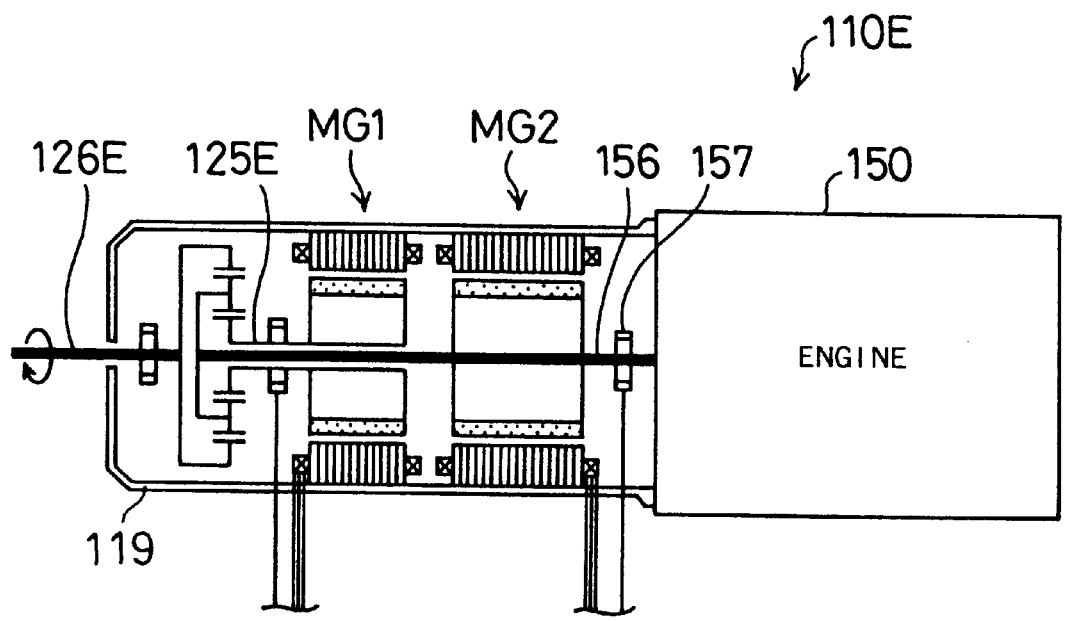

Although the second motor MG2 is interposed between the engine 150 and the first motor MG1 in the power output apparatus 110C of the second embodiment, the engine 150 may be interposed between the first motor MG1 and the second motor MG2 like another power output apparatus 110D of modified structure shown in FIG. 40. In the power output apparatus 110C of the second embodiment, the power output to the ring gear shaft 126C is taken out of the arrangement between the first motor MG1 and the second motor MG2 via the power feed gear 128 linked with the ring gear 122. Like still another power output apparatus 110E shown in FIG. 41 as another possible modification, however, the power may be taken out of the casing 119, from which a ring gear shaft 126E is extended.

3. Other Applications

In the power output apparatus 110 of the first embodiments the power output apparatus 110C of the second embodiments and their modified structures, the crankshaft 156 is linked with the planetary carrier 124 of the planetary gear 120, while the first motor MG1 is connected to the sun gear shaft 125 and the ring gear shaft 126 is connected to the power transmission gear 111 having the drive shaft 112 via the power feed gear 128. The crankshaft 156, the first motor MG1, and the power transmission gear 111 may, however, be connected in any combination to the three shafts of the planetary gear 120. The input and output powers under such conditions, that is, the respective command values in each torque control procedure, can be readily obtained from the corresponding nomograms.

In the power output apparatus 110 of the first embodiment, the power output apparatus 110C of the second embodiment, and their modified structures, when the current value of energy Pr is identical with the previous value of energy Pr, the torque control routine in the ordinary driving mode activates the first motor MG1 to regulate the revolving speed Ns of the sun gear shaft 125 to the target revolving speed Ns*, thereby making the revolving speed Ne of the engine 150 approach the target revolving speed Ne*. This procedure may be carried out in the torque control routine in the charge-discharge mode shown in the flowcharts of FIGS. 16 and 34 and in the torque control routine in the power assist mode shown in the flowcharts of FIGS. 20 and 35 as well as in the torque control routine in the ordinary driving mode shown in the flowcharts of FIGS. 11 and 33. In the above embodiments, the first motor MG1 regulates the revolving speed Ns of the sun gear shaft 125 to the target revolving speed Ns*, thereby enabling the revolving speed We of the engine 150 to approach the target revolving speed Ne*. This implies that the first motor MG1 regulates the revolving speed Ns of the sun gear shaft 125 to the target revolving speed Ns*, thereby enabling the torque Te of the engine 150 to approach the target torque Te*. This is because the torque Te and the revolving speed Ne of the engine 150 are correlated to each other.

In the power output apparatus 110 of the first embodiments the power output apparatus 110C of the second embodiment, and their modified structures, the torque command value Tr* to be output to the ring gear shaft 126 is determined according to the value of the accelerator pedal position AP representing the step-on amount of the accelerator pedal 164, and the power output from the engine 150 (that is, the target engine torque Te* and the target engine speed Ne*) is set based on this torque command value Tr*. Another possible structure may give the priority to the revolving speed in the control process. In this case the target revolving speed Nr* of the ring gear shaft 126 is determined according to the value of the accelerator pedal position AP and the power output from the engine 150 (that is, the target engine torque Te* and the target engine speed Ne*) is set based on this target revolving speed Nr*.

The present invention is not restricted to the above embodiments or applications, but there may be many modifications, changes, and alterations without departing from the scope or spirit of the main characteristics of the present invention. The following are some examples of possible modification.

Although the gasoline engine is used as the engine 150 in the above embodiments, the principle of the invention is also applicable to other internal combustion engines and external combustion engines, such as Diesel engines, turbine engines, and jet engines. In the above embodiments, the planetary gear 120 is applied for the three shaft-type power input/output means. Any other device or gear unit, such as a differential gears may, however, be used instead of the planetary gear 120, as long as it can determine powers input to and output from the residual one shaft when powers input to and output from any two shafts among the three shafts are determined.

Permanent magnet (PM)-type synchronous motors are used as the first motor MG1 and the second motor MG2 in the above embodiments. Any other motors which can implement both the regenerative operation and the power operations such as variable reluctance (VR)-type synchronous motors, vernier motors, d.c. motors, induction motors, superconducting motors, and stepping motors may, however, be used according to the requirements.

Transistor inverters are used as the fist and the second driving circuits 191 and 192 in the above embodiments. Other available examples include IGBT (insulated gate bipolar mode transistor) inverters, thyristor inverters, voltage PWM (pulse width modulation) inverters, square-wave inverters (voltage inverters and current inverters), and resonance inverters.

The battery 194 in the above embodiments may include Pb cells, NiMH cells, Li cells, or the like cells. A capacitor may be used in place of the battery 194.

Although the power output apparatus is mounted on the vehicle in all the above embodiments, it may be mounted on other transportation means like ships and airplanes as well as a variety of industrial machines.

It should be clearly understood that the above embodiments discussed above are only illustrative and not restrictive in any sense. The scope and spirit of the present invention are limited only by the terms of the appended claims.

What is claimed is:

1. A method of controlling a power output apparatus, said method comprising the steps of:
    (a) providing (1) an engine having an output shaft; (2) a first motor having a rotating shaft, said first motor inputting and outputting power to and from said rotating shaft; (3) a second motor for inputting and outputting power to and from a drive shaft; and (4) a three shaft-type power input/output means having three shafts respectively linked with said drive shaft, including said output shaft and said rotating shaft as two shafts of said three shafts, when powers are input to and output from any two shafts among said three shafts, said power input/output means inputting and outputting power, which is determined according to the input and output powers, to and from a residual one shaft of said three shafts; and (5) storage battery means being discharged to supply electric power required for driving said second motor;
    (b) specifying a target power to be output to said drive shaft, based on an instruction of a user;
    (c) when the target power specified in said step (b) exceeds a predetermined power controlling operation of said engine, based on the predetermined power;
    (d) driving and controlling said first motor, in order to enable the power output from said engine controlled in said step (c) to be subjected to torque conversion by said three shaft-type power input/output means, said first motor, and said second motor and to be output to said drive shaft as the predetermined power; and
    (e) driving and controlling said second motor, in order to make the power output from said engine equal to a difference between the target power and power output via said three shaft-type power input/output means to said drive shaft.

2. A power output apparatus for outputting power to a drive shaft, said power output apparatus comprising:
    an engine having an output shaft;
    a first motor having a rotating shaft, said first motor inputting and outputting power to and from said rotating shaft;
    a second motor inputting and outputting power to and from said drive shaft;
    a three shaft-type power input/output means having three shafts respectively linked with said drive shaft, including said output shaft and said rotating shaft as two shafts of said three shafts, when powers are input to and output from any two shafts among said three shafts, said power input/output means inputting and outputting power, which is determined according to the input and output powers, to and from a residual one shaft of said three shafts;
    target power setting means for setting a target power to be output to said drive shaft;

engine operation control means for controlling operation of said engine, based on the target power set by said target power setting means and an operating condition setting unit that specifies an operating condition of the engine which enables the engine to operate with the highest possible engine efficiency based on a predetermined relationship between operating condition and engine efficiency; and power control means for driving and controlling said first motor and said second motor, in order to enable power output from said engine to be subjected to torque conversion by said three shaft-type power input/output means, said first motor, and said second motor and to be output to said drive shaft as the target power.

3. A power output apparatus for outputting power to a drive shaft, said power output apparatus comprising:

an engine having an output shaft;

a first motor having a rotating shaft, said first motor inputting and outputting power to and from said rotating shaft;

a second motor inputting and outputting power to and from said drive shaft;

a three shaft-type power input/output means having three shafts respectively linked with said drive shaft, including said output shaft and said rotating shaft as two shafts of said three shafts, when powers are input to and output from any two shafts among said three shafts, said power input/output means inputting and outputting power, which is determined according to the input and output powers, to and from a residual one shaft of said three shafts;

target power setting means for setting a target power to be output to said drive shaft;

engine operation control means for controlling operation of said engine, based on the target power set by said target power setting means and an operating condition setting unit that specifies an operating condition of the engine which enables the engine to operate with the highest possible engine efficiency, based on a predetermined relationship between operating condition and engine efficiency; and power control for driving and controlling said first motor and said second motor, in order to enable power output from said engine to be subjected to torque conversion by said three shaft-type power input/output means, said first motor, and said second motor and to be output to said drive shaft, wherein said power control means includes means for driving and controlling said first motor, in order to enable part of the power output from said engine to be regenerated as electric power by said first motor via said three shaft-type power input/output means and means for driving and controlling said second motor, in order to enable power to be output from said second motor to said drive shaft by utilizing the electric power regenerated by said first motor.

4. A power output apparatus in accordance with claim 2, wherein said power control means comprises:

means for driving and controlling said second motor, in order to enable part of the power output to said drive shaft via said three shaft-type power input/output means to be regenerated as electric power by said second motor; and means for driving and controlling said first motor, in order to enable power to be output from said first motor to said rotating shaft by utilizing the electric power regenerated by said second motor.

5. A power output apparatus in accordance with claim 2 said power output apparatus further comprising:

storage battery means being charged with electric power regenerated by said first motor, being charged with electric power regenerated by said second motor, being discharged to supply electric power required for driving said first motor, and being discharged to supply electric power required for driving said second motor; and charge state measuring means for measuring charge state of said storage battery, wherein said power control means comprises means for driving and controlling said first motor and said second motor based on the charge state of said storage battery means measured by said charge state measuring means, in order to enable the power output from said engine and electric power stored into and discharged from said storage battery means to be subjected to torque conversion by said three shaft-type power input/output means, said first motor, and said second motor and to be output to said drive shaft.

6. A power output apparatus in accordance with claim 5, said power output apparatus further comprising:

target power setting means for setting a target power to be output to said drive shaft;

engine power setting means for setting power to be output from said engine, based on the target power set by said target power setting means and the charge state of said storage battery means measured by said charge state measuring means; and engine operation control means for controlling operation of said engine based on the power set by said engine power setting means, wherein said power control means comprises means for enabling the power output from said engine and the electric power stored into and discharged from said storage battery means to be subjected to torque conversion by said three shaft-type power input/output means, said first motor, and said second motor and to be output to said drive shaft as the target power.

7. A power output apparatus in accordance with claim 6 wherein said engine power setting means comprises:

drive shaft power setting means for setting required power output to said drive shaft, based on the target power set by said target power setting means;

charging and discharging power setting means for setting required power to charge and discharge said storage battery means, based on the charge state of said storage battery means measured by said charge state measuring means; and addition means for summing up the power set by said drive shaft power setting means and the power set by said charging and discharging power setting means to calculate a total power to be output from said engine.

8. A power output apparatus in accordance with claim 2, wherein said engine operation control means comprises means for driving and controlling said first motor, in order to regulate a revolving speed of said output shaft of said engine.

9. A power output apparatus in accordance with claim 2, wherein said engine operation control means comprises means for driving and controlling said first motor, in order to regulate a torque output from said engine.

10. A power output apparatus in accordance with claim 2, said power output apparatus further comprising:

power setting means for specifying power input to and output from said engine, power input to and output from said first motor, and power input to and output from said second motor, based on the target power set by said target power setting means, wherein said power control means comprises means for driving and controlling said engine as well as said first motor and said second motor, in order to enable the powers set by said power setting means to be respectively input to and output from said engine, said first motor, and said second motor.

11. A power output apparatus in accordance with claim 10, wherein said power setting means comprises:

means for presetting the power input to and output from said engine based on the target power; and means for setting the power input to and output from said first motor and the power input to and output from said second motor, in order to enable the preset power to be subjected to torque conversion by said three shaft-type power input/output means, said first motor, and said second motor and to be output to said drive shaft as the target power.

12. A power output apparatus in accordance with claim 10 said power output apparatus further comprising:

storage battery means being discharged to supply electric power required for driving said second motor, wherein said power setting means comprises means for setting the power input to and output from said engine equal to zero and specifying the power input to and output from said second motor in order to enable the target power to be output from said second motor to said drive shaft, in response to a predetermined driving requirement, said power control means comprising means for driving said second motor with electric power stored in said storage battery means, in response to the predetermined driving requirement.

13. A power output apparatus in accordance with claim 10, said power output apparatus further comprising:

storage battery means being discharged to supply electric power required for driving said second motor, wherein said power setting means comprises:

means for, when the target power exceeds a predetermined power, presetting the power input to and output from said engine based on the predetermined power;

means for setting the power input to and output from said first motors in order to enable the preset power to be subjected to torque conversion by said three shaft-type power input/output means, said first motor, and said second motor and to be output to said drive shaft as the predetermined power; and means for setting a difference between the target power and power output from said three shaft-type power input/output means to said drive shaft based on the preset power output from said engines as the power output from said second motor, said power control means for implementing control with electric power that is discharged from said storage battery means and corresponds to a difference between the target power and the predetermined power.

14. A power output apparatus in accordance with claim 2, wherein said target power setting means comprises:

means for specifying a target torque applied to said drive shaft, based on an instruction of a user; and means for setting the target power according to the target torque thus specified.

15. A power output apparatus in accordance with claim 2, wherein said target power setting means comprises:

means for specifying a target revolving speed of said drive shaft, based on an instruction of a user; and means for setting the target power according to the target revolving speed thus specified.

16. A method of controlling a power output apparatus, said method comprising the steps of:

(a) providing (1) an engine having an output shaft; (2) a first motor having a rotating shaft, said first motor inputting and outputting power to and from said rotating shaft; (3) a second motor for inputting and outputting power to and from a drive shaft; and (4) a three shaft-type power input/output means having three shafts respectively linked with said drive shaft, including said output shaft and said rotating shaft as two shafts of said three shafts when powers are input to and output from any two shafts among said three shafts, said power input/output means inputting and outputting power, which is determined according to the input and output powers, to and from a residual one shaft of said three shafts; and (5) storage battery means being charged with electric power regenerated by said second motor and being discharged to supply electric power required for driving said second motor;

(b) specifying a target power to be output to said drive shaft, based on an instruction of a user;

(c) controlling operation of said engine, based on the target power specified in said step (by and a revolving speed of said drive shaft;

(d) keeping said first motor in a lock-up state to prevent rotation of said rotating shaft; and (e) driving and controlling said second motor, in order to enable the target power to be output to said drive shaft by utilizing power output from said engine and power input to and output from said second motor.

17. A power output apparatus for outputting power to a drive shaft, said power output apparatus comprising:

an engine having an output shaft;

a first motor having a rotating shaft, said first motor inputting and outputting power to and from said rotating shaft;

a second motor inputting and outputting power to and from said output shaft of said engine;

a three shaft-type power input/output means having three shafts respectively linked with said drive shaft, including said output shaft and said rotating shaft as two shafts of said three shafts, when powers are input to and output from any two shafts among said three shafts, said power input/output means inputting and outputting power, which is determined according to the input and output powers, to and from a residual one shaft of said three shafts;

power control means for driving and controlling said first motor and said second motor, in order to enable power output from said engine to be subjected to torque conversion by said three shaft-type power input/output means, said first motor, and said second motor and to be output to said drive shaft;

target power setting means for setting a target power to be output to said drive shaft; and engine operation control means for controlling operation of said engine, based on the target power set by said target power setting means and an operating condition setting unit that specifies an operating condition of the engine which enables the engine to operate with the highest possible engine efficiency, based on a predetermined relationship between operating condition and engine efficiency, wherein said power control means comprises means for enabling the power output from said engine to be subjected to torque conversion by said three shaft-type power input/output means, said first motor, and said second motor and to be output to said drive shaft as the target power.

18. A power output apparatus in accordance with claim 17, wherein said power control means comprises:

means for driving and controlling said first motor, in order to enable part of the power output to said rotating shaft via said three shaft-type power input/output means to be regenerated as electric power by said first motor; and means for driving and controlling said second motor, in order to enable power to be output from said second motor to said output shaft of said engine by utilizing the electric power regenerated by said first motor.

19. A power output apparatus in accordance with claim 17, wherein said power control means comprises:

means for driving and controlling said second motor, in order to enable part of the power output from said engine to be regenerated as electric power by said second motor; and means for driving and controlling said first motor, in order to enable power to be output from said first motor to said rotating shaft by utilizing the electric power regenerated by said second motor.

20. A power output apparatus in accordance with claim 17, said power output apparatus further comprising:

storage battery means being charged with electric power regenerated by said first motor, being charged with electric power regenerated by said second motor, being discharged to supply electric power required for driving said first motor, and being discharged to supply electric power required for driving said second motor, and charge state measuring means for measuring charge state of said storage battery, wherein said power control means comprises means for driving and controlling said first motor and said second motor based on the charge state of said storage battery means measured by said charge state measuring means, in order to enable the power output from said engine and electric power stored into and discharged from said storage battery means to be subjected to torque conversion by said three shaft-type power input/output means, said first motor, and said second motor and to be output to said drive shaft.

21. A power output apparatus in accordance with claim 20, said power output apparatus further comprising:

engine power setting means for setting power to be output from said engine, based on the target power set by said target power setting means and the charge state of said storage battery means measured by said charge state measuring means, wherein said power control means comprises means for enabling the power output from said engine and the electric power stored into and discharged from said storage battery means to be subjected to torque conversion by said three shaft-type power input/output means, said first motor, and said second motor and to be output to said shaft as the target power.

22. A power output apparatus in accordance with claim 21, wherein said engine power setting means comprises:

drive shaft power setting means for setting required power output to said drive shafts based on the target power set by said target power setting means;

charging and discharging power setting means for setting required power to charge and discharge said storage battery means, based on the charge state of said storage battery means measured by said charge state measuring means; and addition means for summing up the power set by said drive shaft power setting means and the power set by said charging and discharging power setting means to calculate a total power to be output from said engine.

23. A power output apparatus in accordance with claim 17, wherein said engine operation control means comprises means for driving and controlling said first motor, in order to regulate a revolving speed of said output shaft of said engine.

24. A power output apparatus in accordance with claim 17, wherein said engine operation control means comprises means for driving and controlling said first motor, in order to regulate a torque output from said engine.

25. A power output apparatus in accordance with claim 17, said power output apparatus further comprising:

power setting means for specifying power input to and output from said engine, power input to and output from said first motor, and power input to and output from said second motor, based on the target power set by said target power setting means, wherein said power control means comprises means for driving and controlling said engine as well as said first motor and said second motor, in order to enable the powers set by said power setting means to be respectively input to and output from said engine, said first motor, and said second motor.

26. A power output apparatus in accordance with claim 25, wherein said power setting means comprises:

means for presetting the power input to and output from said engine, based on the target power; and means for setting the power input to and output from said first motor and the power input to and output from said second motors in order to enable the preset power to be subjected to torque conversion by said three shaft-type power input/output means, said first motor, and said second motor and to be output to said drive shaft as the target power.

27. A power output apparatus in accordance with claim 10, said power output apparatus further comprising:

storage battery means being discharged to supply electric power required for driving said first and second motor, wherein said power setting means comprises means for setting the power input to and output from said engine equal to zero and specifying the power input to and output from said first motor in order to enable the target power to be output from said first motor to said drive shaft via said three shaft-type power input/output means, in response to a predetermined driving requirement, said power control means comprising means for driving said first motor with electric power stored in said storage battery means, in response to the predetermined driving requirement, said power control means comprising means for driving said second motor in order to enable said output shaft of engine to a predetermined rotating state.

28. A power output apparatus in accordance with claim 25, said power output apparatus further comprising:

storage battery means being discharged to supply electric power required for driving said first and second motor,
wherein said power setting means comprises:
first setting means for, when the target power exceeds a predetermined power, presetting the power input to and output from said engine based on the predetermined power;
second setting means for setting a difference between one power which is the power preset by said first setting means and the other power as power to be input to and output from said second motor, wherein the other power has the same number of revolutions as the power preset by said first setting means and is output to said output shaft as said target power output to said rotating shaft through said three shaft-type power input/output means; and
third setting means for setting power to be input to and output from said first motor in such a way that a sum of said power set to be input to and output from said second motor, and said power preset to be input to and output from said engine is output to said rotating shaft as said target power by said three shaft-type power input/output means and said first motor,
wherein said power control means uses power which is the equivalent to a difference between said target power discharged from said storage battery means and said predetermined power to execute control.

29. A power output apparatus in accordance with claim 17, wherein said target power setting means comprises:
means for specifying a target torque applied to said drive shaft, based on an instruction of a user; and
means for setting the target power according to the target torque thus specified.

30. A power output apparatus in accordance with claim 17, wherein said target power setting means comprises:
means for specifying a target revolving speed of said drive shaft based on an instruction of a user; and
means for setting the target power according to the target revolving speed thus specified.

31. A power output apparatus for outputting power to a drive shaft, said power output apparatus comprising:
an engine having an output shaft;
a motor having a rotating shaft, said motor inputting and outputting power to and from said rotating shaft;
three shaft-type power input/output means having three shafts respectively linked with said drive shaft, including said output shaft and said rotating shaft as two shafts of said three shafts, when power are input to and output from any two shafts among said three shafts, said power input/output means inputting and outputting power, which is determined according to the input and output powers, to and from a residual one shaft of said three shafts;
target power setting means for setting a target power to be output to said drive shaft;
engine operation control means for controlling operation of said engine, based on the target power set by said target power setting means and an operating condition setting unit that specifies an operating condition of the engine which enables the engine to operate with the highest possible engine efficiency, based on a predetermined relationship between operating condition and engine efficiency; and
lock-up state control means for keeping said motor in a lock-up state to prevent rotation of said rotating shaft, in response to a predetermined driving requirement.

32. A power output apparatus in accordance with claim 31, wherein said motor is a first motor, said power output apparatus further comprising:
a second motor for inputting and outputting power to and from said drive shaft;
storage battery means being charged with electric power regenerated by said second motor and being discharged to supply electric power required for driving said second motor;
drive shaft speed measuring means for measuring a revolving speed of said drive shaft; and
motor control means for driving and controlling said second motor, in order to enable the target power to be output to said drive shaft by utilizing power output from said engine and power input to and output from said second motor, wherein the engine operation control means controls operation of the engine based on the revolving speed of the drive shaft measured by the drive shaft speed measuring means, the target power set by the target power setting means, and the operating condition setting unit.

33. A power output apparatus in accordance with claim 31, wherein said motor is a first motor,
said power output apparatus further comprising:
a second motor for inputting and outputting power to and from said output shaft of said engine;
storage battery means being discharged to supply electric power to said first motor and said second motor;
drive shaft speed measuring means for measuring a revolving speed of said drive shaft; and
motor control means for driving and controlling said second motor, in order to enable the target power to be output to said drive shaft by utilizing power output from said engine and power input to and output from said second motor, wherein the engine operation control means controls operation of the engine based on the revolving speed of the drive shaft measured by the drive shaft speed measuring means, the target power set by the target power setting means, and the operating condition setting unit.

34. A power output apparatus for outputting power to a drive shaft, said power output apparatus comprising:
an engine having an output shaft;
a first motor having a first rotating shaft that is coaxial with said output shaft, said first motor inputting and outputting power to and from said first rotating shaft;
a second motor having a second rotating shaft that is coaxial with said output shaft, said second motor inputting and outputting power to and from said second rotating shaft;
a three shaft-type power input/output means having three shafts respectively linked with said drive shaft, including said output shaft, said first rotating shaft, and said second rotating shaft as said three shafts, when powers are input to and output from any two shafts among said three shafts, said power input/output means inputting and outputting power, which is determined according to the input and output powers, to and from a residual one shaft of said three shafts; and
power transmission means arranged between said engine and said second motor and linked with said second rotating shaft and said drive shaft for transmitting power of said second rotating shaft to said drive shaft.

35. A power output apparatus in accordance with claim 34, wherein said first motor is arranged between said engine and said second motor.

36. A power output apparatus in accordance with claim 34, wherein said second motor is arranged between said engine and said first motor.

37. A power output apparatus in accordance with claim 34, said power output apparatus further comprising:

target power setting means for setting a target power to be output to said drive shaft; and power control means for controlling said engine said first motor, and said second motor, in order to enable the target power to be output to said drive shaft.

38. A power output apparatus for outputting power to a drive shaft, said power output apparatus comprising:

an engine having an output shaft;

a first motor having a first rotating shaft that is coaxial with said output shaft, said first motor inputting and outputting power to and from said first rotating shaft;

a second motor for inputting and outputting power to and from said output shaft of said engine;

a three shaft-type power input/output means having three shafts respectively linked with said drive shaft, including said output shaft, said first rotating shaft, and a second rotating shaft of said second motor as said three shafts, when powers are input to and output from any two shafts among said three shafts, said power input/output means inputting and outputting power, which is determined according to the input and output powers, to and from a residual one shaft of said three shafts; and power transmission means arranged between said engine and said first motor and linked with said second rotating shaft and said drive shaft for transmitting power of said second rotating shaft to said drive shaft.

39. A power output apparatus in accordance with claim 38, wherein said second motor is arranged between said engine and said first motor.

40. A power output apparatus in accordance with claim 38, wherein said engine is arranged between said first motor and said second motor.

41. A power output apparatus in accordance with claim 38, said power output apparatus further comprising:

target power setting means for setting a target power to be output to said drive shaft; and power control means for controlling said engine, said first motor, and said second motor, in order to enable the target power to be output to said drive shaft.

42. A method of controlling a power output apparatus, said method comprising the steps of:

(a) providing (1) an engine having an output shaft; (2) a first motor having a rotating shaft, said first motor inputting and outputting power to and from said rotating shaft; (3) a second motor for inputting and outputting power to and from a drive shaft; and (4) a three shaft-type power input/output means having three shafts respectively linked with said drive shaft, including said output shaft and said rotating shaft as two shafts of said three shafts, when powers are input to and output from any two shafts among said three shafts, said power input/output means inputting and outputting power, which is determined according to the input and output powers, to and from a residual one shaft of said three shafts;

(b) specifying a target power to be output to said drive shaft, based on an instruction of a user;

(c) controlling operation of said engines, based on the target power specified in said step (b); and (d) driving and controlling said first motor and said second motor, in order to enable the power output from said engine controlled in said step (c) to be subjected to torque conversion by said three shaft-type power input/output means, said first motor, and said second motor and to be output to said drive shaft as the target power.

43. A method of controlling a power output apparatus, said method comprising the steps of:

(a) providing (1) an engine having an output shaft; (2) a first motor having a rotating shaft, said first motor inputting and outputting power to and from said rotating shaft; (3) a second motor for inputting and outputting power to and from a drive shaft; and (4) a three shaft-type power input/output means having three shafts respectively linked with said drive shaft, including said output shaft and said rotating shaft as two shafts of said three shafts, when powers are input to and output from any two shafts among said three shafts, said power input/output means inputting and outputting power, which is determined according to the input and output powers, to and from a residual one shaft of said three shafts; and (5) storage battery means being charged with electric power regenerated by said first motor, being charged with electric power regenerated by said second motor, being discharged to supply electric power required for driving said first motor, and being discharged to supply electric power required for driving said second motor;

(b) specifying a target power to be output to said drive shaft, based on an instruction of a user;

(c) controlling operation of said engine, based on the target power specified in said step (b) and a charge state of said storage battery means; and (d) driving and controlling said first motor and said second motor, in order to enable the power output from said engine controlled in said step (c) and electric power stored into and discharged from said storage battery means to be subjected to torque conversion by said three shaft-type power input/output means, said first motor, and said second motor and to be output to said drive shaft as the target power.

44. A method of controlling a power output apparatus said method comprising the steps of:

(a) providing (1) an engine having an output shaft; (2) a first motor having a rotating shafts said first motor inputting and outputting power to and from said rotating shaft; (3) a second motor for inputting and outputting power to and from a drive shaft; and (4) a three shaft-type power input/output means having three shafts respectively linked with said drive shaft, including said output shaft and said rotating shaft as two shafts of said three shafts, when powers are input to and output from any two shafts among said three shafts, said power input/output means inputting and outputting power, which is determined according to the input and output powers, to and from a residual one shaft of said three shafts;

(b) specifying a target power to be output to said drive shaft, based on an instruction of a user;

(c) setting power input to and output from said engine, power input to and output from said first motor, and power input to and output from said second motor, based on the target power specified in said step (b); and (d) driving and controlling said engine, said first motor, and said second motor, in order to enable the powers set in said step (c) to be respectively input to and output from said engine, said first motor, and said second motor.

45. A method of controlling a power output apparatus, said method comprising the steps of:

(a) providing (1) an engine having an output shaft; (2) a first motor having a rotating shaft, said first motor inputting and outputting power to and from said rotating shaft; (3) a second motor for inputting and outputting power to and from a drive shaft; and (4) a three shaft-type power input/output means having three shafts respectively linked with said drive shaft, including said output shaft and said rotating shaft as two shafts of said three shafts, when powers are input to and output from any two shafts among said three shafts, said power input/output means inputting and outputting power, which is determined according to the input and output powers, to and from a residual one shaft of said three shafts; and (5) storage battery means being discharged to supply electric power required for driving said second motor;

(b) specifying a target power to be output to said drive shaft, based on an instruction of a user; and (c) stopping operation of said engine and driving and controlling said second motor in order to enable the target power to be output from said second motor to said drive shaft with electric power stored in said storage battery means, in response to a predetermined driving requirement.

* * * * *